(12) United States Patent
Nomura et al.

(10) Patent No.: US 8,001,576 B2
(45) Date of Patent: Aug. 16, 2011

(54) INFORMATION PROVIDING SYSTEM, INFORMATION PROCESSING APPARATUS AND INFORMATION PROCESSING METHOD FOR TRANSMITTING SOUND AND IMAGE DATA

(75) Inventors: Yasuo Nomura, Kanagawa (JP); Nobuaki Yamaguchi, Kanagawa (JP); Yoshikazu Watanabe, Kanagawa (JP); Rie Usukura, Saitama (JP); Atsushi Kimura, Tokyo (JP); Yasuhito Shikata, Tokyo (JP); Hiroyuki Mitsubori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1621 days.

(21) Appl. No.: 10/237,473

(22) Filed: Sep. 9, 2002

(65) Prior Publication Data

US 2003/0074673 A1    Apr. 17, 2003

(30) Foreign Application Priority Data

Sep. 11, 2001 (JP) ................................. 2001-274570

(51) Int. Cl.
*H04N 7/173* (2011.01)
(52) U.S. Cl. ...................................................... 725/110
(58) Field of Classification Search .................... 725/91, 725/93, 98, 68, 82–87, 100, 103, 105, 109–110, 725/114, 118, 131, 138, 139, 144, 148, 151
See application file for complete search history.

(56) References Cited

U.S. PATENT DOCUMENTS

| | | | | |
|---|---|---|---|---|
| 5,694,163 A | * | 12/1997 | Harrison | 725/110 |
| 5,757,891 A | * | 5/1998 | Wang | 379/93.24 |
| 5,778,187 A | * | 7/1998 | Monteiro et al. | 709/231 |
| 5,905,868 A | * | 5/1999 | Baghai et al. | 709/224 |
| 6,594,825 B1 | * | 7/2003 | Goldschmidt Iki et al. | 725/53 |
| 6,754,904 B1 | * | 6/2004 | Cooper et al. | 725/32 |
| 6,963,590 B1 | * | 11/2005 | Mann et al. | 370/535 |
| 7,143,428 B1 | * | 11/2006 | Bruck et al. | 725/37 |
| 7,200,855 B2 | * | 4/2007 | Laksono | 725/82 |

FOREIGN PATENT DOCUMENTS

| | | |
|---|---|---|
| JP | 10 174007 | 6/1998 |
| JP | 11 88865 | 3/1999 |
| JP | 2000 59760 | 2/2000 |
| JP | 2000 138763 | 5/2000 |

* cited by examiner

*Primary Examiner* — Scott Beliveau
*Assistant Examiner* — Yassin Alata
(74) *Attorney, Agent, or Firm* — Frommer Lawrence & Haug LLP; William S. Frommer; Thomas F. Presson

(57) ABSTRACT

Disclosed is an information providing system which comprises: an information providing apparatus with elements for receiving a TV program, generating image data and sound data representing a received TV program, and transmitting the image data and sound data; and an information processing apparatus with connecting information set to specify whether or not to establish connection with the information providing apparatus, and a storing element for storing the name of the information providing apparatus. If the connecting information is judged set to establish connection, then the information processing apparatus establishes connection with the information providing apparatus based on the stored name of the latter, so that the image data and sound data are received by the information processing apparatus from the information providing apparatus.

11 Claims, 52 Drawing Sheets

| CLIENT NAMES | PRIORITIES |
|---|---|
| AAA | 1 |
| BBB | 2 |
| CCC | 2 |
| . | . |
| . | . |
| . | . |

FIG. 28

| VERSION | FUNCTION |
|---|---|
| 1.0 | Recording |
| 2.0 | Recording, tuner |
| 3.0 | Recording, tuner, multiple streams |
| ⋮ | ⋮ |

F I G. 4 1
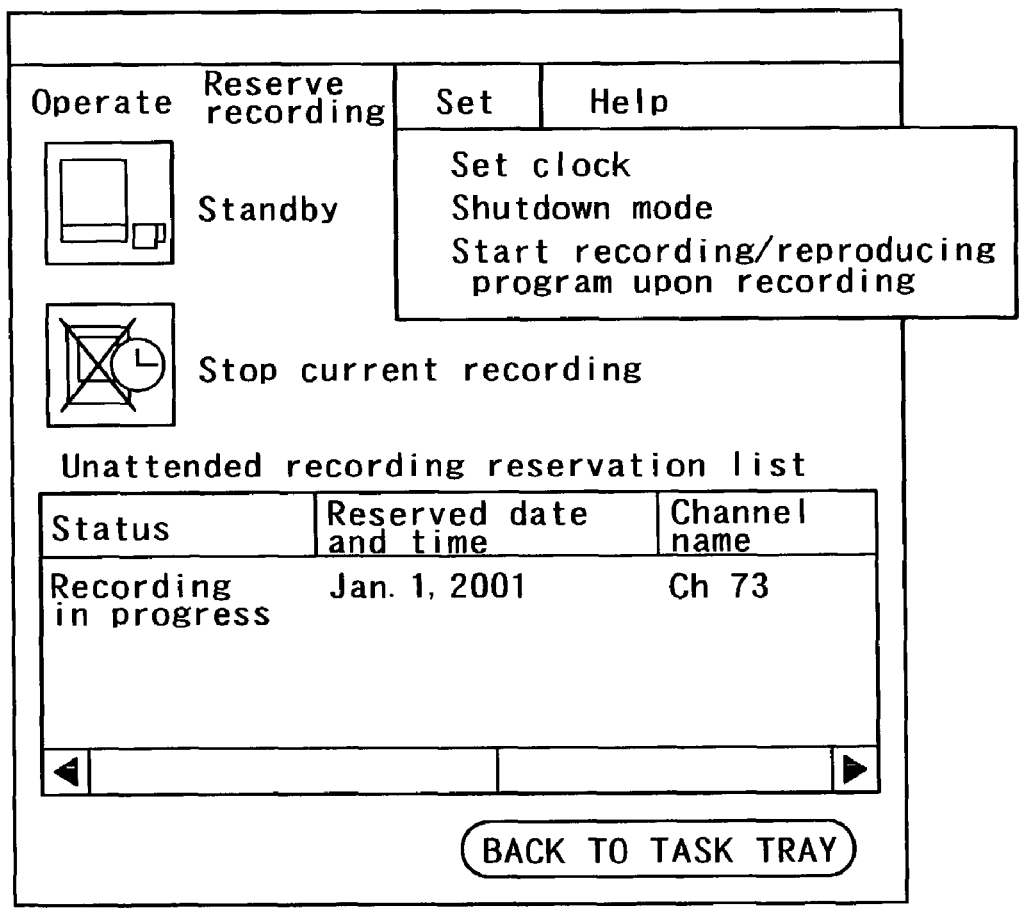

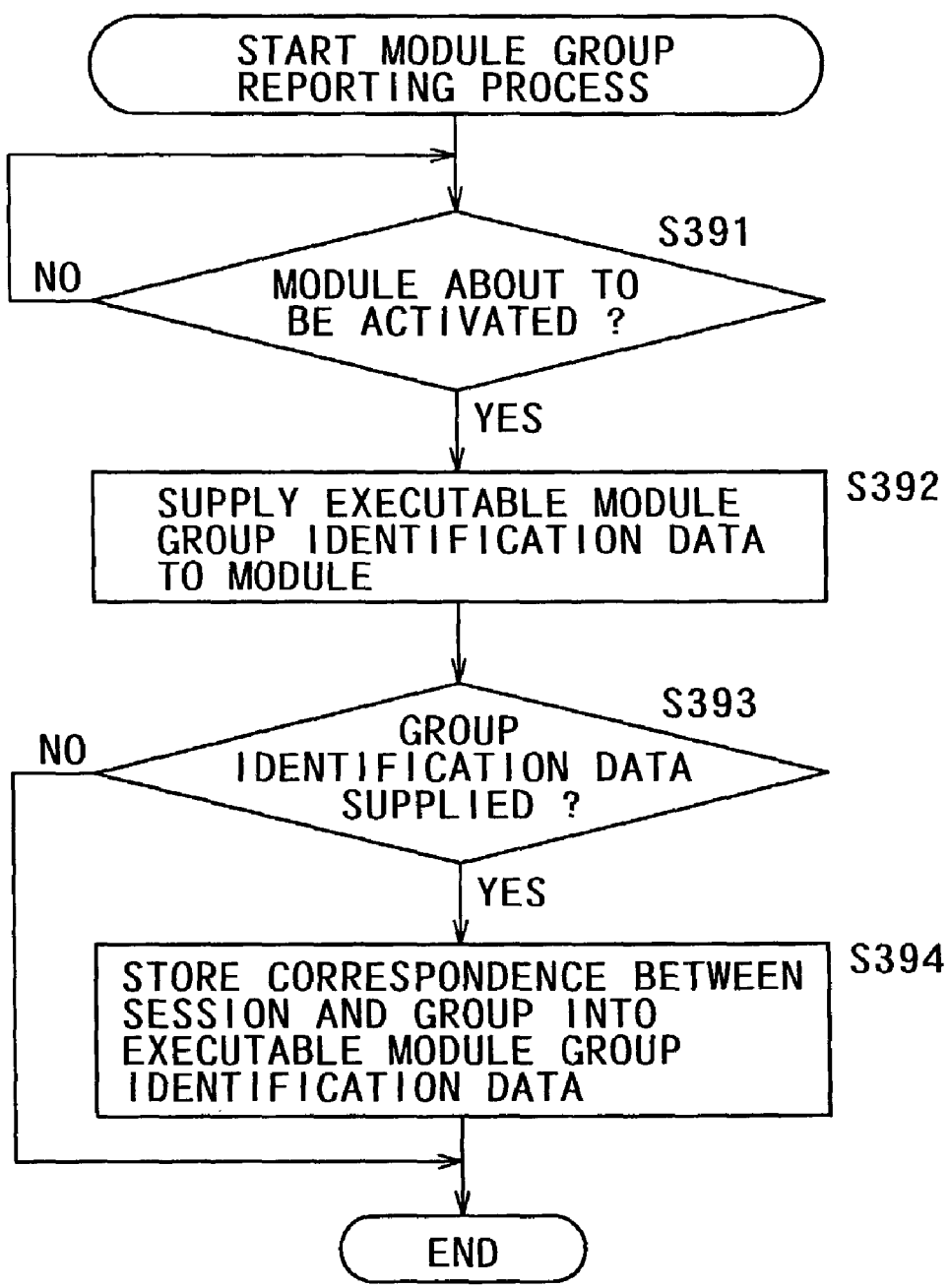

INFORMATION PROVIDING SYSTEM, INFORMATION PROCESSING APPARATUS AND INFORMATION PROCESSING METHOD FOR TRANSMITTING SOUND AND IMAGE DATA

BACKGROUND OF THE INVENTION

The present invention relates to an information providing system, an information processing apparatus, an information processing method, and a program. More particularly, the invention relates to an information providing system, an information processing apparatus, an information processing method, and a program suitable for handling image data and sound data.

In widespread use today are client-server systems each comprising a server that provides its clients with image data and sound data via a network. Each client receives the image data and sound data coming from the server over the network so as to display images and to output sounds reflecting the received data.

The server may include a tuner for receiving TV broadcasts. In this case, the server generates image data and sound data representing a received TV program and provides each client with the generated image data and sound data.

On receiving the image data and sound data corresponding to received TV programs, each client may display images and output sounds reflecting the received data.

At present, there exist servers each incorporating the tuner that receives TV broadcasts and provides clients with image data and sound data representing the received TV programs. In these setups, every time a server is accessed by a client, the user of that client is required to perform a bothersome series of operations for selecting the server in question out of multiple servers available.

SUMMARY OF THE INVENTION

The present invention has been made in view of the above circumstances and provides an information providing system, an information processing apparatus, an information processing method, and a program for use with multiple servers as information providing apparatuses connected to clients over a network; each server incorporating a tuner for receiving TV programs so that the server in question provides its clients with image data and sound data representing the received TV programs, whereby each client is allowed selectively to acquire image data and sound data from any one of the information providing apparatuses without going through complicated operations.

In carrying out the invention and according to a first aspect thereof, there is provided an information providing system comprising an information providing apparatus and an information processing apparatus, the information providing apparatus providing image data and sound data over a network, the information processing apparatus displaying images and outputting sounds based on the image data and the sound data from the information providing apparatus; wherein the information providing apparatus includes: a first receiving element for receiving a TV program; a generating element for generating the image data and the sound data representing the TV program; and a transmitting element for transmitting the image data and the sound data over the network; wherein the information processing apparatus includes: a storage controlling element for storing connecting information and a name of the information providing apparatus, the connecting information being set to specify whether or not to establish connection with the information providing apparatus; a connection controlling element which, if the connecting information is set to establish connection with the information providing apparatus, then establishes connection with the information providing apparatus based on the stored name of the information providing apparatus; and a reception controlling element which, if connection is established with the information providing apparatus, then receives the image data and the sound data from the information providing apparatus.

As outlined above, the information providing system according to the invention comprises: an information providing apparatus with elements for receiving a TV program, generating image data and sound data representing the received TV program, and transmitting the image data and sound data; and an information processing apparatus with connecting information set to specify whether or not to establish connection with the information providing apparatus, and a storing element for storing the name of the information providing apparatus. If the connecting information is judged set to establish connection, then the information processing apparatus establishes connection with the information providing apparatus based on the stored name of the latter, so that the image data and sound data are received by the information processing apparatus from the information providing apparatus.

According to a second aspect of the invention, there is provided an information processing apparatus for displaying images and outputting sounds based on image data and sound data representing a TV program, the image data and the sound data being provided by an information providing apparatus over a network, the information processing apparatus comprising: a storage controlling element for storing connecting information and a name of the information providing apparatus, the connecting information being set to specify whether or not to establish connection with the information providing apparatus; a connection controlling element which, if the connecting information is set to establish connection with the information providing apparatus, then establishes connection with the information providing apparatus based on the stored name of the information providing apparatus; and a reception controlling element which, if connection is established with the information providing apparatus, then receives the image data and the sound data from the information providing apparatus.

According to a third aspect of the invention, there is provided an information processing method for use with an information processing apparatus for displaying images and outputting sounds based on image data and sound data representing a TV program, the image data and the sound data being provided by an information providing apparatus, the information processing method comprising the steps of: storing connecting information and a name of the information providing apparatus, the connecting information being set to specify whether or not to establish connection with the information providing apparatus; if the connecting information is set to establish connection with the information providing apparatus, then establishing connection with the information providing apparatus based on the stored name of the information providing apparatus; and if connection is established with the information providing apparatus, then receiving the image data and the sound data from the information providing apparatus.

According to a fourth aspect of the invention, there is provided a program for use by a computer for controlling an information processing apparatus for displaying images and outputting sounds based on image data and sound data representing a TV program, the image data and the sound data being provided by an information providing apparatus, the program causing the computer to execute the steps of: storing connecting information and a name of the information providing apparatus, the connecting information being set to specify whether or not to establish connection with the information providing apparatus; if the connecting information is set to establish connection with the information providing apparatus, then establishing connection with the information providing apparatus based on the stored name of the information providing apparatus; and if connection is established with the information providing apparatus, then receiving the image data and the sound data from the information providing apparatus.

Where the inventive information processing apparatus, information processing method, and program are in use, the apparatus is arranged to include connecting information set to specify whether or not to establish connection with an information providing apparatus and a storing element for storing the name of the information providing apparatus. If the connecting information is judged set to establish connection, then the information processing apparatus establishes connection with the information providing apparatus based on the stored name of the latter, so that the image data and sound data are received from the information providing apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 28 is a tabular view listing function data;

FIG. 41 is a schematic view of a window displayed on a display unit of the personal computer by an unattended recording reservation program;

FIG. 55 is a flowchart of steps constituting a module group reporting process.

DESCRIPTION OF THE PREFERRED EMBODIMENTS

Figure 1:
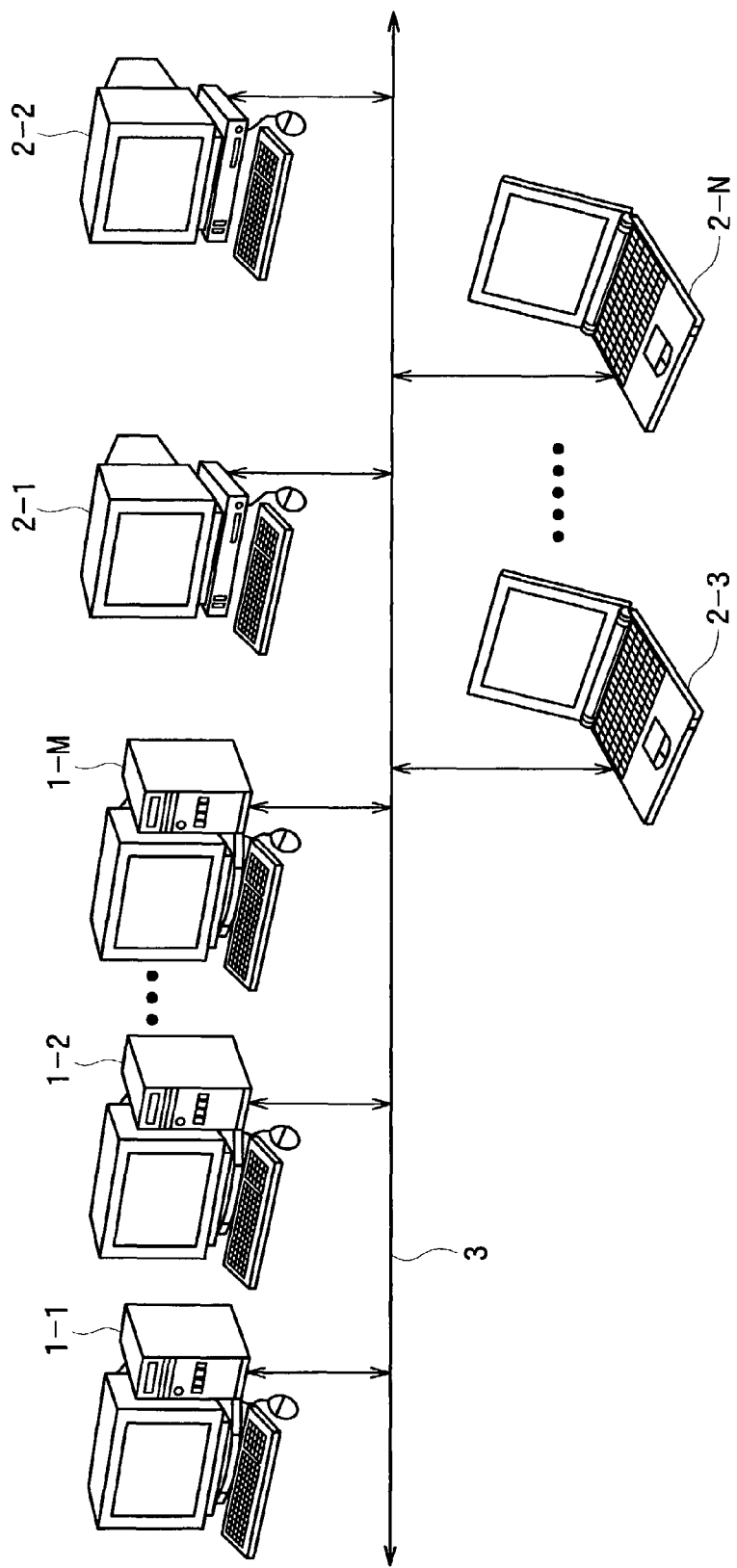
FIG. 1 is a schematic view showing a structure of a content providing system as a first embodiment of this invention.

FIG. 1 is a schematic view showing a structure of a content providing system as the first embodiment of this invention. A server 1-1 acting as a content providing apparatus is connected via a network 3 to personal computers 2-1 through 2-N acting as clients. In this setup, the server provides the clients with contents made up of image data representing moving or static images and of sound data such as music data. Other servers 1-2 through 1-M acting as content providing apparatuses are also connected via the network 3 to the personal computers 2-1 through 2-N acting as clients. Each of these servers also provides the clients with contents including image data and sound data.

The servers 1-1 through 1-M each store contents such as image data and sound data. These servers are also designed to receive broadcast programs constituted by images and sounds or by sounds only.

The contents provided by any of the servers 1-1 through 1-M are of two kinds: those stored beforehand in the servers, and those representative of broadcast programs received by the servers.

Each of the servers 1-1 through 1-M accommodates contents including MPEG (Moving Picture Experts Group) image data and/or sound data. These servers also have antennas (not shown) receiving terrestrial or satellite-relayed radio waves transmitted from TV stations, and decodes signals fed from the antennas to generate image data and/or sound data representing received broadcast programs.

The servers 1-1 through 1-M each transmit stored contents to any one of the personal computers 2-1 through 2-N in one of two ways: using a file accommodating stored contents, or in the form of a data stream such as an MPEG transport stream or an MPEG packetized elementary stream.

When the servers 1-1 through 1-M each transmit received broadcast program contents to any one of the personal computers 2-1 through 2-N, the transmission is accomplished only in the form of a data stream such as the MPEG transport stream or MPEG packetized elementary stream.

The server 1-1 may receive a request for contents over the network 3 from the personal computer 2-1 acting as a client. In that case, the server 2-1 transmits requested contents to the personal computer 2-1 in response.

When the personal computer 2-1 acting as a client receives a file accommodating contents from the server 1-1, the personal computer 2-1 records the received contents. The personal computer may later reproduce the contents thus recorded.

When the personal computer 2-1 receives a stream of contents from the server 1-1, the personal computer reproduces the contents being received.

The server 1-1 may also receive a request for contents over the network 3 from any one of the personal computers 2-2 through 2-N acting as clients. In such a case, the server 1-1 transmits the requested contents to the requesting personal computer.

When any one of the personal computers 2-2 through 2-N as clients receives a file of contents from the server 1-1, the personal computer in question records the received contents. The personal computer may later reproduce the contents thus recorded.

When any one of the personal computers 2-2 through 2-N receives a stream of contents from the server 1-1, the personal computer in question reproduces the contents being received.

The servers 1-2 through 1-M may each receive a request for contents over the network 3 from the personal computer 2-1 acting as a client. In that case, the server in question transmits the requested contents to the requesting personal computer 2-1.

When the personal computer 2-1 acting as a client receives a file of contents from any one of the servers 1-2 through 1-M, the personal computer 2-1 records the received contents. When the personal computer 2-1 receives a stream of contents from any one of the servers 1-2 through 1-M, the personal computer 2-1 reproduces the contents being received.

The servers 1-2 through 1-M may each receive a request for contents over the network 3 from any one of the personal computers 2-2 through 2-N acting as clients. In such a case, the server in question transmits the requested contents to the requesting personal computer.

When one of the personal computers 2-2 through 2-N acting as clients receives a file of contents from any one of the servers 1-2 through 1-M, the personal computer in question records the received contents. When one of the personal computers 2-2 through 2-N receives a stream of contents from any one of the servers 1-2 through 1-M, the personal computer in question reproduces the contents being received.

Each of the servers 1-1 through 1-M can function as a chat server. When connected to a plurality of the personal computers 2-1 through 2-N acting as clients, the chat server provides the connected clients with a chat service.

Illustratively, the personal computer 2-1 as a client may transmit text data for chat to the server 1-1 over the network 3. On receiving the chat text data from the personal computer 2-1, the server 1-1 forwards the received text data for chat to those of the personal computers 2-2 through 2-N which are being connected.

Likewise, any one of the personal computers 2-2 through 2-N may transmit text data for chat to one of the servers 1-2 through 1-M over the network 3. In turn, the server in question receives the chat text data from the transmitting personal computer and forwards the received data to the other connected clients among the personal computers 2-1 through 2-N.

The network 3 may be any one of technically acceptable networks including a local area network and the Internet. Illustratively, the network 3 may be an IEEE (Institute of Electrical and Electronics Engineers) 1394-based or a 100 BASE-T network. The type of the network 3 is not limitative of this invention.

In the description that follows, the servers 1-1 through 1-M will be simply called the server 1 if there is no need to make distinction therebetween. Likewise the personal computers 2-1 through 2-N will be simply called the personal computer 2 if they need not be distinguished from one another.

Figure 2:
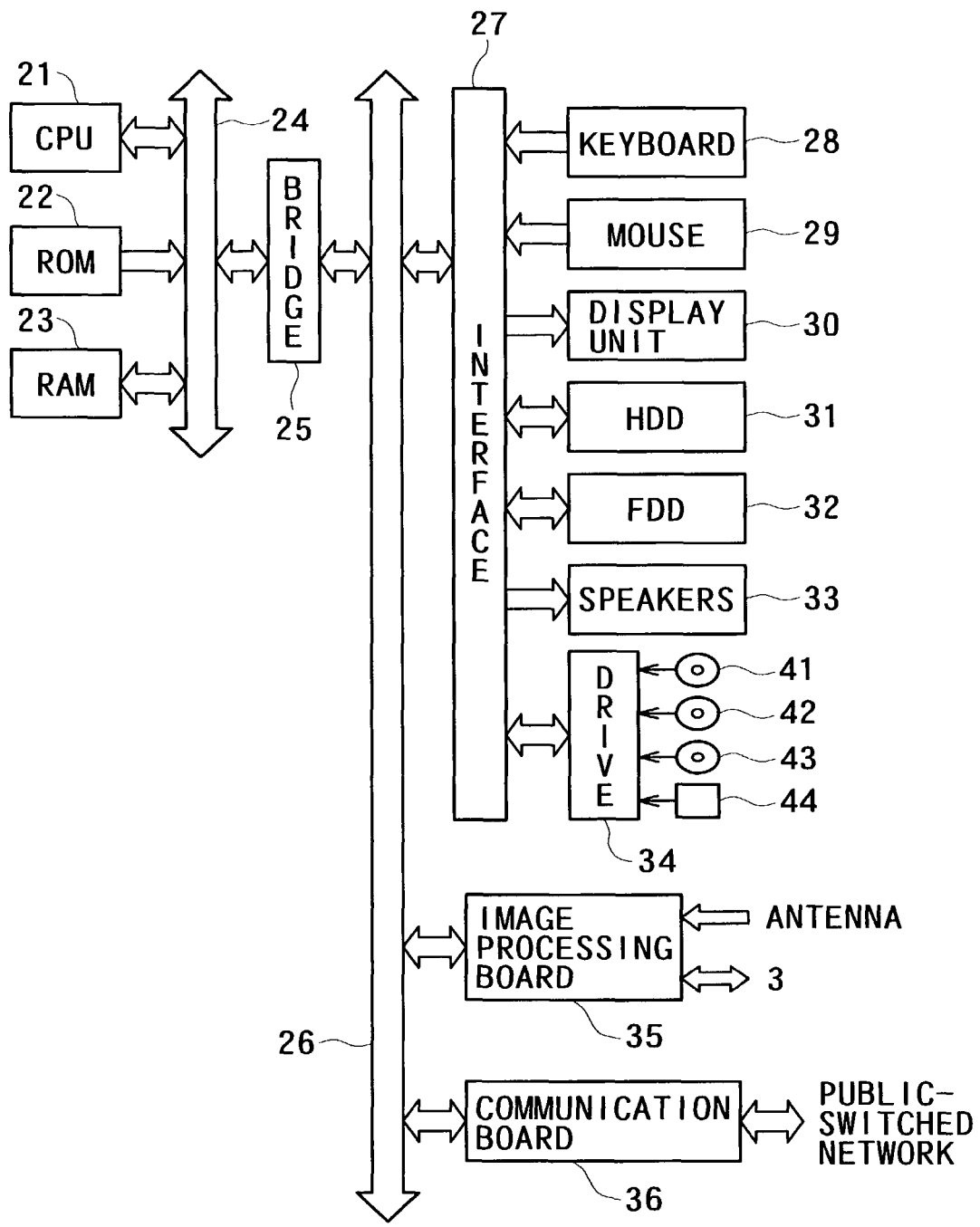
FIG. 2 is a block diagram depicting a structure of a server as part of the first embodiment.

FIG. 2 is a block diagram outlining a typical structure of the server 1. A CPU (central processing unit) 21 executes an operating system (OS) and application programs, to be described later with FIG. 4, on the server 1. A ROM (read-only memory) 22 accommodates basically fixed data as part of the programs and operation parameters used by the CPU 21. A RAM (random-access memory) 23 stores programs executed by the CPU 21 and parameters that are varied as needed during the execution. These component parts are interconnected by a host bus 24.

The host bus 24 is connected via a bridge 25 to an external bus 26 such as a PCI (Peripheral Component Interconnect/Interface) bus.

A keyboard 28 is operated by a user to enter various commands into the CPU 21. A mouse 29 is manipulated by the user to point to and select items on a display unit 30. The display unit 30 is constituted by a CRT (cathode ray tube) or a liquid crystal display (LCD) displaying diverse kinds of information in text and image. A hard disc drive (HDD) 31 and a floppy (registered trademark) disc drive 32 drive a hard disc and a floppy disc respectively so that programs and information to be handled by the CPU 21 may be written to or read from the disc in question. Speakers 33 are provided to reproduce sounds.

A drive 34 reads programs or data from a magnetic disc 41, an optical disc 42, a magneto-optical disc 43, or a semiconductor memory 44 loaded in the drive. The retrieved programs or data are supplied to the HDD 31 or RAM 23.

The components ranging from the keyboard 28 to the drive 34 are connected to an interface 27. In turn, the interface 27 is connected to the CPU 21 via the external bus 26, bridge 25, and host bus 24.

An image processing board 35 under control of the CPU 21 generates image and sound data based on signals coming from an antenna, not shown, the generated data being representative of broadcast programs that have been captured by the antenna. The image and sound data are output to the HDD 31 over the external bus 26 and through the interface 27.

The image processing board 35 under control of the CPU 21 also generates a stream of image and sound data based on signals coming from the antenna, not shown, the generated data stream being representative of broadcast programs that have been captured by the antenna. The data stream is output to any one of the personal computers 2-1 through 2-N over the network 3.

Under control of the CPU 21, the image processing board 35 inputs a file of image or sound data from the HDD 31 over the external bus 26 and through the interface 27, and transmits the input file to any one of the personal computers 2-1 through 2-N over the network 3. Also under control of the CPU 21, the image processing board 35 retrieves image or sound data from the HDD 31 to generate a data stream representing the retrieved image or sound data, and transmits the generated data stream to any one of the personal computers 2-1 through 2-N over the network 3.

The image processing board 35 is connected to the CPU 21 via the external bus 26, bridge 25, and host bus 24.

A communication board 36 may illustratively be a modem board communicating with other personal computers or servers via a public-switched network made up of telephone lines.

Figure 3:
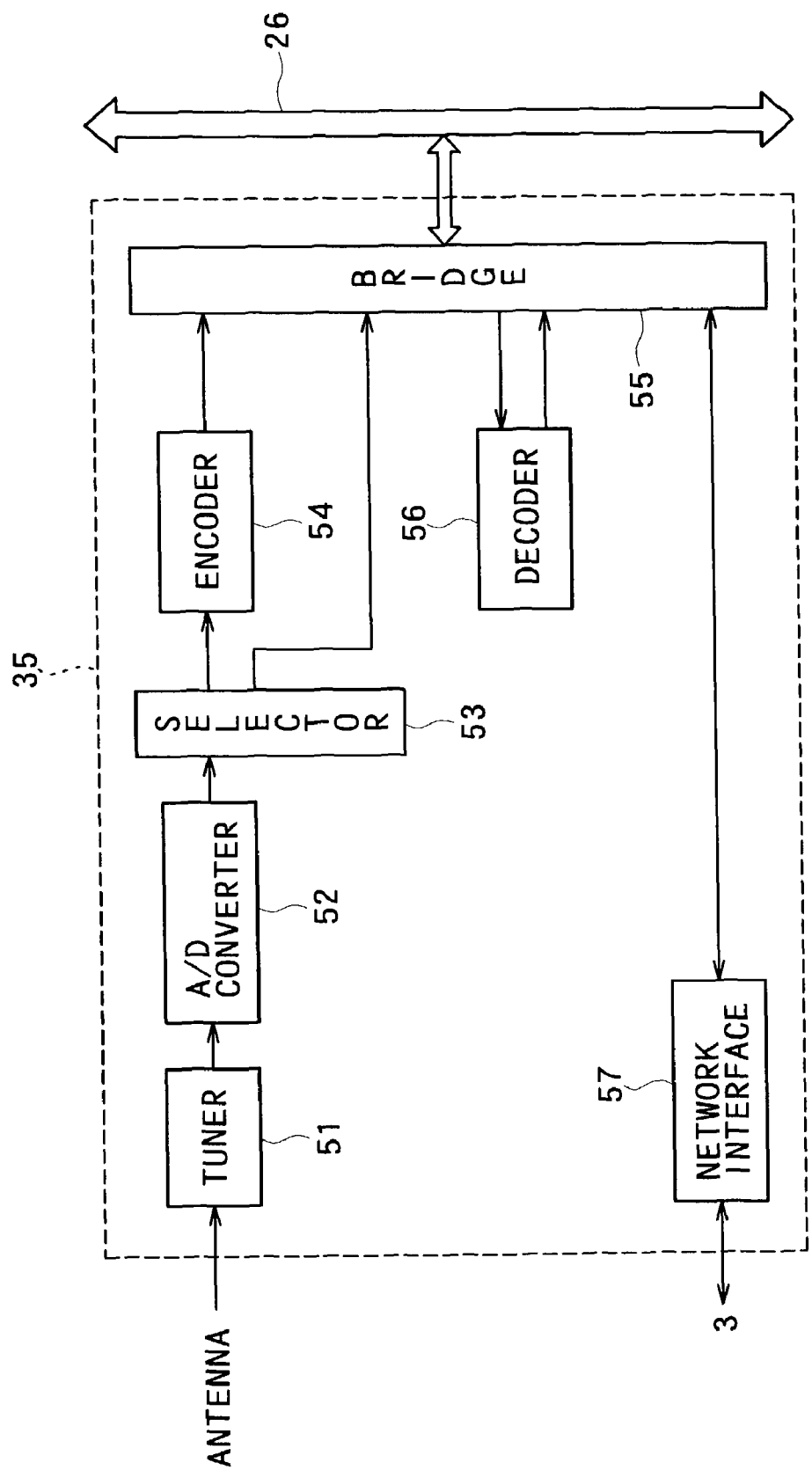
FIG. 3 is a block diagram illustrating a structure of an image processing board as part of the server.

FIG. 3 is a block diagram illustrating a typical structure of the image processing board 35. In FIG. 3, a tuner 51 acquires externally supplied TV broadcast signals under control of the CPU 21 and selects the broadcast program on a specific channel out of a plurality of TV channels. The tuner 51 then supplies an A/D (analog-to-digital) converter 52 with analog signals representing the images and sounds of the TV program on the selected channel.

The A/D converter 52 converts the image and sound analog signals representative of the program images and sounds into digital signals, and outputs the converted digital signals to a selector 53.

Where the broadcast TV program is to be recorded to the HDD 31 or transmitted to the personal computer 2 as a stream of digital signals, the selector 53 forwards the digital signals coming from the A/D converter 52 to an encoder 54. If the TV program is to be reproduced on the display unit 30 and through the speakers 33, the selector 53 forwards the digital signals from the A/D converter 52 to a bridge 55.

If the TV program is to be recorded to the HDD 31, or transmitted as a stream of digital signals to the personal computer 2 while being reproduced on the display unit 30 and through the speakers 33, then the selector 53 supplies the digital signals from the A/D converter 52 to both the encoder 54 and the bridge 55 simultaneously.

Given the digital signals representing the program images and sounds from the selector 53, the encoder 54 codes the received signals according to a suitable compression coding method such as MPEG. The coded image and sound data are fed from the encoder 54 to the bride 55.

Through the bridge 55, a decoder 56 may be supplied with the coded image and sound data having undergone compression coding based on the suitable method such as MPEG. In that case, the decoder 56 decodes the coded image and sound data received back to digital signals. After decoding, the digital signals are sent from the decoder 56 to the bridge 55.

Where the coded image data and sound data representing the TV broadcast program are to be recorded to the HDD 31, the bridge 55 forwards the coded data coming from the encoder 54 to the HDD 31 over the external bus 26. If the TV program is to be reproduced on the display unit 30 and through the speakers 33, then the bridge 55 feeds the display unit 30 with digital image signals coming from the A/D converter 52 via the selector 53 while concurrently supplying digital sound signals to the speakers 33 over the external bus 26 and through the interface 27.

Where the coded image and sound data are to be reproduced from the HDD 31, the bridge 55 transfers the coded data of interest from the HDD 31 to the decoder 56. The bridge 55 supplies digital image signals coming from the decoder 56 to the display unit 30 over the external bus 26 and through the interface 27 while concurrently feeding digital sound signals from the decoder 56 to the speakers 33 over the external bus 26 and through the interface 27.

When reproducing a TV program, the display unit 30 displays TV program images based on the digital or analog signals fed through the interface 27, the analog signals having undergone a predetermined conversion process.

On reproducing the TV program, the speakers 33 reproduce TV program sounds reflecting the digital or analog signals fed through the interface 27, the analog signals having undergone the predetermined conversion process.

A network interface 57 receives a content request from the personal computer 2 over the network 3. The received request is forwarded from the network interface 57 to the CPU 21 or RAM 23 through the bridge 55 and over the external bus 26.

When transmitting content to the personal computer 2 in response to the request therefrom, the bridge 55 feeds the network interface 57 with coded image or sound data from the encoder 54 or with coded data from the HDD 31. Under control of the CPU 21, the coded data from the HDD 31 are sent either in a single file or as a data stream from the bridge 55 to the network interface 57.

Given the coded image or sound data from the bridge 55, the network interface 57 illustratively puts the data in packets and transmits the packetized data to the personal computer 2 over the network 3.

Figure 4:
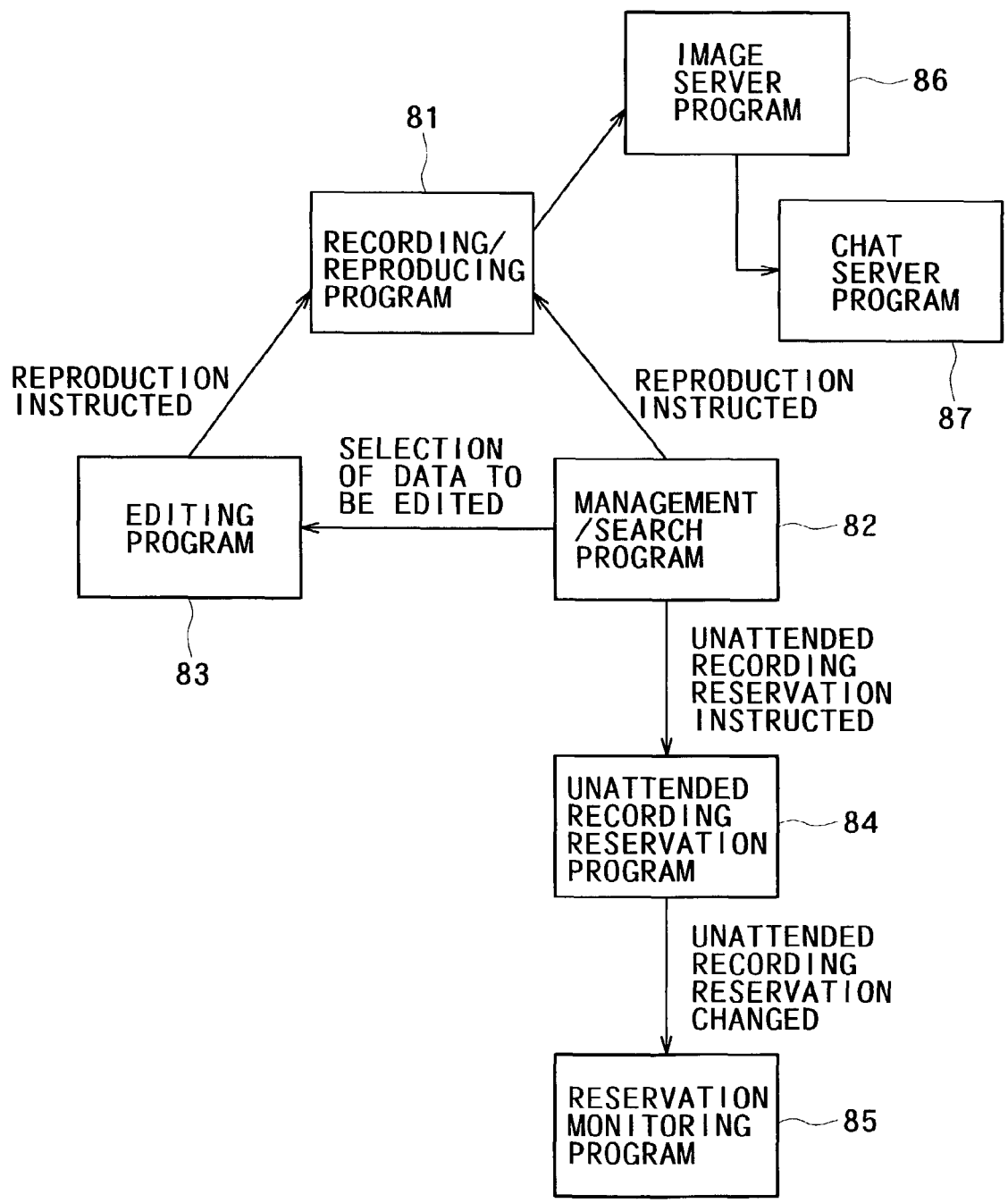
FIG. 4 is an explanatory view of application programs performed by the server.

FIG. 4 is an explanatory view of application programs performed by the server 1. A recording/reproducing program 81 causes the image processing board 35 to convert analog image and sound signals into coded image and sound data in MPEG format, the analog image and sound signals being representative of the TV program content on a specific channel received by the tuner 51. The content data thus coded are recorded to the HDD 31.

The recording/reproducing program 81 causes the image processing board 35 to decode content data from the HDD 31 so as to generate digital image and sound signals that are uncompressed. Under control of the recording/reproducing program 81, the image processing board 35 causes the display unit 30 to display images and the speakers 33 to output sounds reflecting the decompressed digital signals.

A management/search program 82 causes the display unit 30 to display specific information such as details of contents recorded on the HDD 31 as well as dates and times at which such recordings were made. The management/search program 82 instructs the recording/reproducing program 81 to reproduce a specific content or to select the content to be edited. The management/search program 82 supplies information on the selected content to an editing program 83 for editing purposes. Furthermore, the management/search program 82 gives an unattended recording instruction to an unattended recording reservation program 84.

Based on the content data recorded on the HDD 31, the editing program 83 edits images and sounds of the selected content (i.e., some images and sounds included in the specific content are put together) so as to generate content data in a predetermined format for reproduction of edited images and sounds.

Illustratively, a content in the predetermined format does not include digital image or sound data and is constituted instead by information for designating both the selected content and the images and sounds to be utilized. Such a content may be reproduced by the recording/reproducing program 81.

Given suitable settings, the unattended recording reservation program 84 reserves the content to be recorded unattended. The reserved content complies with the current settings in place (such as recording time and recording mode determining the image quality of recording) and is assigned a storage space beforehand on the HDD 31.

A reservation monitoring program 85 runs constantly when the server 1 is in operation (i.e., the program 85 is resident while the OS is running). As such, the reservation monitoring program 85 executes unattended recording of the content reserved by the unattended recording reservation program 84 in keeping with an RTC (real time clock), not shown. The reservation monitoring program 85 also permits modifications of the settings of the content subject to unattended recording.

An image server program 86 causes the image processing board 35 to generate coded data (i.e., MPEG-format image and sound data) representing the TV program on a specific channel received by the tuner 51. Under control of the image server program 86, the image processing board 35 then transmits the coded data generated to represent the image and sound data to the personal computer 2 over the network 3.

The image server program 86 also causes the image processing board 35 to transfer coded data denoting MPEG-format image and sound data from the HDD 31 where the data have been recorded, to the personal computer 2 over the network 3.

A chat server program 87 causes the image processing board 35 to receive text data from any one client among the personal computers 2-1 through 2-N. Under control of the chat server program 87, the image processing board 35 forwards the received text data to another client among the personal computers 2-1 through 2-N.

Figure 5:
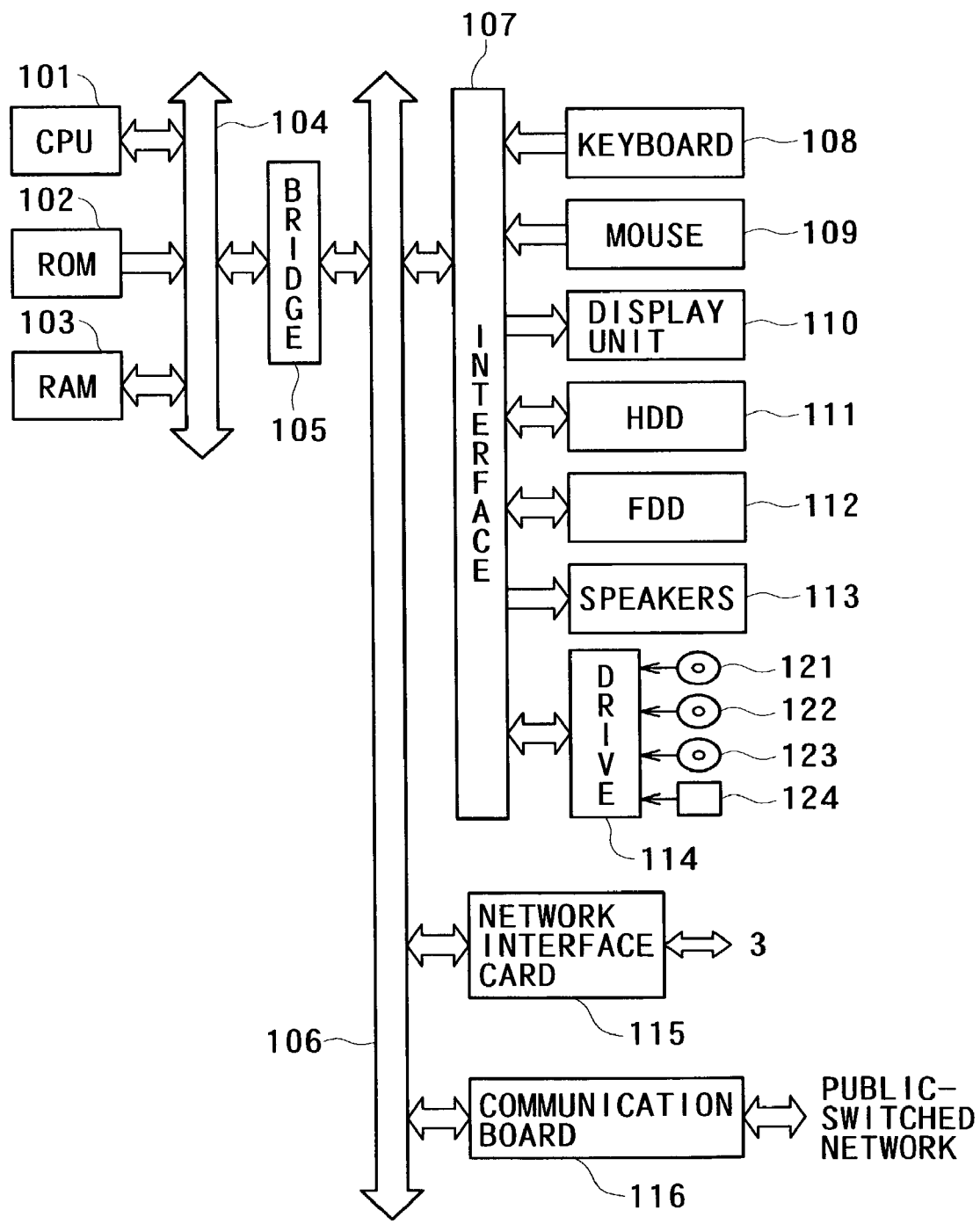
FIG. 5 is a block diagram indicating a structure of a personal computer as part of the first embodiment.

FIG. 5 is a block diagram indicating a typical structure of the personal computer 2. A CPU (central processing unit) 101 executes an OS and application programs, to be described later with FIG. 6, on the personal computer 2. A ROM 102 accommodates basically fixed data as part of the programs and operation parameters used by the CPU 101. A RAM 103 stores programs executed by the CPU 101 and parameters that are varied as needed during the execution. These component parts are interconnected by a host bus 104.

The host bus 104 is connected via a bridge 105 to an external bus 106 such as a PCI bus.

A keyboard 108 is operated by a user to enter various commands into the CPU 101. A mouse 109 is manipulated by the user to point to and select items on a display unit 110. The display unit 110 is constituted by a CRT or a liquid crystal display displaying diverse kinds of information in text and image. A hard disc drive (HDD) 111 and a floppy (registered trademark) disc drive 112 drive a hard disc and a floppy disc respectively so that programs and information to be handled by the CPU 101 may be written to or read from the disc in question. Speakers 113 are provided to reproduce sounds.

A drive 114 reads programs or data from a magnetic disc 121, an optical disc 122, a magneto-optical disc 123, or a semiconductor memory 124 loaded in the drive. The retrieved programs or data are supplied to the HDD 111 or RAM 103.

The components ranging from the keyboard 108 to the drive 114 are connected to an interface 107. In turn, the interface 107 is connected to the CPU 101 via the external bus 106, bridge 105, and host bus 104.

A network interface card 115 under control of the CPU 101 receives a data stream from the server 1 over the network 3. The stream thus received is forwarded to the RAM 103 through the external bus 106, bridge 105, and host bus 104.

Also under control of the CPU 101, the network interface card 115 receives a single file of data from the server over the network 1. The received data in the file are sent to the HDD 111 over the external bus 106 and through the interface 107.

The network interface card 115 is connected to the CPU 101 through the external bus 106, bridge 105, and host bus 104.

A communication board 116 may illustratively be a modem board communicating with other personal computers or servers via a public-switched network constituted by telephone lines.

Figure 6:
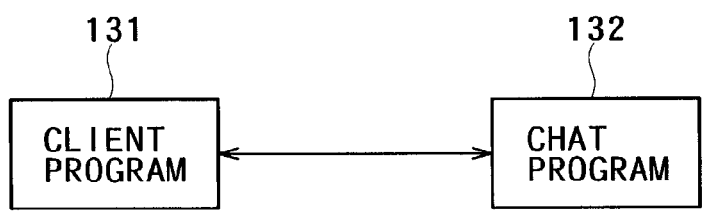
FIG. 6 is an explanatory view of application programs performed by the personal computer.

FIG. 6 is an explanatory view of application programs performed by the personal computer 2 acting as a client. A client program 131 causes the network interface card 115 to transmit a content request to the server 1 over the network 3. With image and sound data (i.e., content) sent back from the server 1 over the network 3, the client program 131 causes the network interface card 115 to receive the returned data. Under control of the client program 131, the network interface card 115 receives the content either in a single file or as a data stream.

On receiving the content data, the client program 131 either causes the HDD 111 to record the received data, or displays images on the display unit 110 while concurrently outputting sounds through the speakers 113.

A chat program 132 causes the display unit 110 to display text data entered through the keyboard 108 while simultaneously making the network interface card 115 transmit the text data to the server 1 over the network 3.

The chat program 132 causes the network interface card 115 to receive text data from the server 1 over the network 3. The chat program 132 then causes the display unit 110 to display characters representing the received text data.

What follows is a description of commands and messages used by the image server program 86 and client program 131, as well as commands and messages employed by the chat server program 87 and chat program 132.

Connection between the image server program 86 and the client program 131 is established illustratively through a port 3862. The image server program 86 and client program 131 exchange data therebetween on a TCP/IP text basis. Commands and responses are each delimited by a line feed code ('¥n'). When getting ready to accept the next command, the image server program 86 transmits a period ('.') to the client program 131.

If any unacceptable character string (command) is transmitted or received between the image server program 86 and the client program 131, an error can occur. The error is displayed in the form of "Error (with an error number)."

The image server program 86 and client program 131 communicate with each other basically in the following steps:

Initially, the client program 131 transmits a command 1 to the image server program 86. Upon receipt of the command 1, the image server program 86 sends a response to the client program 131. Having dealt with the received response, the image server program 86 transmits to the client program 131 a period "." indicating that the image server program 86 is ready to accept the next command. In turn, the client program 131 transmits a command 2 (next command) to the image server program 86. The steps above are repeated as needed.

Exchanges of commands between the image server program 86 and the client program 131 can be monitored on a log screen of the image server program 86.

Illustratively, if it is desired to record as many log entries as possible, the following registry (DWORD value) need only be created anew:
HKEY_CURRENT_USER¥Software¥Sony Corporation¥Yebisu¥ GigaPocketServer¥Settings¥Message Level The greater the DWORD value, the more log entries that can be recorded. The maximum allowable DWORD value is about 0×10. In the above registry, the part "¥GigaPocket Server" indicates the folder that contains the image server program 86.

The client program 131 may browse the server 1 which executes the image server program 86 and which exists on the network 3. When the process below is carried out, the client program 131 can acquire the computer name of the server 1. Specifically, the client program 131 is set to transmit an IP (Internet Protocol) address of 255.255.255.255 in broadcasting a character string "Giga Pocket message: What is your name?" through the 3862 port under UDP (User Datagram Protocol). Transmitting the IP address causes the image server program 86 to return a response "Giga Pocket message: My name is SERVER" to the 3862 port under UDP. The part "Giga Pocket message:" indicates that the character string in question is a command or a response exchanged between the image server program 86 and the client program 131. The part "SERVER" denotes the computer name of the server 1.

Suppose that there exist on the network 3 three servers 1 named "SABA," "KAME" and "UNAGI" each executing the image server program 86. In that case, given the message "Giga Pocket message: What is your name?" broadcast by the client program 131, these servers 1 return in an arbitrary order the following responses:
Giga Pocket message: My name is KAME
Giga Pocket message: My name is SABA
Giga Pocket message: My name is UNAGI The above feature allows the client program 131 to know the servers 1 executing the image server program 86 on the network 3. The users, for their part, can select a desired server 1 without entering a specific server name into a dialog box or the like.

Each of the commands provided for use by the image server program 86 is described below.

An "initialize" command is described as "Initialize [P=<pass word>]." The part <pass word> denotes a character string password. Although there are no restrictions on the number of characters used in the password, only the high-order eight bytes of the password are used for authentication.

The initialize command is used to initialize the image server program 86 preparatory to communication. After connection is established with the image server program 86, the image server program 86 must be made to execute the initialize command once. If no password is set for the image server program 86, there is no need to designate <pass word>. The password is not in plain text but is encrypted.

When the entered password is correct, the image server program 86 transmits to the client program 131 a character string "Initialize OK" as a response to the initialize command. If the password is not correct and initialization has failed, then the image server program 86 transmits a period "." to the client program 131 in response to the initialize command.

A "help" command is described as "Help." This command is used to display a command list of the image server program 86. In response to the help command, the image server program 86 transmits the command list to the client program 131.

A "create tape" command is described as "CreateTape <quality> [N=<video capsule name>]. The part <quality> accommodates a value of 0, 1 or 2 designating the image quality of contents. That is, the value 0 stands for high quality, 1 for standard quality, and 2 for long-play quality. The part <video capsule name> denotes the name of a particular content.

The create tape command causes the image server program 86 to create a content named <video capsule name> in an appropriate cabinet. A cabinet is a unit in which to store at least one content.

If the part <video capsule name> is not designated, the image server program 86 automatically generates a name of the content. It is also possible to establish a name and a memo for the created content through the use of a "set tape name" command or a "set memo" command, to be described later.

Upon receipt of the create tape command, the image server program 86 transmits a response "NewTapeID: <tapeID>" to the client program 131. The part <tapeID> denotes an ID of the newly created content.

A "create reserve" command is described as "CreateReserve <tapeID> S=yyyy/mm/dd, hh:mm;ss E=yyyy/mm/dd, hh:mm:ss CH=<No.>, <caption>." The part <tapeID> stands for a content number that may be acquired using the create tape command. The part "yyyy/mm/dd, hh:mm:ss" represents the year, month, day, hours, minutes, and seconds for the reservation in question. The character "S" means a starting date and time, and "E" signifies an ending date and time.

The part <No.> stands for a channel number and <caption> for a channel name (i.e., character string). For example, the part <caption> may contain "NHK Educational."

The create reserve command causes the image server program 86 to reserve a content anew for unattended recording. Prior to execution of the create reserve command, it is necessary to carry out the create tape command so as to obtain the number <tapeID> of the content to be created anew. The channel number <No.> and name <caption> are acquired by use of an "acquire channel" command.

When successfully reserving a content for unattended recording in response to the create reserve command, the image server program 86 transmits "reserveID: <reserveID>" to the client program 131. If reservation of a content for unattended recording has failed, then the image server program 86 transmits "parameter error" to the client program 131. The part <reserveID> represents a recording ID. Illustratively, unattended recording reservation can be unsuccessful if the server 1 has no free storage area.

A "delete tape" command is described as "DeleteTape <tapeID> [<0=movie only>]. The part <tapeID> indicates a content number. If the value 0 is set for <0=movie only>, then MPEG data alone are deleted.

The delete tape command causes the image server program 86 to delete a content from the server 1. If the part "movie only" is designated, the image server program 86 deletes only the moving image data and leaves intact the database and index information constituting data (such as attribute data) related to the moving image data. Upon receipt of the delete tape command, the image server program 86 transmits a response "Deleted: <tapeID>" to the client program 131. The part <tapeID> indicates the content number of the deleted content.

A "first tape" command is described as "FirstTape." The first tape command, used in combination with a "next tape" command to be described later, permits acquisition of IDs of contents recorded in the server 1. Before execution of the next tape command, the first tape command must be carried out. Usually a "get tape list" command, to be described later, is used to acquire a list of IDs of all contents recorded in the server 1.

Given the first tape command, the image server program 86 transmits a response "ID: <tapeID>" to the client program 131. The part <tapeID> denotes the ID of the first content detected.

The next tape command is described as "NextTape." The next tape command, used in combination with the first tape command, permits acquisition of the IDs of contents held in the server 1. The first tape command must be executed before the next tape command is carried out.

Upon receipt of the next tape command, the image server program 86 transmits a response "ID: <tapeID>" to the client program 131. The part <tapeID> indicates the ID of the content detected.

A "first library" command is described as "FirstLib." This command is used in combination with a "next library" command, to be described later, to acquire IDs of cabinets that exist in the server 1. Prior to execution of the next library command, the first library command must be carried out. Usually, a "get library list" command is used to obtain a list of the IDs of all cabinets recorded in the server 1.

Given the first library command, the image server program 86 transmits a response "libID: <libID>" to the client program 131. The part <libID> indicates the ID of the first cabinet detected.

The next library command is described as "NextLib." The next library command is used in combination with the first library command in order to obtain the IDs of cabinets that exist in the server 1. The first library command must be executed before the next library command is carried out.

Upon receipt of the next library command, the image server program 86 transmits a response "libID: <libID>" to the client program 131. The part "libID" denotes the ID of the first cabinet detected.

A "get library" command is described as "GetLibList." The get library command is used to acquire a list of IDs and names of cabinets.

In response to the get library command received, the image server program 86 transmits to the client program 131 a list "lib-list: <libID> N=<lib name>" reflecting the number of existing cabinets. The part <libID> stands for cabinet IDs and <lib name> for cabinet names.

A "get tape list" command is described as "GetTapeList <arg>." The part <arg> denotes an argument for limiting the types of contents to be acquired. If the value 0 is set for <arg>, the IDs and names of all contents are acquired; if the value set for <arg> is other than 0, then the IDs and names of ordinary contents are acquired. The get tape list command is thus used to acquire a list of IDs and names of cabinets.

In response to the get tape list command received, the image server program 86 transmits to the client program 131 a character string "tape-list: <tapeID> <libID> <type> N=<video capsule name>" reflecting the number of existing contents. The part <tapeID> stands for content numbers and <libID> for cabinet IDs. The part <tape> accommodates one of N, L, I, P, E, R, and "*" (asterisk). The character N stands for an ordinary content, L for a list, I for scene information only, E for error, P for parental supervision required, R for reservation, and "*" for recording in progress. The part <video capsule name> denotes the name of the content.

A "get reserve list" command is described as "GetreserveList." The get reserve list command is used to display a list of contents reserved for unattended recording.

In response to the get reserve list command received, the image server program 86 transmits to the client program 131 a character string "reserve-list: <reserveID> <tapeID> S=yyyy/mm/dd, hh:mm E=yyyy/mm/dd, hh:mm N=<video capsule name>" reflecting the number of existing reservations. The part <reserveID> stands for a reservation ID, <tapeID> for a content ID, and "yyyy/mm/dd, hh:mm:ss" for the year, month, day, hours, minutes and seconds for the reservation in question. The character S stands for a starting date and time, E for an ending date and time, and <video capsule name> for the name of the content.

A "get tape info" command is described as "GetTapeInfo <tapeID>." The part <tapeID> represents the ID of the content whose information is desired to be acquired. The get tape info command is thus used to obtain content information.

A "get library info" command is described as "GetLibInfo <libID>." The part <libID> denotes the ID of the cabinet whose information is desired to be obtained. The get library info command is thus used to acquire cabinet information.

A "get channel" command is described as "GetChannel." The get channel command is used to display channel information.

In response to the get channel command received, the image server program 86 transmits to the client program 131 a character string "CH-DB: <No.>, <caption>, <caption1> [, <caption2> [, . . . . ]]]" reflecting the number of existing channels. The part <No.> stands for a channel number, <caption> for the most common channel name, <caption 1> for a first channel name, and <caption 2> for a second channel name. For example, the character string "CH-DB: <No.>, <caption>, <caption1> [, <caption2> [, . . . . ]]]" transmitted to the client program 131 may consist of "CH-DB:3, NHK Educational, NHK Educational, NHK 2."

A "get memo" command is described as "GetMemo <tapeID>." The part <tapeID> represents the ID of the content whose information is to be acquired in the form of a memo. The get memo command is thus used to acquire a content memo.

A "set tape name" command is described as "SetTape Name <tapeID> N=<new tape name>." The part <tapeID> stands for a content ID and <new tape name> for a content name. The set tape name command is thus used to set a content name.

Given the set tape name command, the image server program 86 transmits a response "new tape name: <new tape name>" to the client program 131. The part <new tape name> denotes the content name in question.

A "set memo" command is described as "SetMemo<tapeID> M=<memo string>." The part <tapeID> represents a content ID. The part <memo string> denotes a memo composed of a character string. The set memo command is thus used to set a memo for the content. Given the set memo command, the image server program 86 transmits a response "OK" to the client program 131.

A "get movie size" command is described as "GetMovieSize <tapeID>." The part <tapeID> stands for a content ID. The get movie size command is thus used to obtain the size of a content file.

Upon receipt of the get movie size command, the image server program 86 transmits a response "MovieSize: <size>" to the client program 131. The part <size> denotes the size of an MPEG file.

A "get index size" command is described as "GetIndexSize <tapeID>." The part <tapeID> represents a content ID. The get index size command is thus used to acquire the size of an index file that stores content-related data.

On receiving the get index size command, the image server program 86 transmits a response "IndexSize: <size>" to the client program 131. The part <size> indicates the size of the index file in question.

A "get media info" command is described as "GetMediaInfo." The get media info command is used to acquire the version number of the image server program 86. Given this command, the image server program 86 transmits to the client program 131 the version number of the appropriate program held in the same folder as that of an executive directory.

Given the get media info command, the image server program 86 transmits a response "MediaInfo: <size1> <size2> <hh:mm:ss1> <hh:mm:ss2> <hh:mm:ss3> to the client program 131. The part <size1> denotes the full capacity of the hard disc drive used by the image server program 86 in the server 1. The part <size2> represents a free capacity of the hard disc drive used by the image server program 86 in the server 1. The part <hh:mm:ss1> stands for a recordable time in high quality, <hh:mm:ss2> for a recordable time in standard quality, and <hhh:mm:ss3> for a recordable time in long-play quality.

A "read open tape" command is described as "ReadOpenTape <tapeID>." The part <tapeID> denotes the ID of the content desired to be reproduced.

The read open tape command is used to open a desired content in read-only mode. Whenever a content is to be reproduced, the read open tape command is always executed. Executing the read open tape command causes the client program 131 to acquire <handle>, <SSG port> and <SSX port>. Until a "close tape" command is executed, the part <handle> is used to operate the content that is opened in read-only mode. The image server program 86 in the server 1 transmits image data through the port <SSG port> and index data through the port <SSX port>. This requires that connection be established prior to execution of any one of transmission start request commands (Read SSG and Read SSX).

Upon receipt of the read open tape command, the image server program 86 transmits a response "ReadOpen: <handle> <SSG port> <SSX port>" to the client program 131. The part <handle> is self-explanatory indicating a handle. The handle is designated for the opened content to be operated, until a close tape command is carried out. The part <SSG port> denotes the number of the port through which the client program 131 receives image data. The part <SSX port> represents the number of the port through which the client program 131 receives index data.

A "close tape" command is described as "CloseTape <handle>." The part <handle> indicates the handle of the content that is opened.

The close tape command is thus used to close the content that has been opened by use of the read open tape command. When the opened content is to be terminated, it must be closed by executing the close tape command. Given the close tape command, the image server program 86 transmits a response "Tape closed" to the client program 131.

A "write open tape" command is described as "WriteOpenTape <tapeID>." The part <tapeID> denotes a content ID.

The write open tape command is used to open a content in write mode. Executing the write open tape command causes the client program 131 to acquire <handle>, <SSG port> and <SSX port>. The part <handle> is used to operate the content opened in write mode, until a write close tape command is carried out.

Connection must be established before the image server program 86 in the server 1 can transmit image data through the port <SSG port> and index data through the port <SSX port>.

On receiving the write open tape command, the image server program 86 transmits a response "WriteOpen: <handle> <SSG port> <SSX port>" to the client program 131. The part <handle> is self-explanatory representing the handle. Until a close tape command is executed, this handle is designated to operate the content that has been opened. The part <SSG port> denotes the number of the port through which the client program 131 outputs image data, and the part <SSX port> represents the number of the port through which the client program 131 outputs index data.

A "write close tape" command is described as "WriteCloseTape <handle> <size>." The part <handle> stands for the handle of the content that is opened. The part <size> denotes the number of bytes (a 64-bit integer) corresponding to the size of the data written in the opened content.

Executing the write close tape command causes the image server program 86 to close the content that has been opened by use of the write open tape command. When the opened content is to be terminated, it must be closed by executing the write close tape command.

If the size of the actually written data is equal to the part <size>, then the image server program 86 transmits to the client program 131 "Tape closed" in response to the write close tape command received. If the size of the actually write data is not equal to the part <size> and the data are thus deleted, the image server program 86 transmits to the client program 131 "Close and Delete" in response to the write close tape command received. If the size of the actually written data fails to match the part <size>, the image server program 86 transmits to the client program 131 "unmatched size" in response to the write close tape command received.

A "read SSG" command is described as "ReadSSG <handle> <read bytes>." The part <handle> denotes the handle of the content to be reproduced. The handle is acquired by use of the read open tape command.

The part <read bytes> indicates a requested read size in bytes represented by a value between 0 through 64. If the value 0 is designated, the image server program 86 executes a burst read, i.e., an operation of transmitting as much data as possible in bursts.

The read SSG command causes the image server program 86 to transmit content image data through the port <SSG port> acquired by use of the read open tape command. Before executing the read SSG command, the client program 131 must establish connection with the image server program 86 via the port <SSG port>.

In burst read mode, the image server program 86 transmits nothing to the client program 131 in response to the read SSG command received. Where burst read mode is not in effect, the image server program 86 transmits "MovieData: <handle> <size>" to the client program 131 in response to the read SSG command. The part <handle> indicates a handle and the part <size> denotes the number of bytes corresponding to the size of the image data actually transmitted by the server 1. Whether burst read mode is in effect or not, the image server program 86 may transmit "NoMoreData" to the client program 131 in response to the read SSG command, indicating that there is no more data to transfer or that the content has been transmitted to the end.

A "read head tail SSG" command is described as "ReadHeadTail SSG <handle> <size>." The part <handle> indicates a handle and the part <size> represents the requested read size in bytes.

The read head tail SSG command is used to acquire data in the size designated by the part <size> at the beginning and at the end of a content. Before executing the read head tail SSG command, the client program 131 must establish connection with the image server program 86 through the port <SSG port>. The read head tail SSG command is used to short the time required for rendering by a moving picture display program.

Given the read head tail SSG command, the image server program 86 transmits a response "HeadTailData: <handle> <size>*2" to the client program 131. The part <handle> indicates a handle and the part <size> stands for the number of bytes corresponding to the size of the data actually transmitted by the server 1.

A "seek SSG" command is described as "SeekSSG <handle> <origin> <offset>." The part <handle> indicates a content handle which is acquired by use of the read open tape command. The part <origin> denotes the origin, i.e., the position of reference from which to seek. The value 0 stands for the starting position, 1 for the current position, and 2 for the ending position. The part <offset> represents the amount of offset in bytes, specifiable within the range of LONGLONG (signed 64-bit integer).

The seek SSG command is used to move a file pointer. Although the seek SSG command may be executed in burst read mode, any already transmitted data will not be cancelled thereby. With burst read mode in effect, the seek SSG command is usually used in combination with a "pause SSG" command and a "resume SSG" command, to be described later.

Upon receipt of the seek SSG command, the image server program 86 transmits a response "Seek End: <handle>" to the client program 131. The part <handle> indicates a content handle.

A "pause SSG" command is described as "PauseSSG <handle>." The part < handle>indicates a content handle which is acquired by use of the read open tape command.

The pause SSG command is used to stop data transmission temporarily in burst read mode. If burst read mode is not in effect, the pause SSG command is ignored.

Given the pause SSG command, the image server program 86 transmits a response "Pause: <handle>" to the client program 131. The part <handle> indicates a content handle.

A "resume SSG" command is described as "ResumeSSG <handle>." The part <handle> indicates a content handle which is obtained by use of the read open tape command. The resume SSG command is used to resume the data transmission that has been stopped by use of the pause SSG command.

On receiving the resume SSG command, the image server program 86 transmits a response "Resume: <handle>" to the client program 131. The part <handle> indicates a content handle.

A "read SSX" command is described as "ReadSSX <handle> <read bytes>." The part <handle> indicates the handle of the content desired to be reproduced. The handle is acquired by use of the read open tape command. The part <read bytes> is any one of values 0 through 64 and denotes the requested read size in bytes. If the value 0 is designated, the image server program 86 executes burst read operation.

The read SSX command causes the image server program 86 to transmit content index data through the port <SSX port> acquired by use of the read open tape command. Before executing the read SSX command, the client program 131 must establish connection with the image server program 86 through the port <SSX port>.

When burst read mode is in effect, the image server program 86 transmits nothing to the client program 131 in response to the read SSX command received. With burst read mode not in effect, the image server program 86 transmits "IndexData: <handle> <size>" in response to the read SSX command. The part <handle> stands for a handle and <size> for the number of bytes corresponding to the size of the index data actually transmitted by the server 1. Whether burst read mode is in effect or not, the image server program 86 may transmit "NoMoreIndex" to the client program 131 in response to the read SSX command, indicating that there is no more data to transmit in response to the read SSX command or that the index data have been transmitted to the end.

A "seek SSX" command is described as "SeekSSX <handle> <0, 1 or 2> <offset>." The part <handle> indicates a content handle which is acquired by use of the read open tape command. The part <origin> denotes the origin, i.e., the position of reference from which to seek. The value 0 stands for the starting position, 1 for the current position, and 2 for the ending position. The part <offset> represents the amount of offset in bytes, specifiable within the range of LONGLONG (signed 64-bit integer).

The seek SSX command is used to move a file pointer. Although the seek SSX command may be executed in burst read mode, any already transmitted data will not be cancelled thereby. With burst read mode in effect, the seek SSX command is usually used in combination with a "pause SSX" command and a "resume SSX" command, to be described later.

On receiving the seek SSX command, the image server program 86 transmits a response "SeekEnd: <handle>" to the client program 131. The part <handle> indicates a content handle.

A "pause SSX" command is described as "PauseSSX <handle>." The part <handle> indicates a content handle which is acquired by use of the read open tape command.

The pause SSX command is used to stop data transmission temporarily in burst read mode. If burst read mode is not in effect, the pause SSG command is ignored.

Given the pause SSX command, the image server program 86 transmits a response "Pause: <handle>" to the client program 131. The part <handle> indicates a content handle.

A "get pico version" command is described as "GetPicoVersion." The get pico version command is used to acquire the version number of the image server program 86. Given this command, the image server program 86 transmits to the client program 131 the version number of the appropriate program held in the same folder as that of the executive directory.

Upon receipt of the get pico version command, the image server program 86 transmits a response "PicoVersion: <version>" to the client program 131. The part <version> denotes the version number of the appropriate program.

What follows is a description of commands for use by the server 1 in receiving TV broadcast programs and transmitting a data stream to the personal computers 2 acting as clients, the stream carrying contents representative of the programs being received.

Described first are commands used to acquire contents corresponding to the received TV programs from the server 1, as well as messages (asynchronous messages) transmitted from the server 1 during reception of a data stream in asynchronous relation with the transmission of all commands. It should be noted that while contents are being offered, there can be a user who is manipulating the server 1 as well as users who are already connected to the server 1 and who are viewing images of contents provided as a stream from the server 1.

The server 1 may not be always ready to transmit contents as a stream. For example, while the user at the server 1 is getting the server 1 to record TV programs, the server 1 refuses in a message any request from the client program 131 to transmit a content stream. In another example, during reception of the stream, the client program 131 may receive from the server 1 a message saying that transmission of the stream cannot continue. In such cases where the current status of content transmission is varying, asynchronous messages like those above are sent from the server 1 to all client programs 131 receiving the contents as a stream, informing the latter of the varying status.

The commands made available fall into two broad categories: commands used to transmit a content stream (including LiveStart, LiveStop, LivePause, LiveResume, and [LiveResourceOwner]), and commands for changing channels (including LiveSelectCH and LiveQueryCH).

The asynchronous messages are also classified into two types: messages related to the continuation of content transmission as a stream (including LiveLost, LiveAvailable, and LiveError), and messages associated with changing channels and audio modes (including ModeChange).

These commands and asynchronous messages are described below in more specific terms.

A "live start" command is described as "LiveStart <H|S|L>." The part <H|S|L> denotes the image quality of the content transmitted as a stream. The character H stands for high image quality, S for standard image quality, and L for long-play image quality.

The live start command is used to request the image server program 86 to transmit a content stream. The content stream is sent from the image server program 86 to the client program 131 via a port acquired in response to the command. Executing the live start command causes the image server program 86 to transmit asynchronous messages in a suitably timed manner to the client program 131. Transmission of asynchronous messages continues until a "live stop" command, to be described later, is executed.

Given the live start command, the image server program 86 transmits a response "Live: <H|S|L|I> <live handle> <port>" to the client program 131. The part <H|S|L|I> stands for the image quality of the content transmitted as a stream or for the status of the stream. The character H stands for high image quality, S for standard image quality, L for long-play quality, and I for "live transmission impossible."

The response "live transmission impossible" signifies that the server 1 is incapable of content stream transmission. This can occur when the server 1 is illustratively carrying out unattended recording of a reserved content or its hardware resources are otherwise occupied.

The part <live handle> indicates a handle as an identifier needed to execute a content stream transmission command. The part <port> indicates the number of the port through which the server 1 transmits the content stream.

A "live stop" command is described as "LiveStop <handle>." The part <handle> represents a handle which is acquired by use of the live start command or a live resume command and which identifies the content to be transmitted as a stream.

The live stop command is used to stop reception of the stream which has been started or resumed by the live start command or live resume command. Following execution of the live stop command, the image server program 86 stops transmission of asynchronous messages. Upon receipt of the live stop command, the image server program 86 transmits a response "LiveEnd" to the client program 131.

A "live pause" command is described as "LivePause <live handle>." The part <live handle> denotes a handle which is acquired by use of the live start command or live resume command and which identifies the content to be transmitted as a stream. The live pause command is thus used to request the server 1 temporarily to stop stream transmission. Given the live pause command, the image server program 86 transmits a response "LivePause" to the client program 131.

A "live resume" command is described as "LiveResume <live handle>." The part <live handle> indicates a handle which is acquired by use of the live start command or live resume command and which identifies the content to be transmitted as a stream.

The live resume command is used to request resumption of stream transmission that has been stopped temporarily by use of the live pause command. In response to the live resume command received, the image server program 86 acquires a handle and a port for the new stream to be transmitted or received. The handle that has been used so far is invalidated at this point.

On receiving the live resume command, the image server program 86 transmits a response "Live Resume: <H|S|L|> <live handle> <port>" to the client program 131. The part <H|S|L|I> stands for the image quality of the content transmitted as a stream or for the status of the stream. The character H stands for high image quality, S for standard image quality, L for long-play quality, and I for "live transmission impossible." The part <live handle> denotes an identifier which is needed to execute a content stream transmission command. The part <port> indicates the number of the port through which the server 1 transmits the content stream.

A "live resource owner" command is described as "LiveResourceOwner." The live resource owner command is used to know the cause of a failure to transmit a content stream or of an interruption of the stream.

A "live select channel" command is described as "LiveSelectCH <live handle> CH=<channel caption>." The part <live handle> indicates a handle which is acquired by use of the live start command or live resume command and which identifies the content to be transmitted as a stream. The part <channel caption> is a character string that identifies the channel. A channel name acquired by use of the get channel command is designated in the part <channel caption>.

The live select channel command is used to change the channel of the TV program to be transmitted as a content stream. Upon receipt of the live select channel command, the image server program 86 transmits a response "LiveSelectCH" to the client program 131.

A "live query channel" command is described as "LiveQueryCH <live handle>." The part <live handle> indicates a handle which is acquired by use of the live start command or live resume command and which identifies the content to be transmitted as a stream. The live query channel command is used to query the channel of the TV program to be transmitted as a content stream.

On receiving the live query channel command, the image server program 86 transmits a response "Channel: <audio mode> CH=<channel caption>" to the client program 131. The part <audio mode> indicating audio mode of the stream denotes monaural mode when set to 0, stereo mode when set to 1, or bilingual mode when set to 2. The part <channel caption> stands for the channel name.

A "live lost" message is an asynchronous message described as "LiveLost: <cause>" indicating that the stream transmission could not be sustained and is now lost. The part <cause> denotes the cause of the failure to continue the stream transmission. Given the live lost message, the client program 131 must issue either a live pause command or a live stop command.

A "live available" message is an asynchronous message described as "LiveAvailable" indicating that the interrupted stream transmission is again available. Upon receipt of the live available message, the client program 131 may transmit a live resume command to the image server program 86 to resume stream reception.

A "live error" message is an asynchronous message described as "LiveError: <cause>" indicating that some error in the server 1 interrupted continuous stream transmission and has brought it to an end. The part <cause> denotes the cause of the failure to continue the stream transmission. On receiving the live error message, the client program 131 must issue a live stop command to terminate reception of the stream.

A "mode change" message is an asynchronous message described as "ModeChange: <pos> <audio mode> CH=<channel caption>" indicating that the audio mode or the channel of the currently received stream has been changed. The part <pos> represents the time of the change in milliseconds (e.g., time corresponding to PTS (presentation time stamp) of an MPEG stream). The part <audio mode> indicating audio mode of the stream denotes monaural mode when set to 0, stereo mode when set to 1, or bilingual mode when set to 2. The part <channel caption> stands for the channel name.

Below is a description of chat-related commands and messages transmitted or received by the chat server program 87 or chat program 132. Described first are the commands for allowing users to chat with one another while connecting to the server 1. There are restrictions on the chat function: users cannot designate any specific personal computer 2 as the destination to which to transmit character strings. The transmitted character strings are broadcast to all personal computers 2 furnished with an active chat function. The character strings transmitted by use of the chat function are forwarded from the server 1 to personal computers 2 acting as clients, in asynchronous relation with the responses to the executed commands.

A "chat active" command is described as "ChatActive." The chat active command is used to activate the chat function. Any personal computer 2 with its chat function activated can chat with other personal computers 2 having the same function. A chat command, to be described later, is executed in order to transmit a chat message. The message transmitted by use of the chat command is forwarded from the server 1 to all personal computers 2 including the message-transmitting personal computer.

On receiving the chat active command, the chat server program 87 transmits a response "ChatActive" to the chat program 132. Thereafter, the chat server program 87 transmits a chat message "ChatUser: <user num>" and "Chat: <message>" to the chat program 132. The part <user num> denotes the number of clients with their chat functions activated, and the part <message> represents the chat message.

A "chat" command is described as "Chat <message strings>." The part <message strings> stands for a transmitted message composed of character strings.

The chat command, when executed, transmits the chat message to all clients whose chat functions are activated. Prior to execution of the chat command, the chat active command must be carried out to enable the chat function. The transmitted chat message is also fed to the message-transmitting personal computer as a chat asynchronous message.

The chat message is an asynchronous message described as "Chat <message strings>" indicating that a client with its chat function activated has transmitted a message. The part <message strings> represents a transmitted message made up of character strings. The transmitted chat message is also fed to the message-transmitting personal computer as an asynchronous message.

What follows is a description of what takes place when a personal computer 2 as a client connects to the server 1 via the network 3 and receives a content representative of a TV program being broadcast by the server 1.

Figure 7:
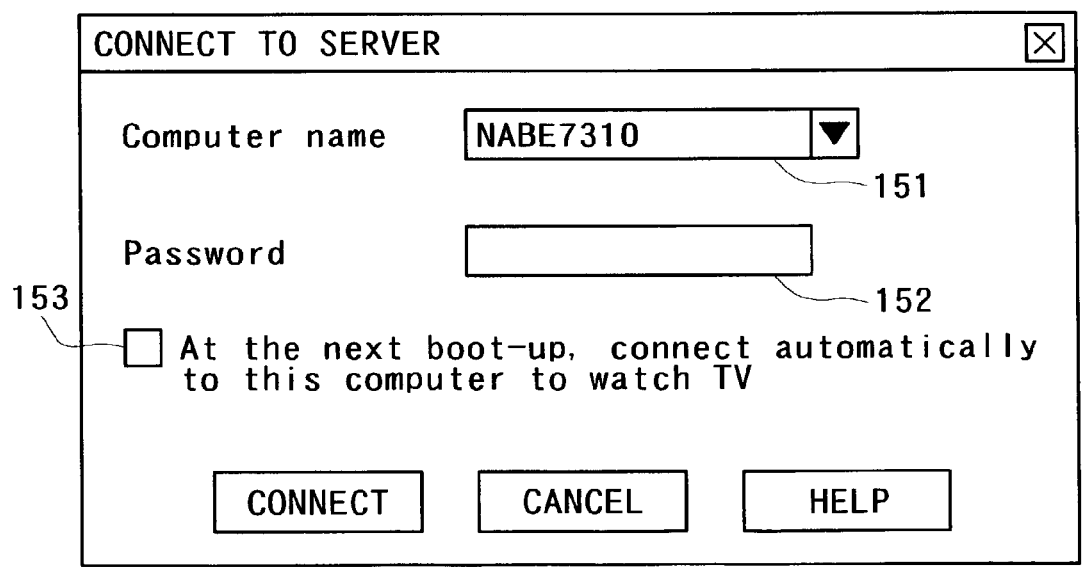
FIG. 7 is a schematic view of a dialog box.

FIG. 7 schematically shows a dialog box displayed on the display unit 110 by the client program 131 when the program 131 is booted. This dialog box is used to select a desired server 1 to connect to.

The dialog box for connecting to the desired server 1 includes: a combo box 151 into which to enter the name of the target server 1, a text box 152 to which to input a password, and a check box 153 used to specify whether or not to connect automatically to the server 1 next time the client program 131 is booted.

Figure 8:
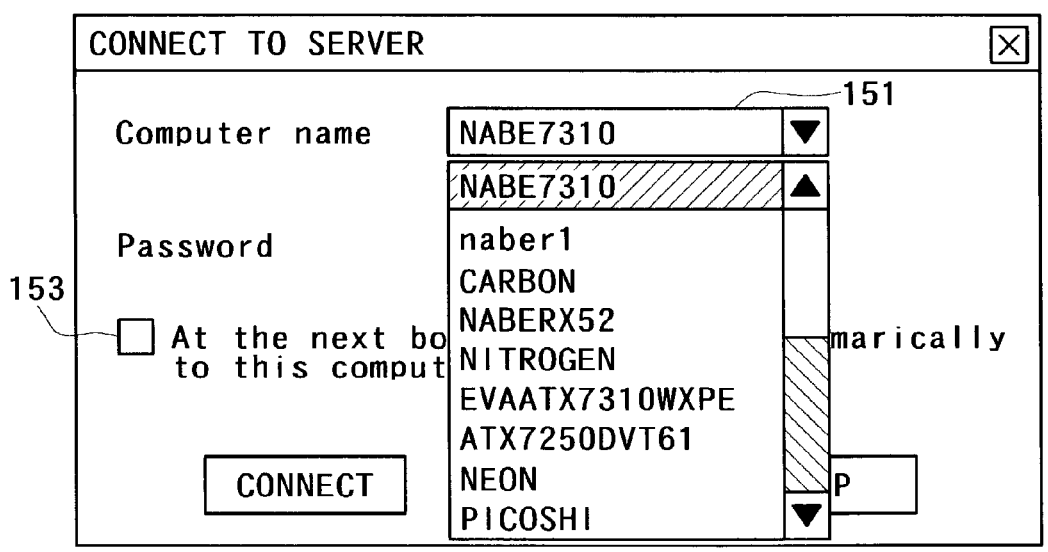
FIG. 8 is a schematic view of another dialog box.

Clicking on an arrow to the right-hand side of the combo box 151 extends the box as shown in FIG. 8 on the display unit 110.

The client program 131 displays a list of server names covering the servers 1-1 through 1-M in a downward direction of the combo box 151. The names of the servers 1-1 through 1-M are acquired by the client program 131 executing the suitable commands discussed above.

In FIG. 8, for example, a server name "NABE7310" corresponds to the server 1-1, "naber1" to the server 1-2, "CARBON" to the server 1-3, and "NABERX52" to the server 1-4.

Suppose that the name "NABE7310" is selected from the list in the combo box 151, that a suitable password is input to the text box 152, and that a button named "CONNECT" is clicked in the dialog box. This causes the client program 131 to connect to the server 1-1 over the network 3 so as to receive an image and sound data content representing a TV program on a specific channel.

Figure 9:
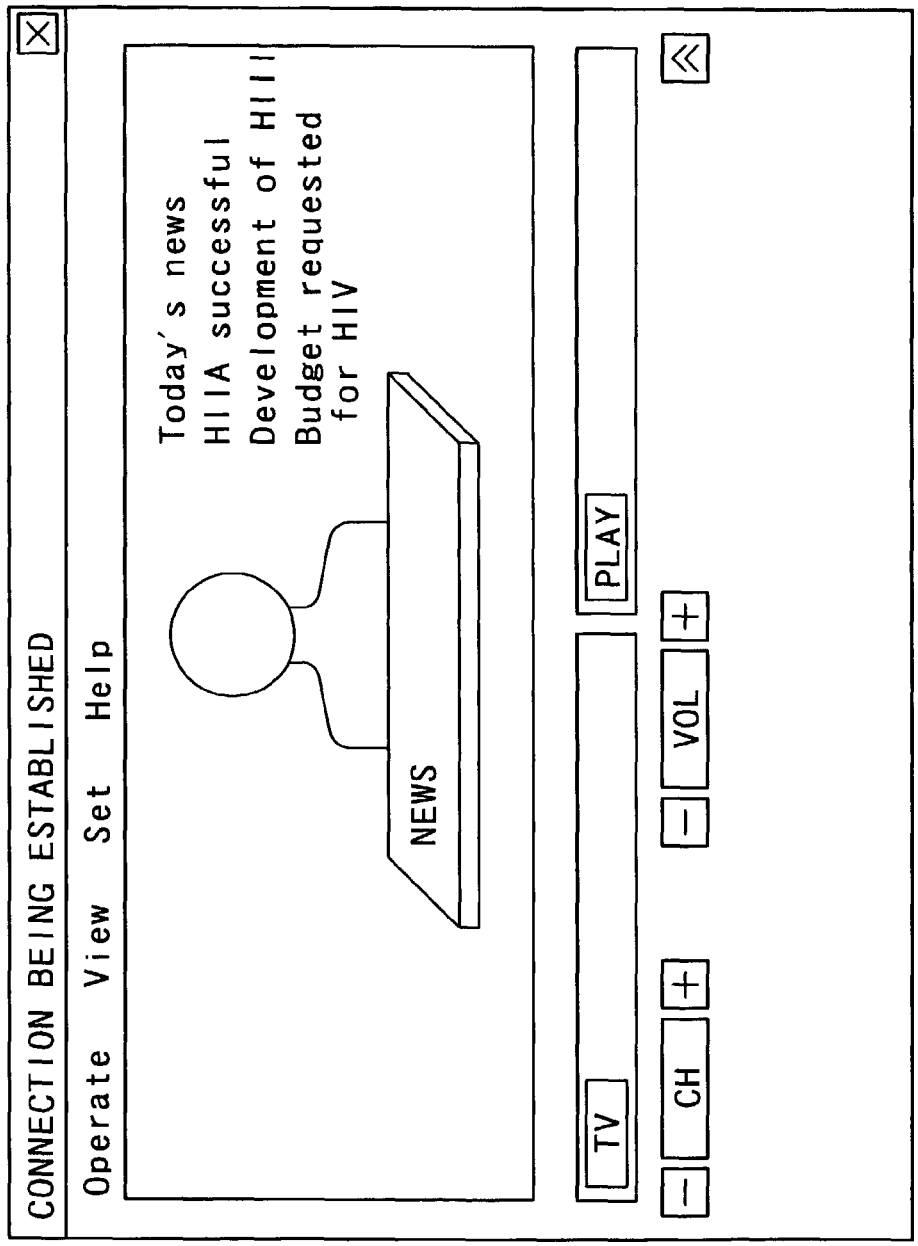
FIG. 9 is a schematic view of a window displayed on a display unit of the personal computer by a client program.

FIG. 9 schematically shows a window displayed on the display unit 110 by the client program 131 based on the content composed of image data and sound data corresponding to the TV program on a particular channel. On the display unit 110, the client program 131 displays not only the images representative of the TV program received from the server 1-1 but also buttons for selecting channels as well as buttons for adjusting sound levels.

Figure 10:
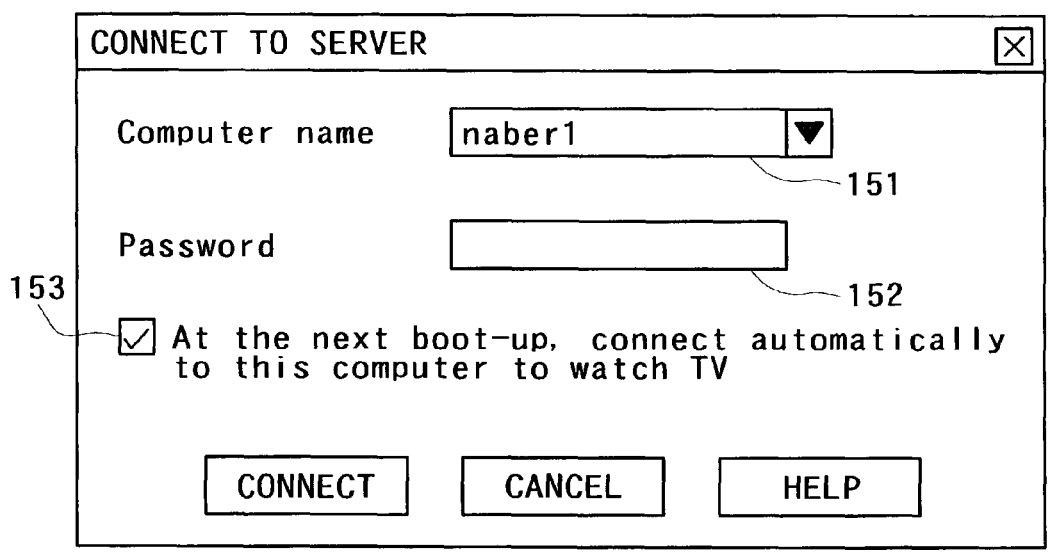
FIG. 10 is a schematic view of another dialog box.

Suppose now that the check box 153 is checked in the dialog box for selecting the target server 1 and that the button named "CONNECT" is clicked, as shown in FIG. 10. This causes the client program 131 to set an automatic connection flag for a value specifying that the server 1 be connected automatically.

Figure 11:
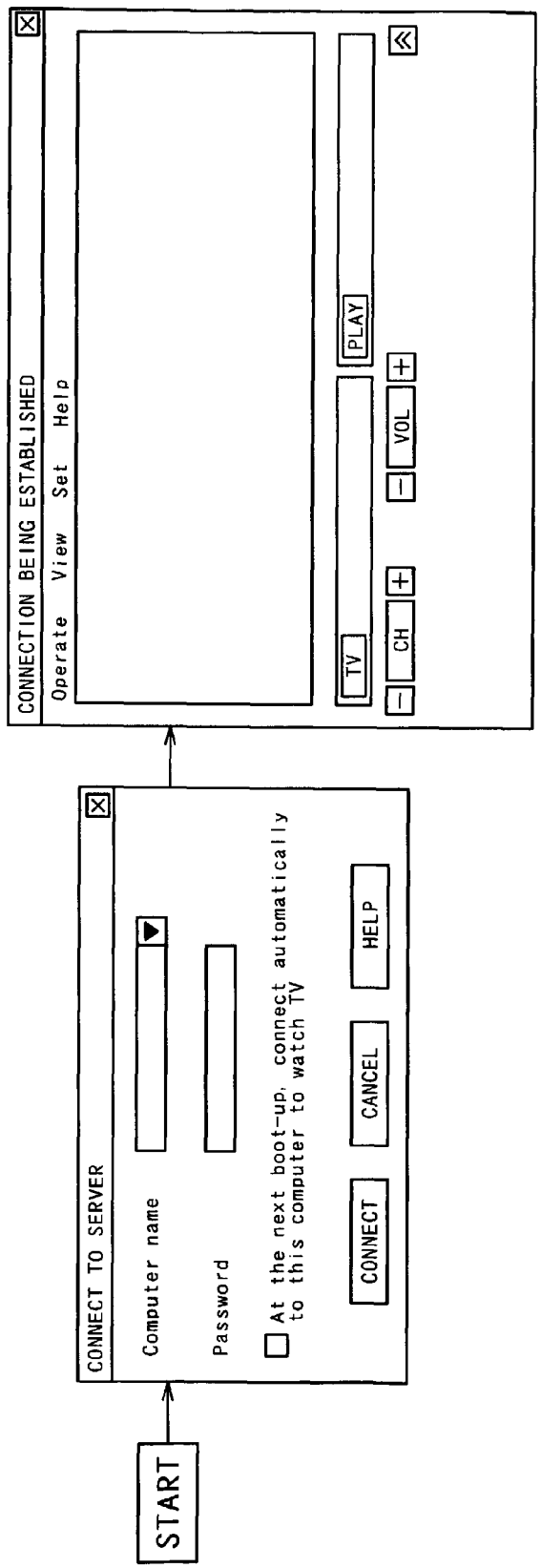
FIG. 11 is an explanatory view showing a process performed by the client program to establish connection with the server.

FIG. 11 schematically shows what the client program 131 does in connecting to the server 1 when the automatic connection flag is set for a value denying automatic connection to the server 1.

If the client program 131 is booted with the automatic connection flag set for the value denying automatic connection to the server 1, the dialog box for selecting the target server 1 is first displayed on the display unit 110. When the name of the server 1 and the password are entered into the dialog box, the client program 131 connects to the selected server 1 accordingly. Under control of the client program 131, the display unit 110 then displays images corresponding to the TV program on the appropriate channel received from the connected server 1 and the speakers 113 reproduce sounds associated with the program.

Figure 12:
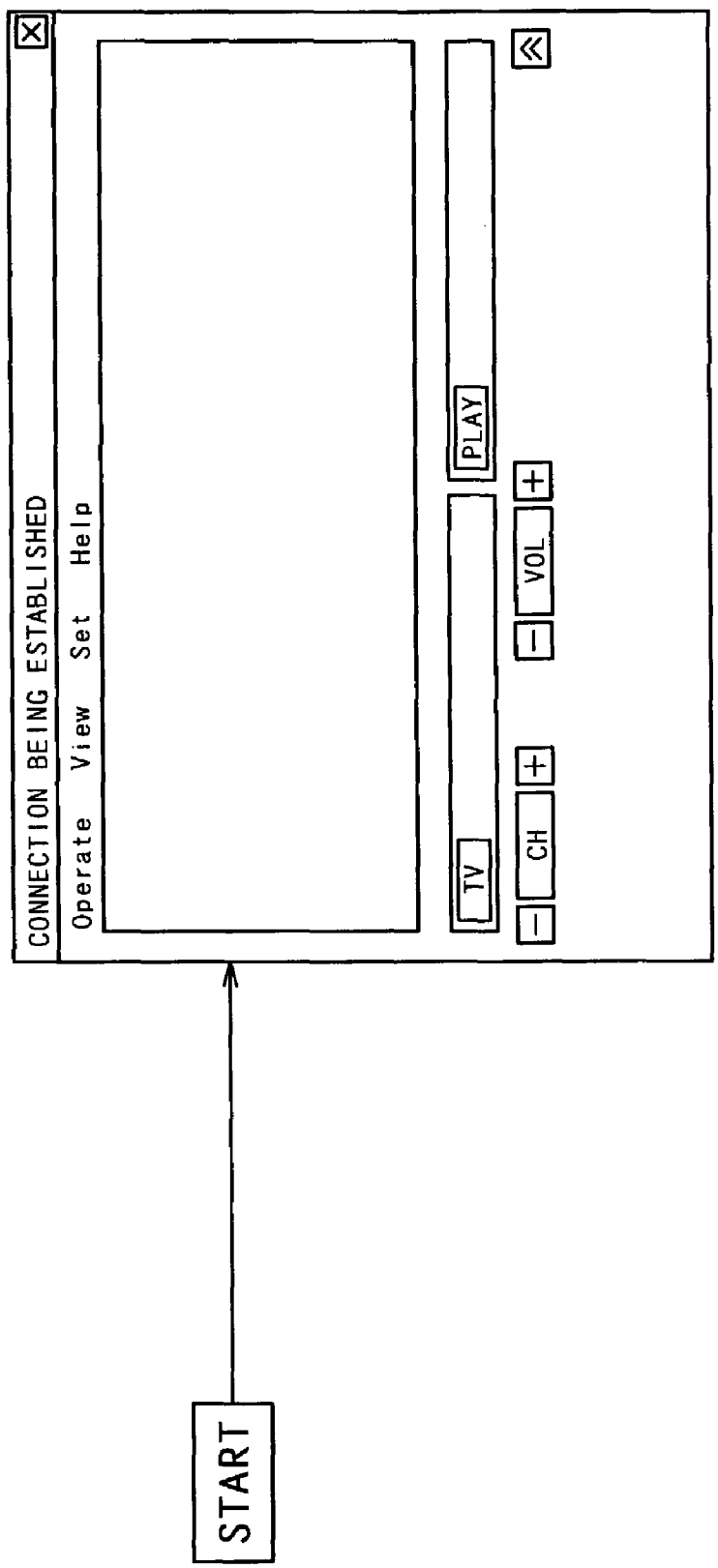
FIG. 12 is another explanatory view depicting the process performed by the client program to establish connection with the server.

FIG. 12 schematically shows what the client program 131 does in connecting to the server 1 when the automatic connection flag is set for the value specifying automatic connection to the server 1.

The client program 131 connects to the server 1 in accordance with a previously stored server name and password. Under control of the client program 131, the display unit 110 then displays images corresponding to the TV program on the predetermined channel received from the connected server 1 and the speakers 113 reproduce sounds associated with the program.

Where the automatic connection flag is set for the value specifying automatic connection to the server 1, the client program 131 does not display the dialog box for selecting the target server 1.

Figure 13:
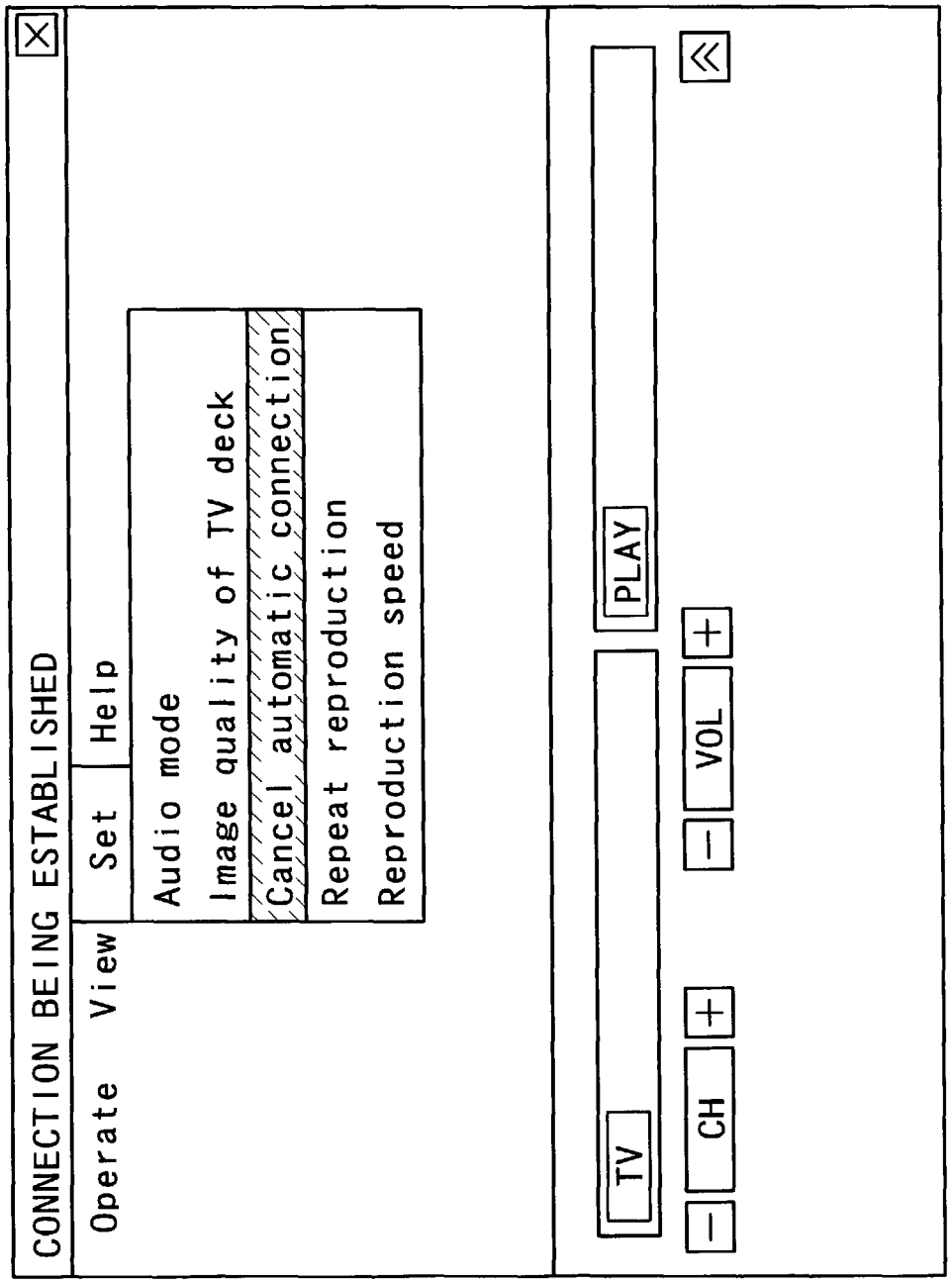
FIG. 13 is a schematic view of another window displayed on the display unit by the client program.

If a "cancel automatic connection" command is selected from the "Set" menu as shown in FIG. 13, the client program 131 sets the automatic connection flag for the value denying automatic connection to the server 1.

Figure 14:
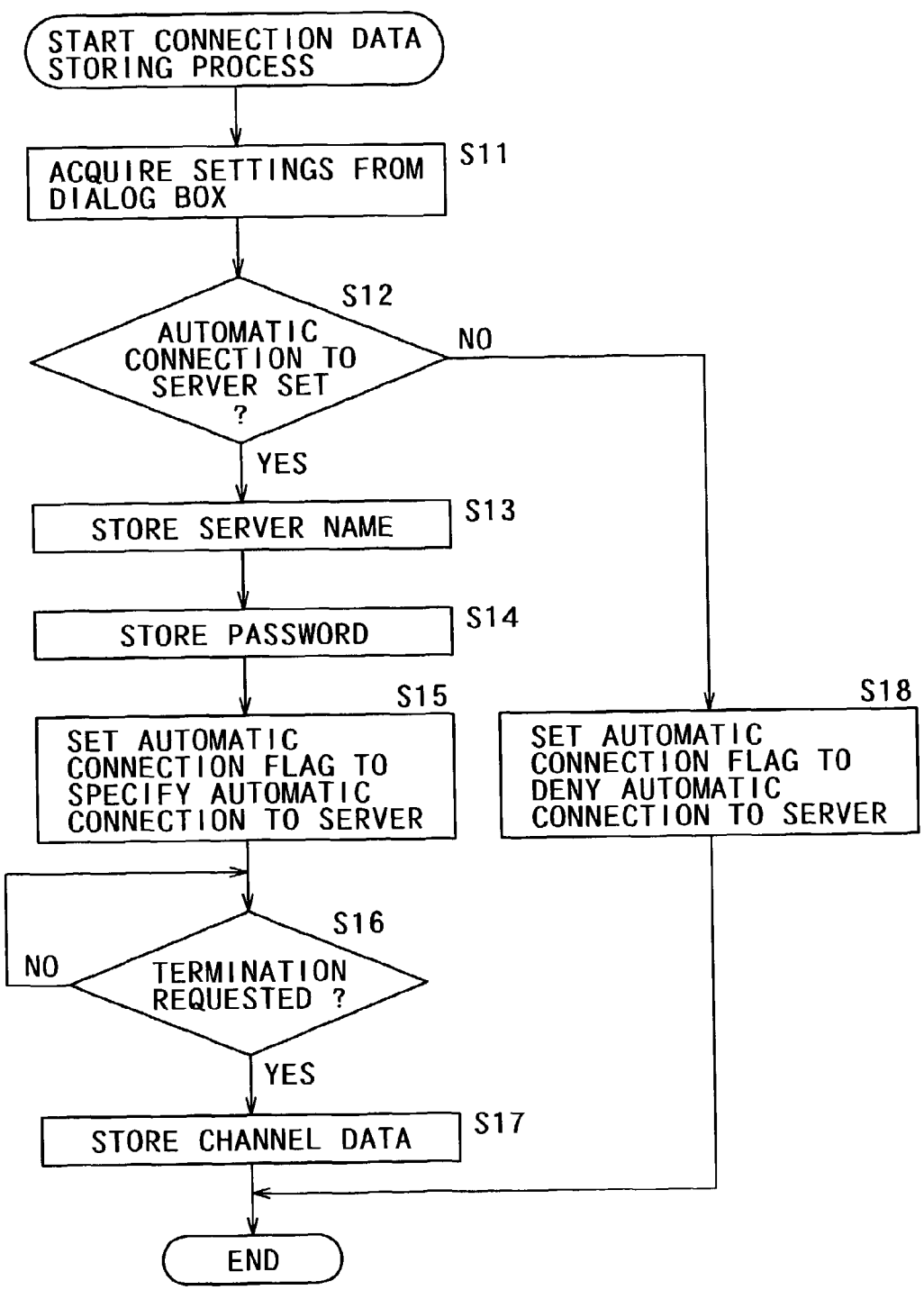
FIG. 14 is a flowchart of steps constituting a connection data storing process.

FIG. 14 is a flowchart of steps constituting a connection data storing process carried out when the button named "CONNECT" is clicked in the dialog box for selecting the desired server 1.

In step S11, the client program 131 acquires from the dialog box the settings for connecting to the server 1. Illustratively, the client program 131 acquires from the combo box 151 the name of the server 1 to connect to, gets the password from the text box 152, and obtains from the check box 153 the setting specifying whether or not to connect automatically to the server 1.

In step S12, the client program 131 judges whether the setting obtained from the check box 153 specifies automatic connection to the server 1. If automatic connection to the server 1 is judged specified, then it is necessary to store data required for the automatic connection. In that case, step S13 is reached in which the name of the server 1 obtained from the combo box 151 in the dialog box is stored as part of connection data.

In step S14, the client program 131 stores as other connection data the password acquired from the text box 152 in the dialog box.

In step S15, the client program 131 sets the automatic connection flag for the value (other connection data) specifying automatic connection to the server 1.

In step S16, the client program 131 judges whether the user has requested termination of the program 131 on the basis of a selected menu command or a clicked button on the display unit 110. If termination of the client program 131 is not judged requested, step S16 is reached again. The judgment is repeated until termination of the client program 131 is judged requested.

When termination of the client program 131 is judged requested in step S16, step S17 is reached. In step S17, the client program 131 stores connection data made up of the channel of the TV program whose content is being received from the server 1, and terminates the processing. With the client program 131 terminated, the automatic connection flag, name of the server 1, password, and channel data are illustratively stored as the connection data. As another part of the connection data, it is also possible to store different data required for connecting to the server 1, such as a connection route to the server 1.

If in step S12 the acquired setting is not judged to specify automatic connection to the server 1, then there is no need to store data for automatically connecting to the server 1. In that case, step S18 is reached without the server name and the password being stored. In step S18, the client program 131 sets the automatic connection flag for the value (connection data) denying automatic connection to the server 1, and terminates the processing.

As described, the client program 131 judges whether the automatic connection flag is set for automatic connection to the server 1. If the automatic connection flag is judged set for automatic connection to the server 1, then the client program 131 stores the name of the server 1 and the password as necessary data for automatically connecting to the server 1.

Figure 15:
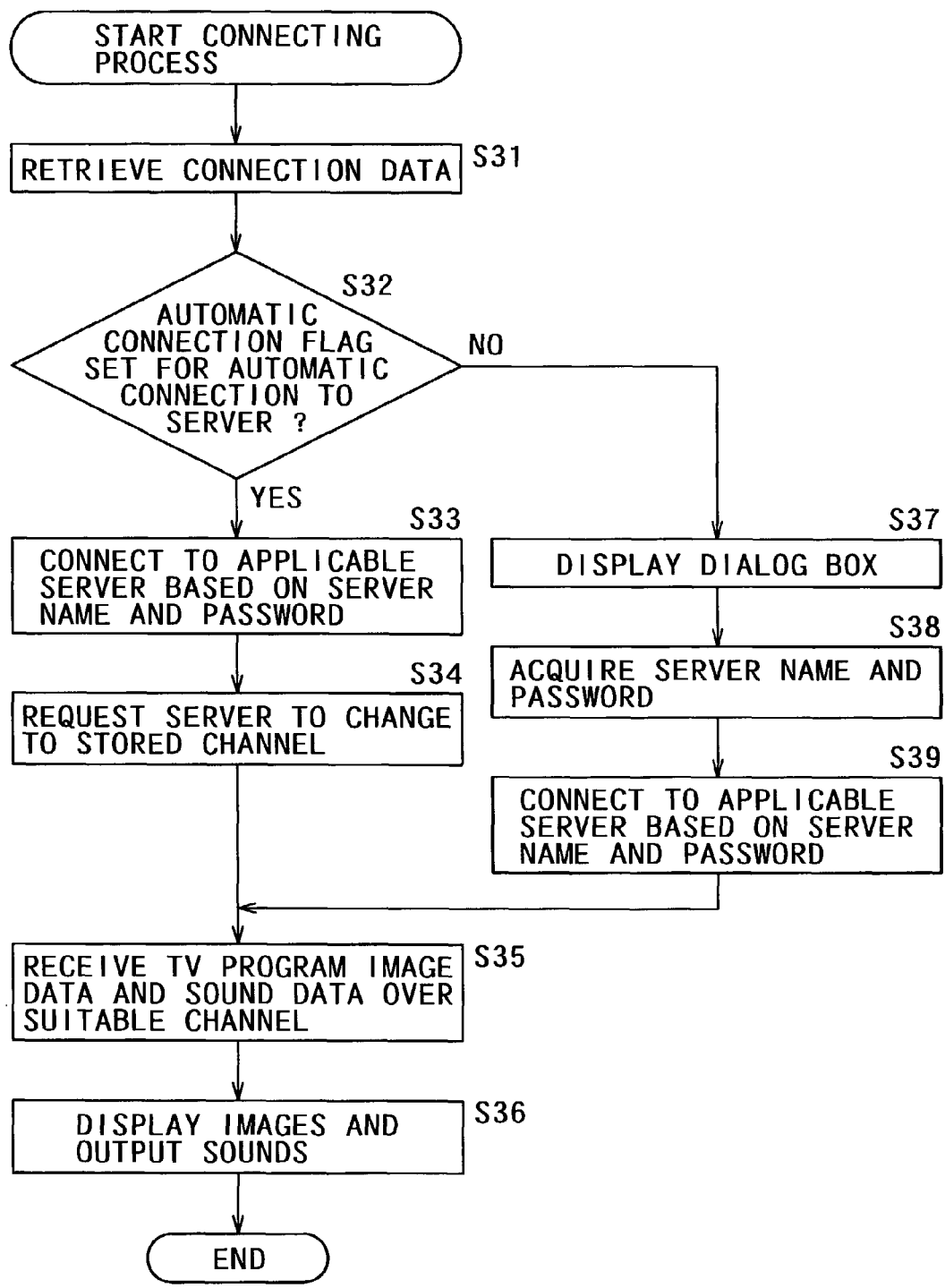
FIG. 15 is a flowchart of steps constituting a connecting process.

FIG. 15 is a flowchart of steps performed by the client program 131 in connecting to the server 1. In step S31, the client program 131 retrieves the connection data stored during the process discussed above with reference to the flowchart of FIG. 14. In step S32, the client program 131 judges whether the retrieved connection data include the automatic connection flag set for automatic connection to the server 1. If the automatic connection flag is judged set for the automatic connection, then step S33 is reached. In step S33, the client program 131 connects to the server 1 over the network 3 in accordance with the server name and password included in the connection data.

In step S34, the client program 131 requests the server 1 to change to a particular channel based on the channel data included in the connection data. Step S34 is followed by step S35.

In step S35, the client program 131 receives from the server 1 a content made up of image data and sound data representing the TV program on the predetermined channel.

In step S36, the client program 131 displays images and outputs sounds reflecting the received content. More specifically, the client program 131 displays images of the program on the display unit 110 and outputs sounds of the program through the speakers 113, and terminates the processing.

If in step S32 the automatic connection flag is not judged set for automatic connection to the server 1, then the client program 131 will connect to the server 1 not on the basis of the connection data but in keeping with the data to be set in the dialog box. The client program 131 thus displays the dialog box on the display unit 110.

In step S38, the client program 131 acquires the name of the server 1 from the combo box 151 and obtains the password from the text box 152 in the dialog box.

In step S39, the client program 131 connects to the server 1 based on the acquired server name and password. Step S39 is followed by step S35 in which image data and sound data are received from the server 1.

As described, where the automatic connection flag in the stored connection data is found set for automatic connection to the server 1, the client program 131 connects to the suitable server 1 based on the stored server name and password and requests the connected server 1 to change to a predetermined channel. This allows the user to connect to the desired server 1 and to view the TV program on the appropriate channel without going through the chore of making entries into the dialog box.

Figure 16:
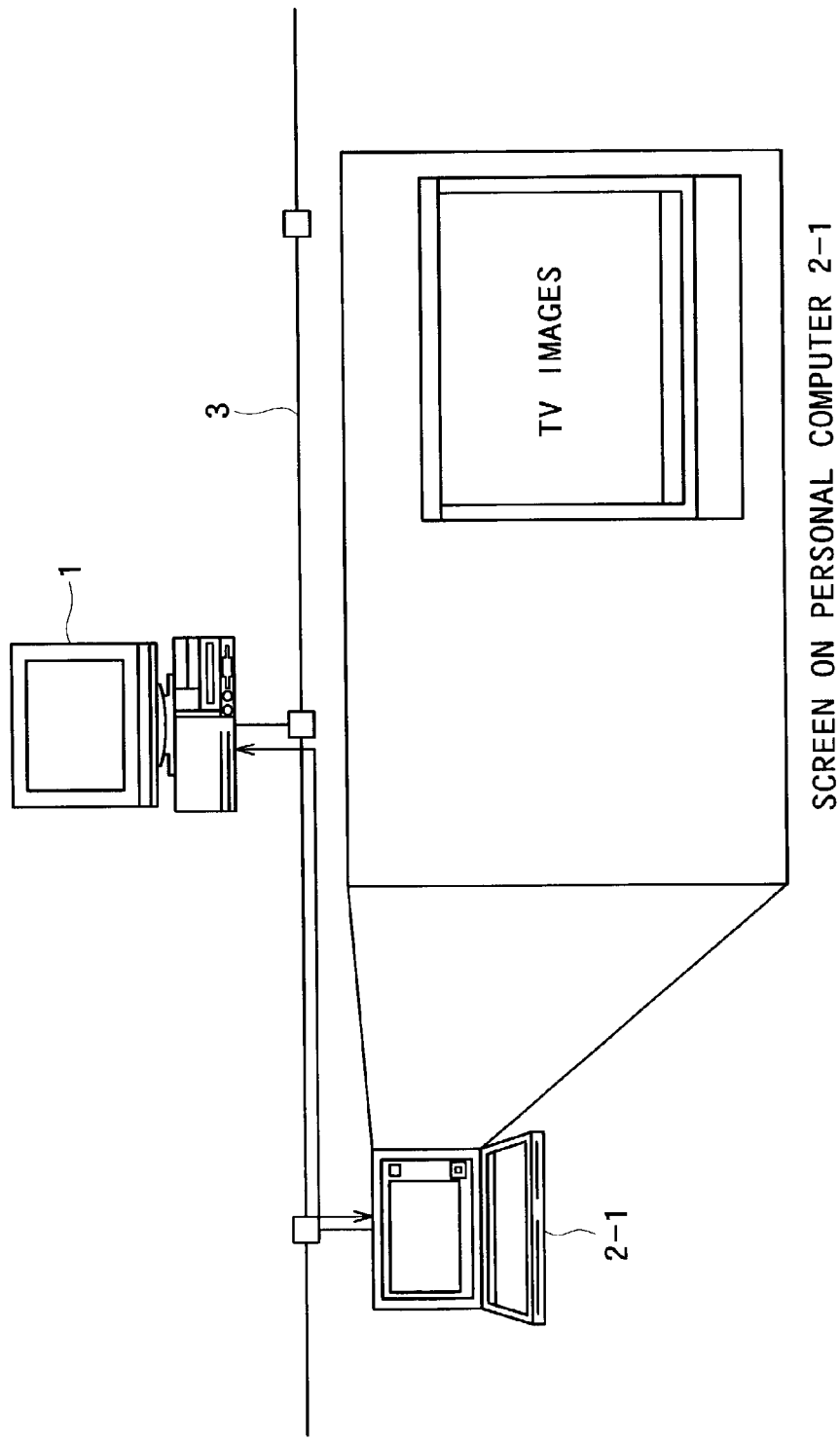
FIG. 16 is an explanatory view of a process of booting a chat program.
Figure 17:
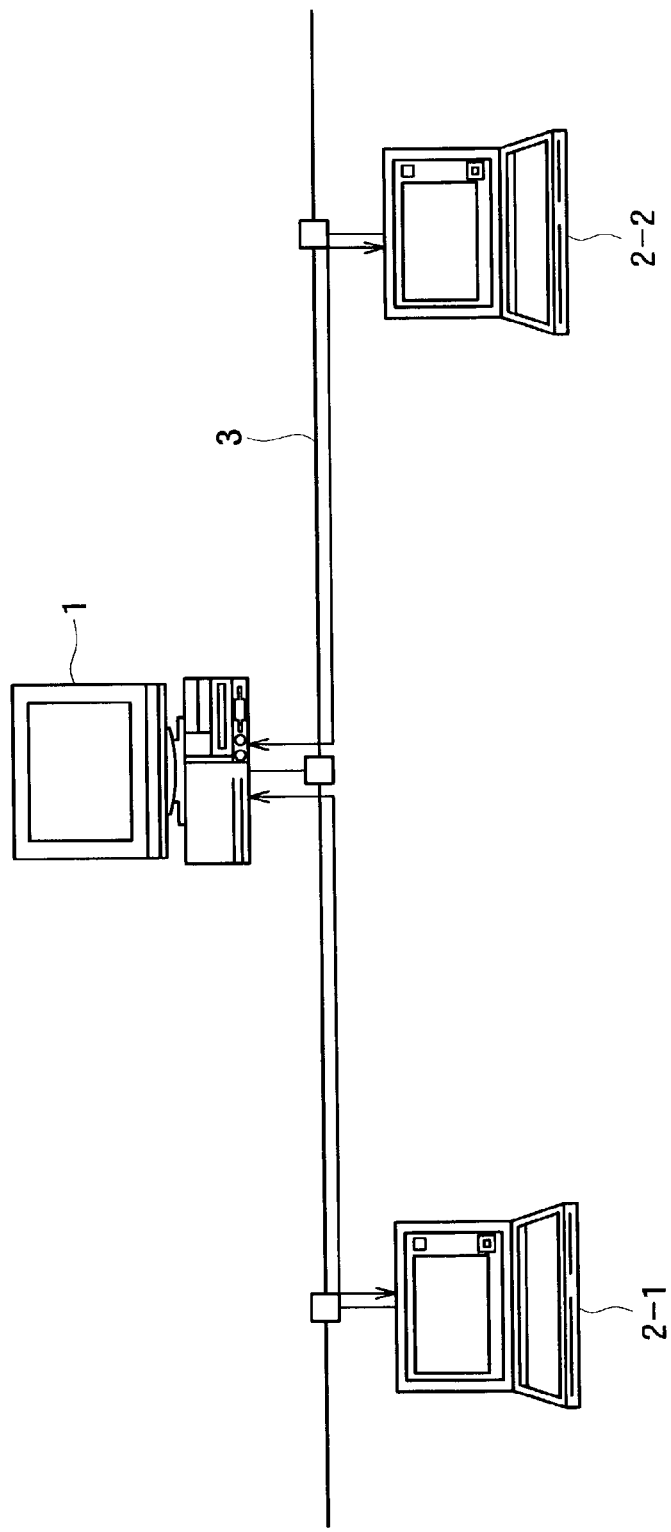
FIG. 17 is another explanatory view of the process of booting the chat program.
Figure 18:
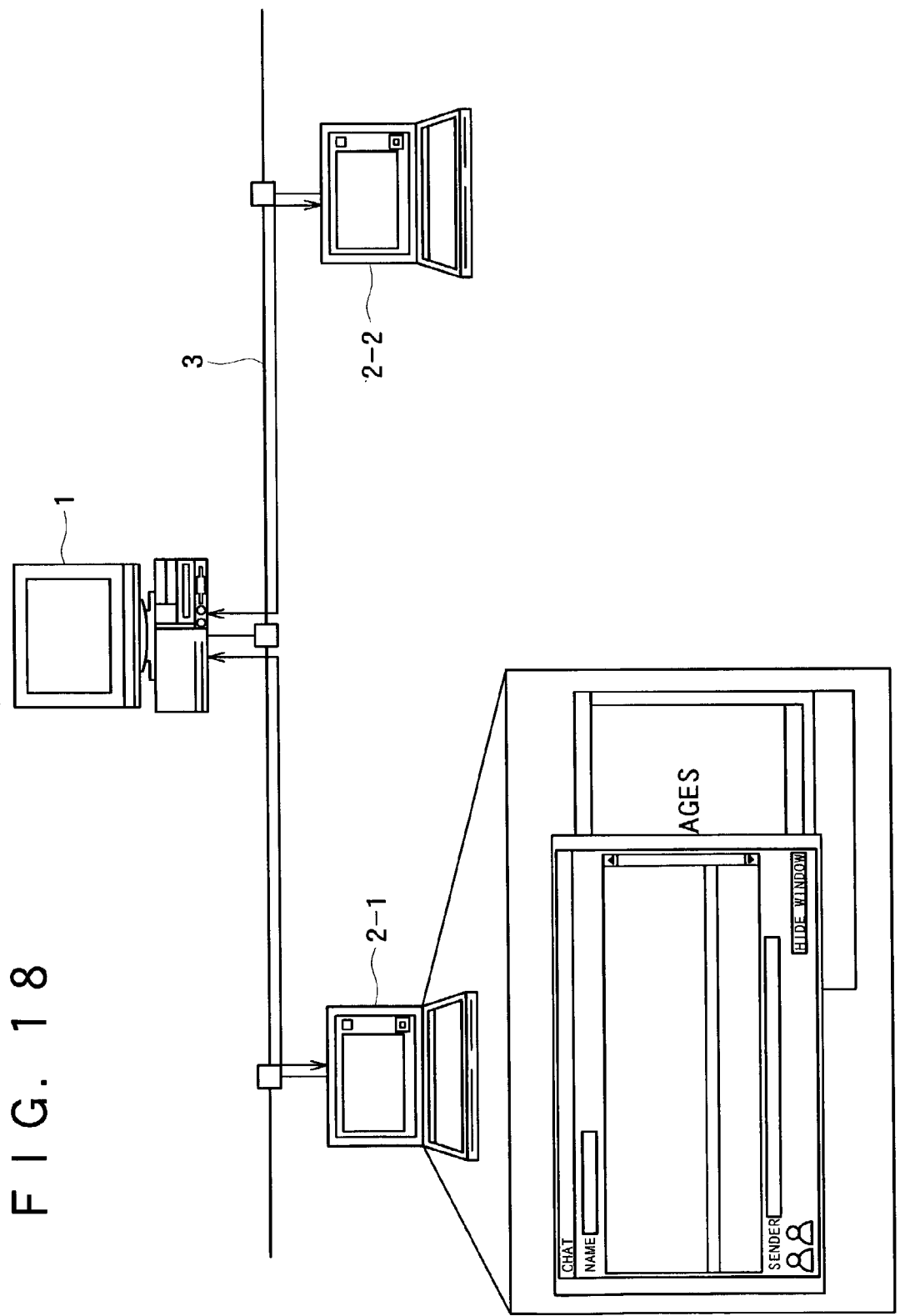
FIG. 18 is another explanatory view of the process of booting the chat program.

Below is a description of how the chat program 132 is booted when connection with the server 1 is established. Suppose that a personal computer 2-1 acting as a client is receiving a content composed of the TV program on a particular channel from the server 1 over the network 3 as shown in FIG. 16, and that a personal computer 2-2 as another client connects to the server 1 to start receiving a program content over the network 3 depicted in FIG. 17. In that case, a chat program 132-1 is booted on the personal computer 2-1 as illustrated in FIG. 18.

A chat program 132-2 is also booted on the personal computer 2-2.

Figure 19:
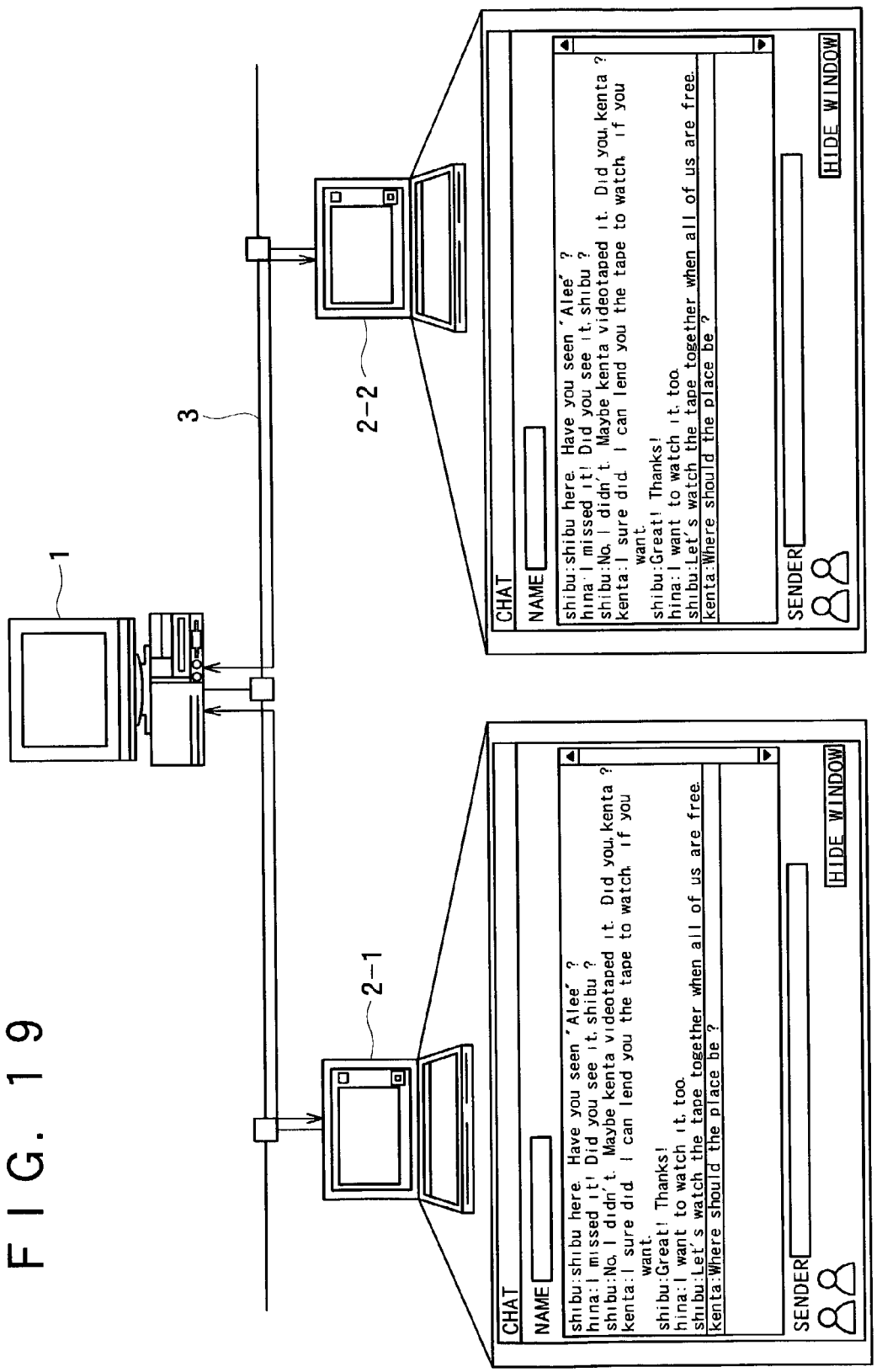
FIG. 19 is another explanatory view of the process of booting the chat program.

As shown in FIG. 19, the chat program 132-1 on the personal computer 2-1 causes a display unit 110-1 to display the text entered by the user of the personal computer 2-1 operating a keyboard 108-1 and the text which is received from the chat server program 87 in the server 1 and which is acquired by the chat program 132-2 on the personal computer 2-2. Likewise, the chat program 132-2 on the personal computer 2-2 causes a display unit 110-2 to display the text entered by the user of the personal computer 2-2 operating a keyboard 108-2 and the text which is received from the chat server program 87 in the server 1 and which is obtained by the chat program 132-1 on the personal computer 2-1.

Figure 20:
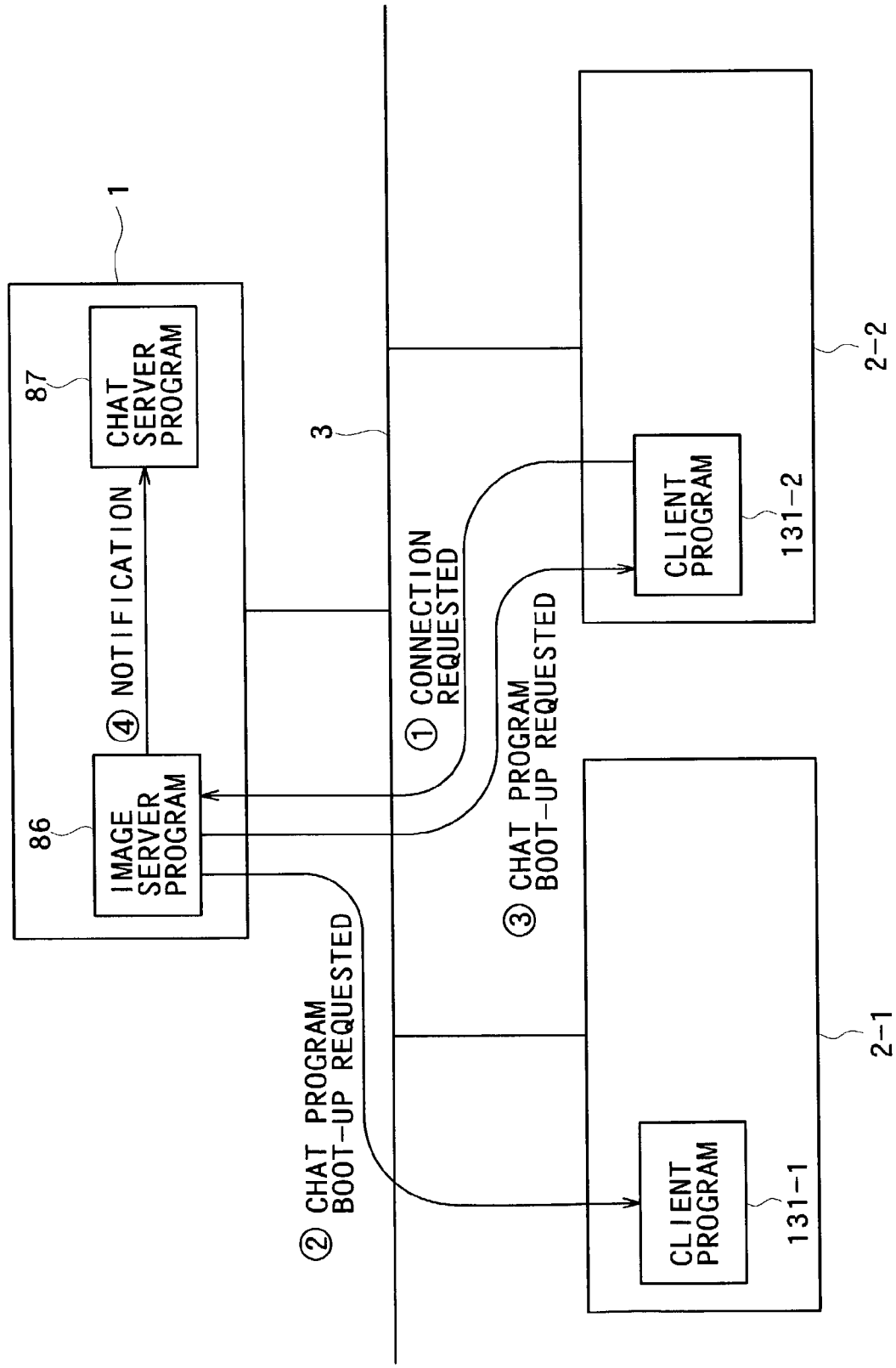
FIG. 20 is another explanatory view of the process of booting the chat program.
Figure 21:
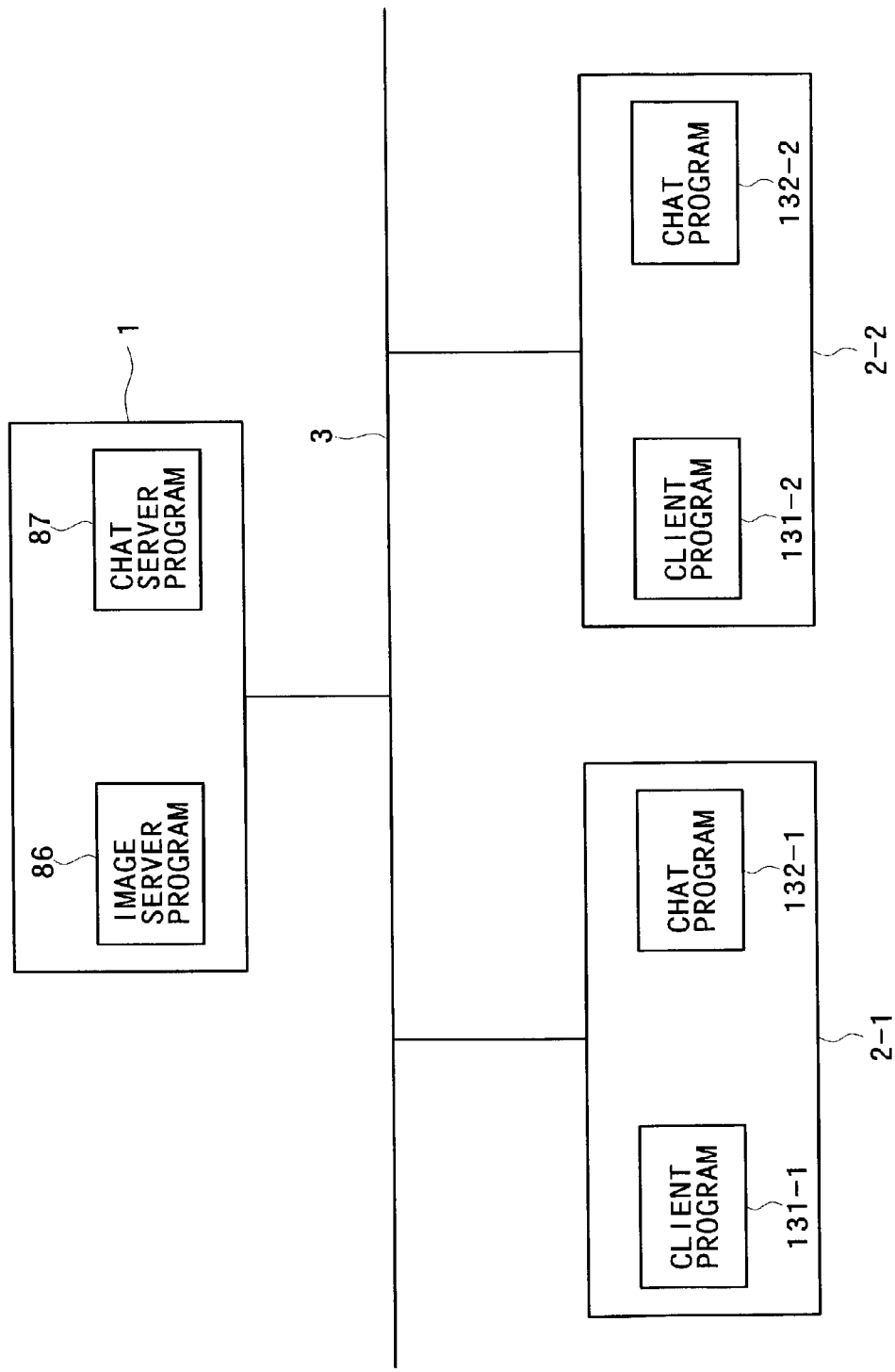
FIG. 21 is another explanatory view of the process of booting the chat program.

FIGS. 20 and 21 are explanatory views showing how the chat programs 132-1 and 132-2 are booted on the personal computers 2-1 and 2-2 respectively.

If the client program 131-2 on the personal computer 2-2 requests connection with the image server program 86 in the server 1 as shown in FIG. 20, the image server program 86 checks to see if the content representing the TV program on a particular channel is already offered to some other client.

If another client is judged already offered the same content, the image server program 86 in the server 1 transmits a boot-up request to, say, the client program 131-1 on the personal computer 2-1 (which is already receiving the content), requesting the client program 131-1 to boot the chat program 132-1. At the same time, the image server program 86 in the server 1 transmits another boot-up request to the client program 131-2 on the personal computer 2-2 that is the connection-requesting client, prompting the client program 131-2 to boot the chat program 132-2.

If some other client is judged already offered the content representing the TV channel on a specific channel, the image server program 86 in the server 1 notifies the chat server program 87 that the client program 131-1 on the personal computer 2-1 is requested to boot the chat program 132-1 and that the client program 131-2 on the personal computer 2-2 is also requested to boot the chat program 132-2.

In the manner described and as shown in FIG. 21, the client program 131-1 on the personal computer 2-1 boots the chat program 132-1 and the client program 131-2 on the personal computer 2-2 boots the chat program 132-2.

In that setup, the chat program 132-1 and client program 131-2 may chat with each other through the chat server program 87 in the server 1.

Figure 22:
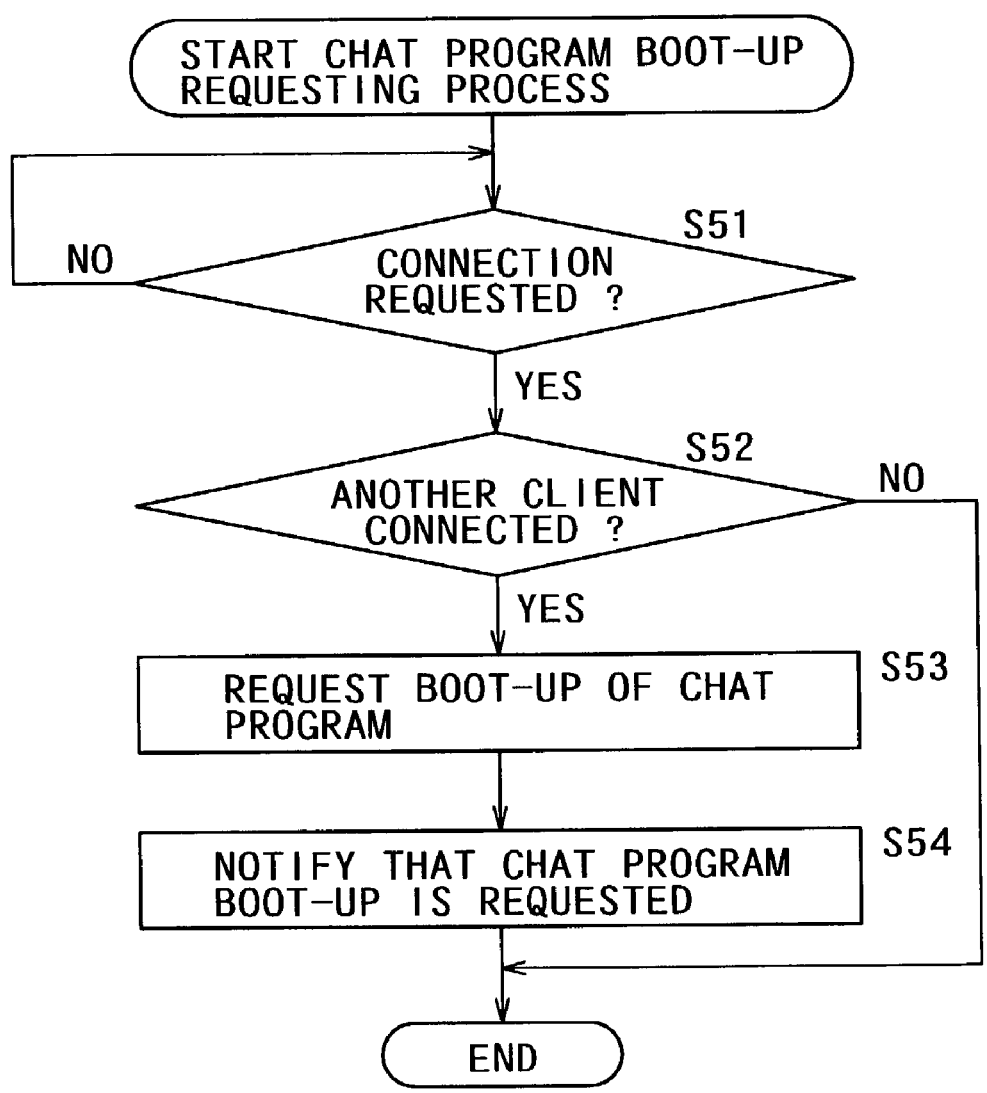
FIG. 22 is a flowchart of steps constituting a chat program boot-up requesting process.

FIG. 22 is a flowchart of steps constituting a chat program boot-up requesting process performed by the image server program 86 in the server 1 requesting boot-up of the chat program 132 on the personal computer 2.

In step S51, the image server program 86 judges whether a request is made for connection to the program 86 itself. If no such request is judged to be made, step S51 is reached again. The judgment is repeated until a request is detected for connection to the image server program 86.

If in step S51 the request is detected for connection to the image server program 86, step S52 is reached. In step S52, the image server program 86 judges whether another client is being connected. If in step S52 some other client is judged already connected, that means the image server program 86 is connected to at least two clients including the client having requested the connection in step S51. In that case, step S53 is reached in which the image server program 86 requests each of these at least two clients including the connection-requesting client to boot the chat program 132.

In step S54, the image server program 86 notifies the chat server program 87 that each of the at least two clients including the connection-requesting client is requested to boot the chat program 132. This terminates the processing of FIG. 22.

If in step S52 no other client is judged connected, then solely the client having requested the connection in step S51 connects to the image server program 86 and no chat takes place. In that case, steps S53 and S54 are skipped and the processing of FIG. 22 is terminated.

As described, when two or more clients request connection with the image server program 86, the program 86 requests each of the clients to boot the chat program 132. The image server program 86 then informs the chat server program 87 that each of the clients involved has been requested to boot the chat program 132.

Figures 23, 24:
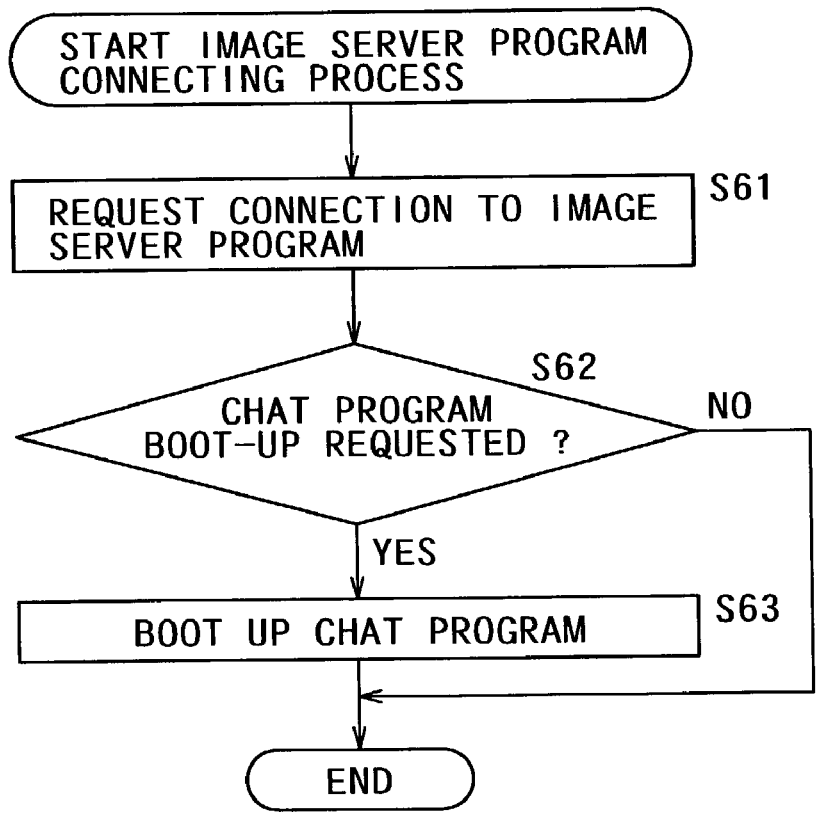
FIG. 23 is a flowchart of steps constituting an image server program connecting process.
FIG. 24 is a tabular view listing priority data.

FIG. 23 is a flowchart of steps performed by the client program 131 on the personal computer 2 acting as a client in establishing connection with the image server program 86.

In step S61, the client program 131 on the personal computer 2 requests connection with the image server program 86 in the server 1 over the network 3.

In step S62, the client program 131 on the personal computer 2 judges whether the image server program 86 in the server 1 has requested boot-up of the chat program 132. If that request is judged to be made by the image server program 86, then step S63 is reached in which the chat program 132 is booted. After the chat program is booted, the processing is terminated.

If in step S62 the image server program 86 is not judged to have requested boot-up of the chat program 132, then the client program 131 terminates the processing without booting the chat program 132.

As described, when the client program 131 requests connection with the image server program 86, the client program 131 boots the chat program 132 in response to a boot-up request made in turn by the image server program 86. In this setup, users utilizing clients at separate locations can communicate with one another while viewing the same content.

Although the image server program 86 and chat server program 87 have been described above as executed by a single server 1, this is not limitative of the invention. Alternatively, the image server program 86 and the chat server program 87 may each be carried out by a separate server. In that alternative setup, the chat program 132 when booted connects to a first server apart from a second server that executes the image server program 86, the first server further running the chat server program 87.

In the foregoing description, the chat program 132 was shown booted in response to a chat program boot-up request from the image server program 86. Alternatively, the chat program 132 may be booted in advance. In this case, the chat program 132 may illustratively be made active by the client program 131.

What follows is a description of how the image server program 86 prioritizes the personal computers 2 configured as clients so as to accept a channel change request only from the client with a specific priority.

FIG. 24 is a tabular view listing priority data about clients, the data being retained by the image server program 86. In the priority data of FIG. 24, client names are shown related to priorities.

Illustratively in FIG. 24, a client named "AAA" corresponds to a personal computer 2-1, a client "BBB" to a personal computer 2-2, a client "CCC" to a personal computer 2-3, and so on.

In the example of FIG. 24, a priority "1" attached to a client's name signifies that the channel change request made thereby is acceptable, and a priority "2" means that the channel change request is not accepted. In the description that follows, the priority "1" may be called the high priority and the priority "2" the low priority where appropriate.

For example, if the personal computer 2-1 is the first to connect to the image server program 86, the image server program 86 associates the name of the personal computer 2-1 with the priority for accepting the channel change request. When the second and subsequent personal computers 2-2, etc., connect to the image server program 86, the image server program 86 associates the names of these personal computers with the priority for rejecting the channel change request.

In response to a channel change request from the personal computer 2-1, the image server program 86 changes the channel accordingly. Given the channel change request from the personal computer 2-2, 2-3, etc., the image server program 86 will reject the request and will not change the channel.

Figure 25:
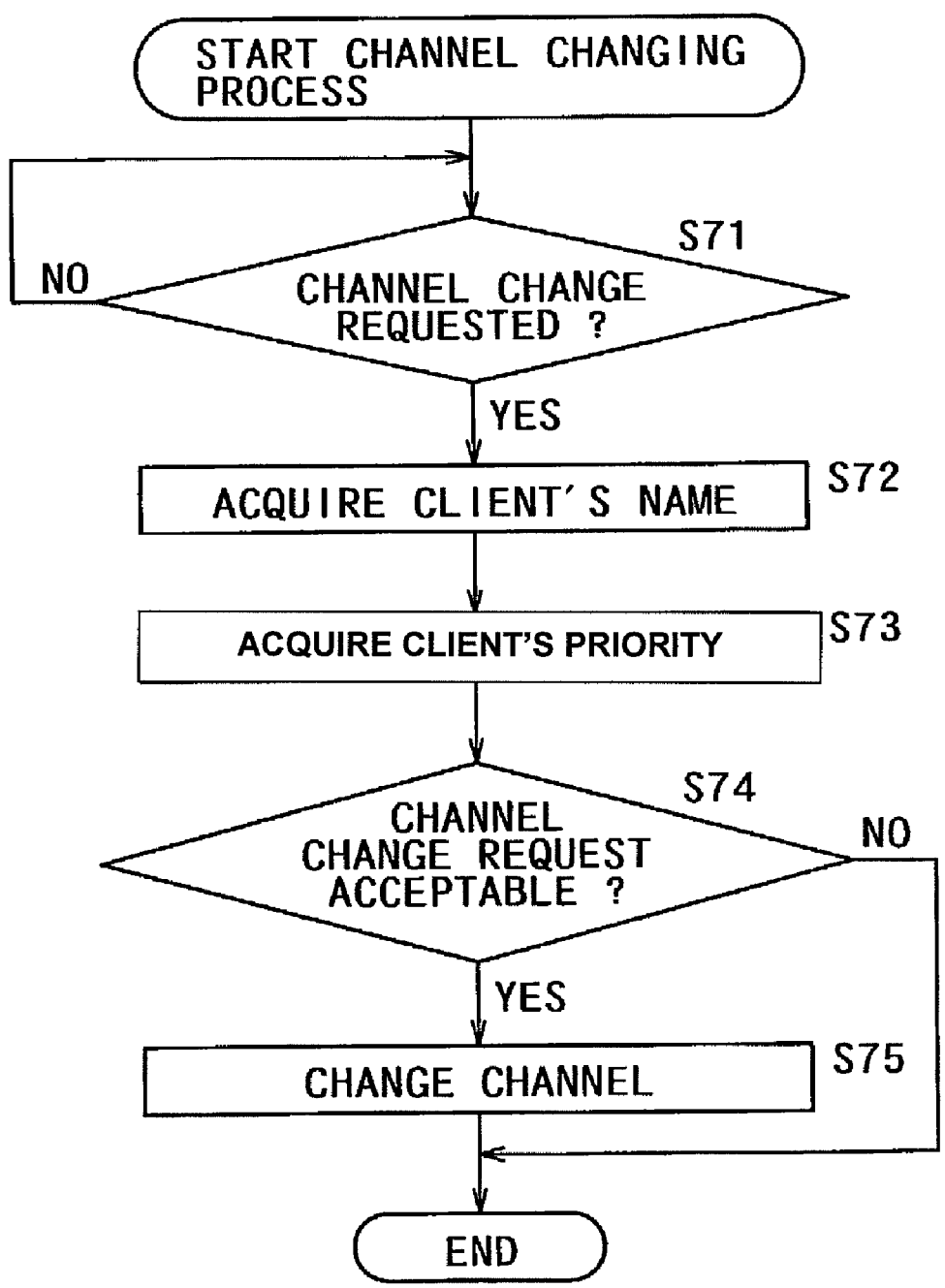
FIG. 25 is a flowchart of steps constituting a channel changing process.

FIG. 25 is a flowchart of steps constituting a channel changing process performed by the image server program 86. In step S71, the image server program 86 judges whether the personal computer 2 has made a channel change request based on the data transmitted from the personal computer 2 over the network 3. If the personal computer 2 is not judged to have made a channel change request, step S71 is reached again and the judgment is repeated.

If in step S71 the personal computer 2 is judged to have made a channel change request, step S72 is reached. In step S72, the image server program 86 acquires the name of the requesting personal computer as a client based on the command transmitted from the personal computer 2 over the network 3.

In step S73, the image server program 86 acquires the priority of the client based on the acquired name of the requesting personal computer and in keeping with the previously stored priority data about individual clients.

In step S74, the image server program 86 judges whether the channel change request is acceptable in accordance with the acquired priority of the client. Illustratively, if the priority is judged to be "1" permitting acceptance of a channel change request as shown in FIG. 24, step S75 is reached. In step S75, the channel is changed by honoring the channel change request from the client, and the processing is terminated.

If in step S74 the priority is judged to be "2" rejecting the channel change request as shown in FIG. 24, then the channel remains unchanged, and the processing is terminated.

As described, the image server program 86 accepts the channel change request only from the client having a specific priority based on the predetermined priority data. Channel change requests from other clients with different priorities will not be honored.

Figure 26:
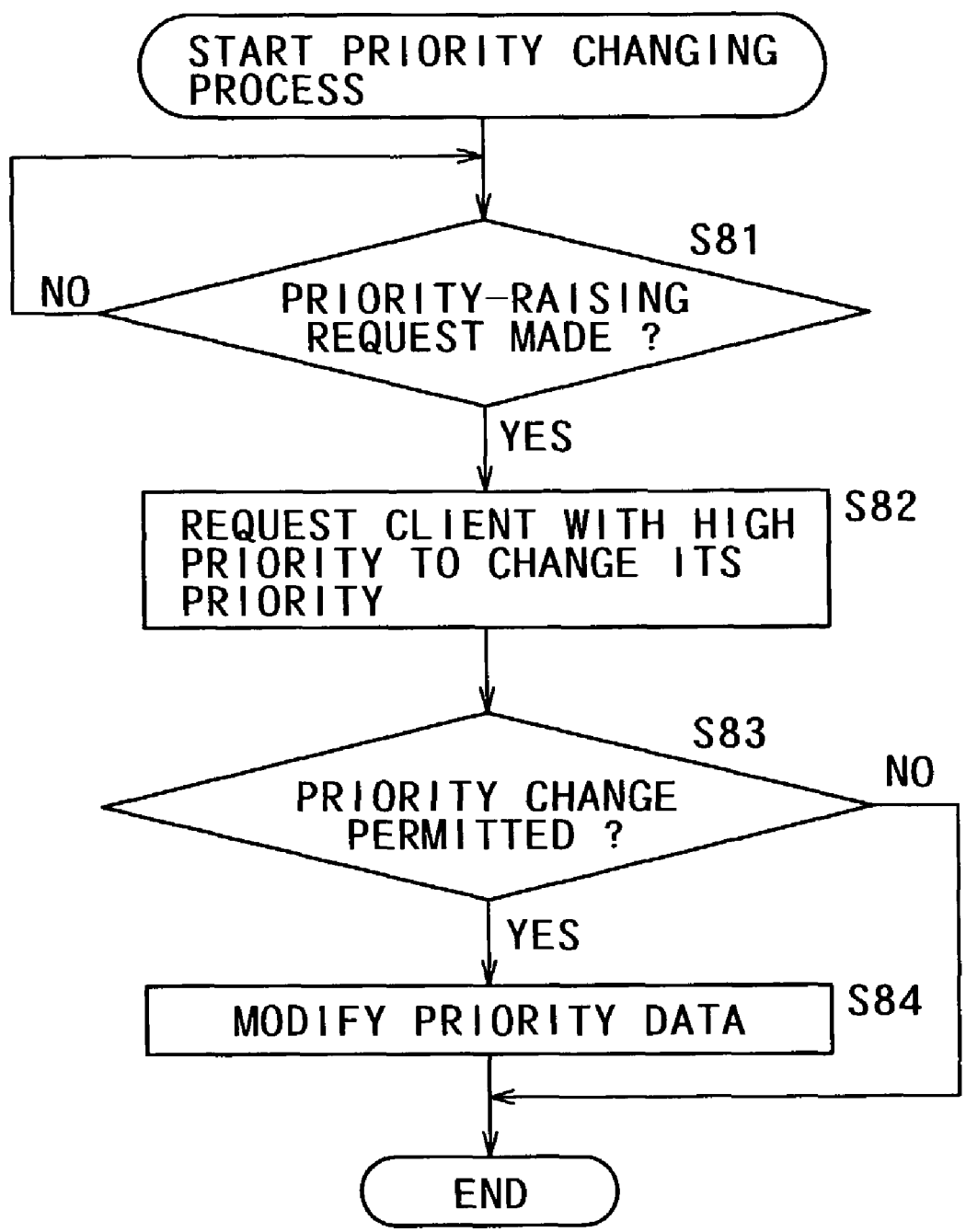
FIG. 26 is a flowchart of steps constituting a priority changing process.

FIG. 26 is a flowchart of steps constituting a priority changing process performed by the image server program 86. In step S81, the image server program 86 judges whether a priority-raising request is made by the personal computer 2 configured as a client based on the data transmitted over the network 3. If no such request is judged to be made, step S81 is reached again and the judgment is repeated until a priority-raising request is detected.

If in step S81 a priority-raising request is judged to be made, step S82 is reached in which the image server program 86 requests permission of a priority change from another client with the high priority. For example, the image server program 86 searches for a client having the priority "1" based on the priority data. The client with the priority "1", when detected, is requested to change its priority.

In step S83, the image server program 86 judges whether a priority change is permitted based on the response from the high-priority client requested to change its priority. If the priority change is judged permitted, then the priority data are modified in such a manner the client making the priority-raising request is granted the high priority and the client permitting the priority change is assigned the low priority. Then the processing is terminated. In FIG. 24, for example, the client "AAA" is now given the priority "2" while the client "BBB" is granted the priority "1."

If in step S83 the priority change is not judged to be permitted, then the image server program 86 terminates the processing without modifying the priority data.

As described, when the client having the high priority agrees to a priority change, the image server program 86 modifies the priority data as desired by the requesting client. Alternatively, all clients may be allowed to request channel changes.

Figure 27:
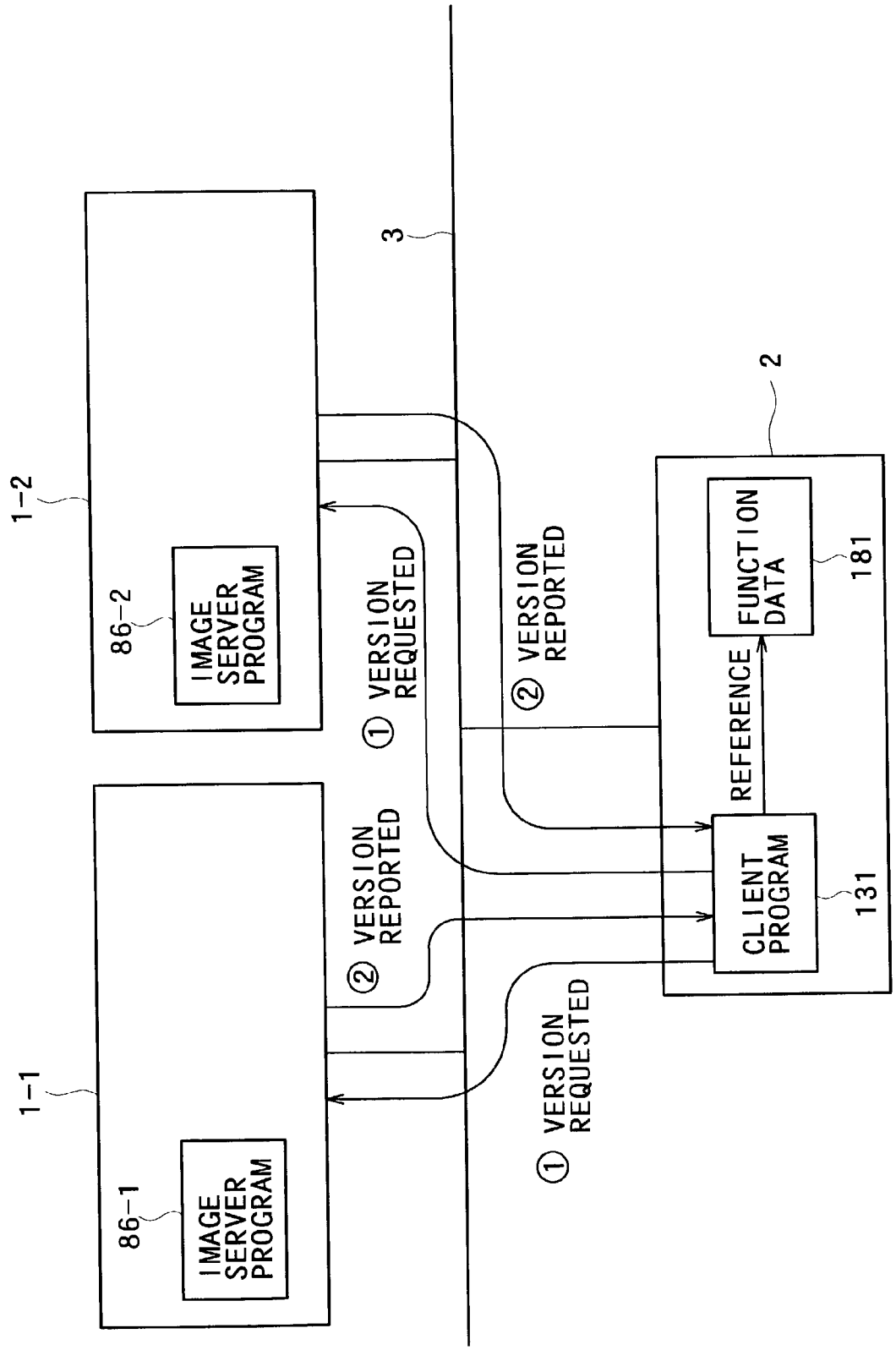
FIG. 27 is an explanatory view of a process of selecting a server based on a version-compliant function.

FIG. 27 is an explanatory view of a process in which a client acquires the versions of the image server programs 86 in the servers 1 so as to select a particular server 1 having a server program version corresponding to specific functions.

The client program 131 on the personal computer 2 acting as a client requests the image server program 86-1 in the server 1-1 to report the version of the program 86-1. In response to the request from the client program 131, the image server program 86-1 in the server 1-1 reports its version to the client program 131 over the network 3.

Based on the version report from the image server program 86-1, the client program 131 references previously stored function data 181 to find the functions of the image server program 86-1.

The functions of the image server program 86-1 may include: a function of recording contents and offering recorded contents as files; a function of receiving a TV program on a specific channel and offering a content stream representing the received program; and a function of offering a single recorded content as a plurality of content streams to different clients. The multiple content streams may comprise a low-bit-rate stream, a high-bit-rate stream, an MPEG-1/ MPEG-2 stream, and other streams of different coding methods.

The client program 131 on the personal computer 2 also requests over the network 3 the image server program 86-2 in the server 1-2 to report the version of the program 86-2. In response to the request from the client program 131, the image server program 86-2 in the server 1-2 reports its version to the client program 131 over the network 3.

Based on the version report from the image server program 86-2, the client program 131 references the previously stored function data 181 to find the functions of the image server program 86-2.

FIG. 28 is a tabular view listing typical function data 181. The function data 181 comprise different versions of the image server program 86 in list form in conjunction with the names of the functions corresponding to the different versions.

Illustratively in FIG. 28, a version "1" of the image server program 86 is shown associated with a function named "recording." The "recording" function involves recording contents and offering the recorded contents as files.

Also, a version "2" of the image server program 86 is shown corresponding to functions named "recording" and "tuner." The "tuner" function involves receiving a TV program on a particular channel and offering a content stream representing the received program. That is, the image server program 86 of the version "2" is capable of recording contents and offering the recorded contents as files, or of receiving a TV program on a specific channel and offering a content stream representative of the received program. Because the image version program 86 of the version "2" can offer a TV program content as a stream, it can provide a stream of any recorded content to a client.

Furthermore, a version "3" of the image server program 86 is shown listed in conjunction with functions named "recording," "tuner," and "multiple streams." The "multiple streams" function involves offering any one of recorded contents as a plurality of content streams to multiple clients. That is, the image server program 86 of the version "3" is capable of recording contents and offering the recorded contents as files; receiving a TV program on a specific channel and offering a content stream representative of the received program; or offering any one of recorded contents as a plurality of streams to multiple clients.

As described, given version reports from the image server programs 86 in various servers 1, the client program 131 recognizes the functions of these programs 86. With the available functions of the image server programs 86 thus recognized, the client program can select one of the multiple servers 1 running the programs 86.

Figure 29:
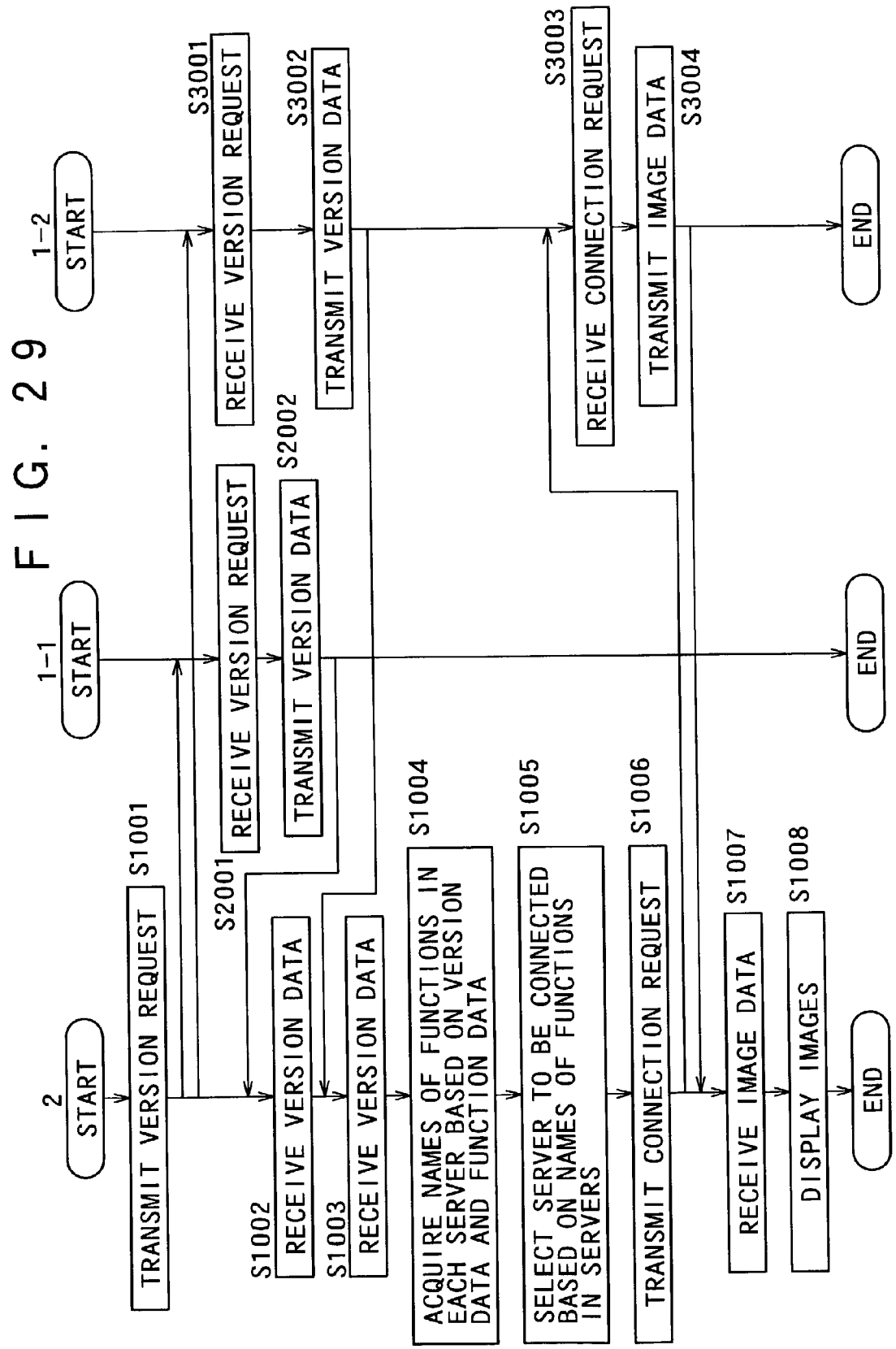
FIG. 29 is a flowchart of steps constituting image data transmitting and receiving processes.

FIG. 29 is a flowchart of steps constituting content (image data) transmitting and receiving processes performed by the personal computer 2 running the client program 131 and by the server 1 running the image server program 86.

In step S1001, the client program on the personal computer 2 transmits over the network 3 a version request to the image server programs 86-1 and 86-2 in the servers 1-1 and 1-2 respectively. Alternatively, the client program 131 may broadcast the version request all over the network.

In step S2001, the image server program 86-1 in the server 1-1 receives the version request from the personal computer 2. In step S2002, the image server program 86-1 transmits its version data to the personal computer 2 over the network 3.

In step S1002, the client program 131 receives the version data from the server 1-1 over the network 3, the version data indicating the version of the image server program 86-1.

In step S3001, the image server program 86-2 in the server 1-2 receives the version request from the personal computer 2. In step S3002, the image server program 86-2 transmits its version data to the personal computer 2 over the network 3.

In step S1003, the client program 131 receives the version data from the server 1-2 over the network 3, the version data indicating the version of the image server program 86-2.

In step S1004, the client program 131 acquires the names of available functions with each server 1 based on the version data and the function data 181 obtained in steps S1002 and S1003 above. More specifically, given the version data from the image server program 86-1, the client program 131 searches the function data 181 for the function names corresponding to the version of the image server program 86-1. Also upon receipt of the version data from the image server program 86-2, the client program 131 searches the function data 181 for the function names associated with the version of the image server program 86-2.

In step S1005, the client program 131 selects the server 1 to be connected based on the acquired names of the functions with the servers 1-1 and 1-2. The client program 131 can select the server 1 that is most suited to offer the desired service. For example, if it is desired to reproduce a TV program on a particular channel, then the client program 131 selects the server 1 which receives that TV program on the specific channel and provides a content stream representing the received program.

In step S1006, the client program 131 transmits a connection request to the selected server 1 such as the server 1-2 over the network 3.

In step S3003, the image server program 86-2 receives the connection request from the personal computer 2. In step S3004, the image server program 86-2 transmits image data (i.e., content) to the personal computer 2 over the network 3.

In step S1007, the client program 131 receives the content (image data) from the server 1-2. In step S1008, the client program 131 displays images based on the received content on the display unit 110, and the processing is terminated.

In the manner described, the client program 131 can select the server 1 in accordance with the desired type of service, i.e., the server 1 from which to receive the desired content.

Figure 30:
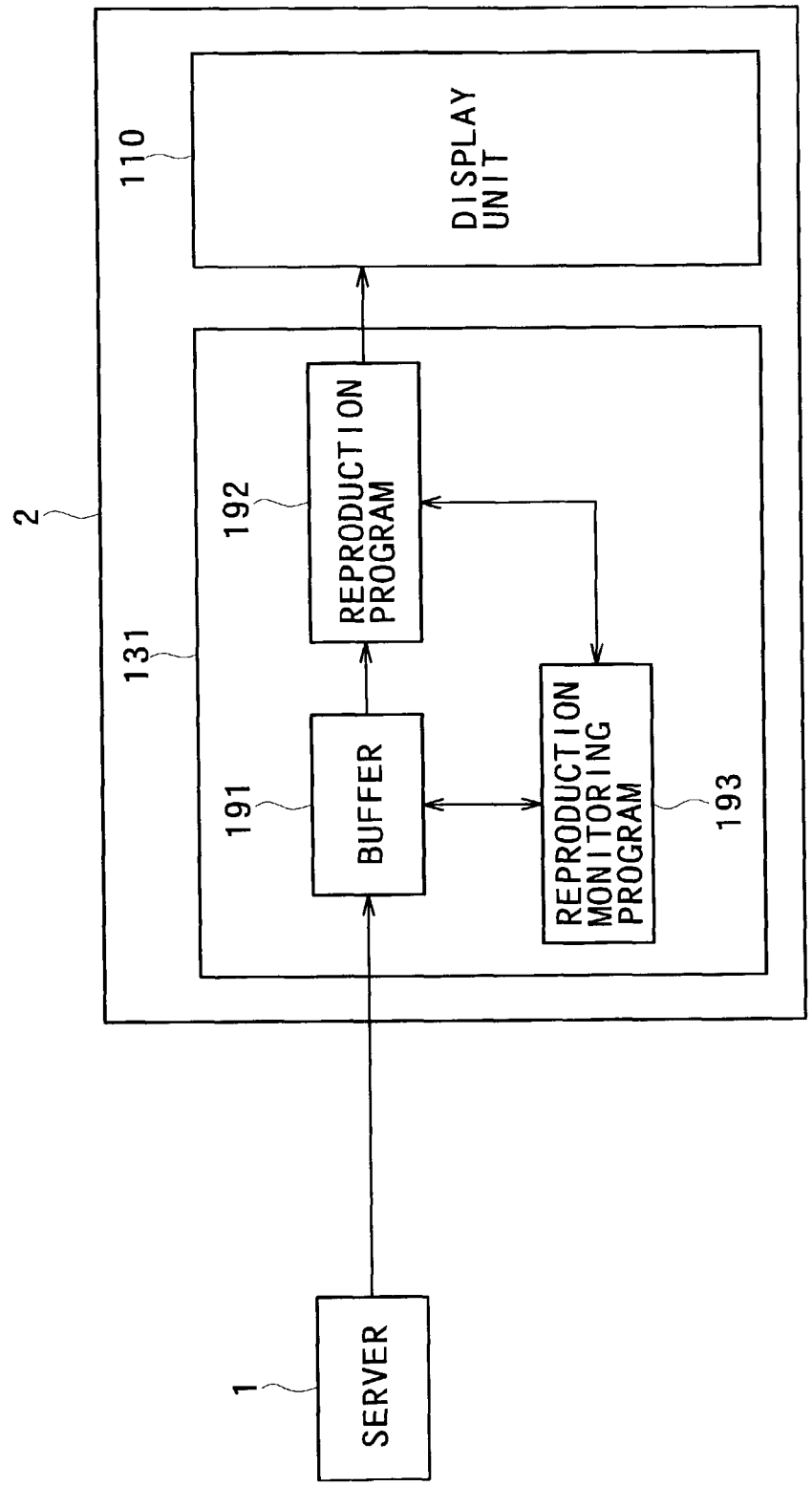
FIG. 30 is a block diagram depicting a structure of the client program.

FIG. 30 is a block diagram depicting a structure of the client program 131 that reproduces a stream fed from the server 1 without deleting image frames.

Illustratively in FIG. 30, the client program 131 includes a buffer 191, a reproduction program 192, and a reproduction monitoring program 193.

The buffer 191 is a first-in first-out (FIFO) buffer that temporarily accommodates an image data stream such as an MPEG stream coming from the server 1 over the network 3. The buffered image data are forwarded to the reproduction program 192.

The reproduction program 192 decodes the image data held in the buffer 191 while adjusting the reproduction speed under control of the reproduction monitoring program 193. The decoded image data are displayed on the display unit 110.

Based on the amount of image data retained in the buffer 191, the reproduction monitoring program 193 instructs the reproduction program 192 to adjust the reproduction speed.

Figure 31:
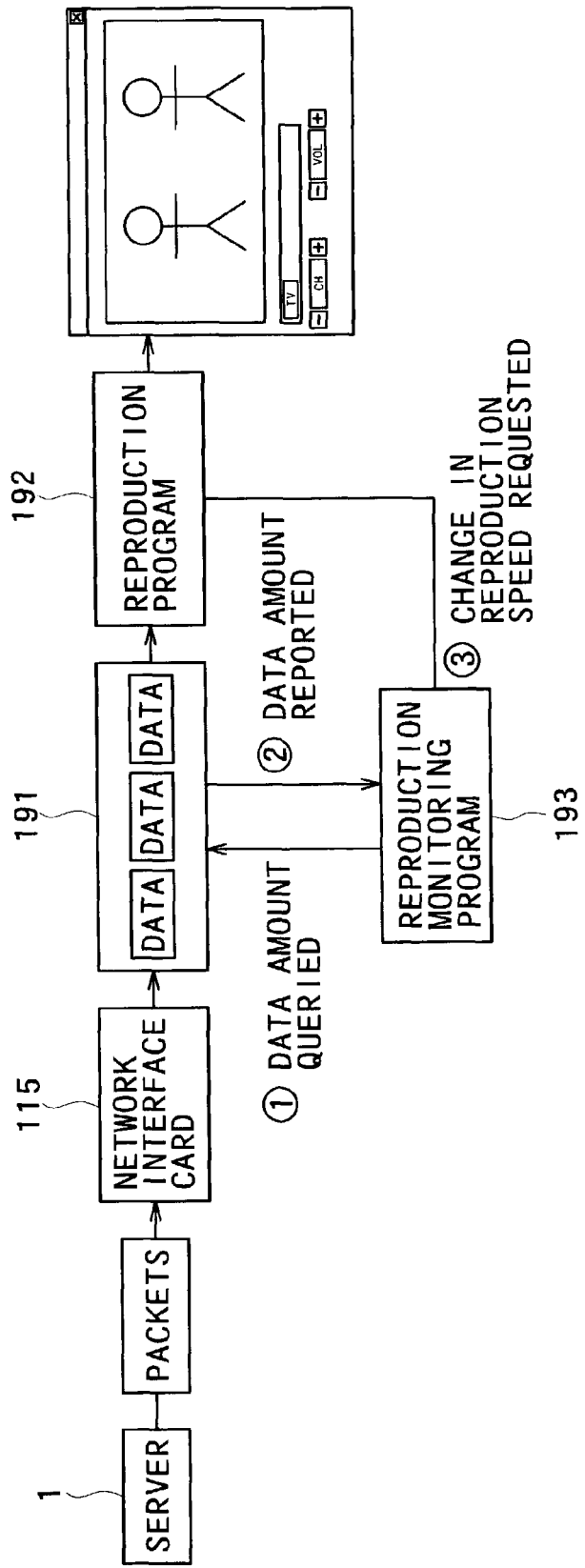
FIG. 31 is an explanatory view illustrating detailed processing of the client program.

Described below with reference to FIG. 31 is a more detailed process performed by the client program 131 in reproducing images derived from a stream coming from the server 1. Where the client program 131 is to receive a TV program stream from the server 1 in order to reproduce images of the received program, it is desirable to minimize the amount of the image data being held in the buffer 191 and to keep the data amount constant for optimal real-time reproduction.

Suppose that while the client program 131 is carrying out the reproduction process under control of a multitask OS such as Windows (registered trademark), a task of another program starts getting executed. In that case, some resources of the CPU 101 can be appropriated for the second program, which can interrupt the reproduction process of the client program 131. This leads to a growing amount of image data retained in the buffer 191.

The bottleneck above is circumvented by the client program 131 on the personal computer 2 according to this invention. Specifically, the client program 131 monitors at regular intervals the amount of the image data held in the buffer 191 and adjusts the reproduction speed in a manner reflecting the monitored image data amount. This makes it possible to minimize the amount of the image data in the buffer 191 and to keep the data amount constant.

Packets containing image data and sent from the server 1 are received by the network interface card 115 of the personal computer 2. The network interface card 115 extracts image data from the received packets and supplies the extracted data to the buffer 191.

The buffer 191 accommodates the image data coming from the network interface card 115.

The reproduction monitoring program 193 queries the buffer 191 periodically (i.e., a number of times a second) to find the amount of currently buffered image data. In response to the query from the reproduction monitoring program 193, the buffer 191 reports the amount of the currently held image data to the program 193.

On the basis of the reported amount of the image data currently retained in the buffer 191, the reproduction monitoring program 193 requests the reproduction program 192 to adjust the reproduction speed.

Illustratively, if the image data currently accommodated by the buffer 191 exceed the amount of data corresponding to a three-second reproduction, the reproduction monitoring program 193 requests the reproduction program 192 to reproduce at 1.05 times the standard speed. The modest change to 1.05× speed is intended to minimize any visual awkwardness on the part of users watching the images being reproduced.

If the currently retained image data in the buffer 191 fall short of the amount of data corresponding to a one-second reproduction, the reproduction monitoring program 193 requests the reproduction program 192 to reproduce images at 1.00× speed.

The threshold data quantity for 1.05× speed is made different, it should be noted, from that for 1.00× speed. If the threshold value were the same, the reproduction at 1.00× speed and reproduction at 1.05× speed would reciprocate at short intervals giving an awkward visual experience to the users watching the images being reproduced.

Figure 32:
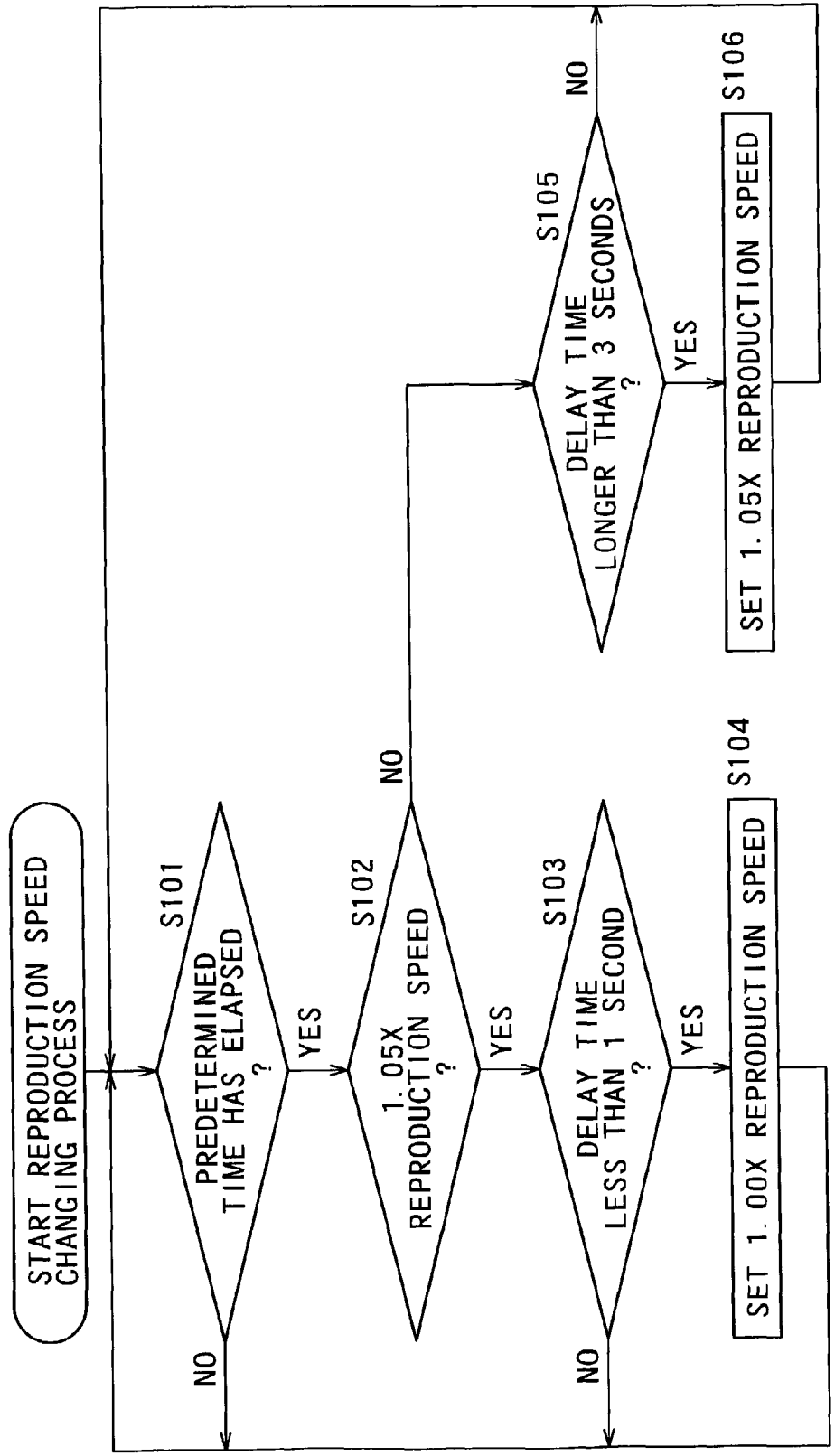
FIG. 32 is a flowchart of steps constituting a reproduction speed changing process.

FIG. 32 is a flowchart of steps constituting a reproduction speed changing process performed by the client program 131. In step S101, the reproduction monitoring program 193 in the client program 131 judges whether a predetermined time period has elapsed based on time data fed from an RTC, not shown. If the predetermined time period is not judged to have elapsed, step S101 is reached again, and the judgment is repeated until the time period is found to have passed.

If in step S101 the predetermined time period is judged to have passed, step S102 is reached. In step S102, the reproduction monitoring program 193 judges whether the current reproduction speed of the reproduction program 192 is 1.05× speed.

If in step S102 the current reproduction speed of the reproduction program 192 is judged to be 1.05× speed, step S103 is reached. In step S103, the reproduction monitoring program 193 queries the buffer 191 to find the amount of the currently accommodated image data therein. Based on the amount of image data reported from the buffer 191, the reproduction monitoring program 193 judges whether the delay time is less than one second. In other words, the reproduction monitoring program 193 checks to see whether the image data in the buffer 191 fall short of the amount of data corresponding to a one-second reproduction.

If in step S103 the delay time is judged to be less than one second, that means the amount of the image data being held in the buffer 191 is appropriate and that the buffered data should not be reduced further in quantity. In this case, step S104 is reached in which the reproduction monitoring program 193 sets the reproduction program 192 for 1.00× reproduction speed. Control is then returned to step S101, and the subsequent steps are repeated.

If in step S103 the delay time is not judged to be less than one second, that means it is necessary to reduce the amount of the image data in the buffer 191. In this case, control is returned to step S101 with the reproduction speed kept unchanged at 1.05× speed. The subsequent steps are then repeated.

If in step S102 the current reproduction speed of the reproduction program 192 is not judged to be 1.05× speed, step S105 is reached. In step S105, the reproduction monitoring program 193 queries the buffer 191 to find the amount of the image data retained therein. Based on the amount of image data reported from the buffer 191, the reproduction monitoring program 193 judges whether the delay time exceeds three seconds. That is, the reproduction monitoring program 193 determines whether the image data being held in the buffer 191 exceed the amount of data corresponding to a three-second reproduction.

If in step S105 the delay time is judged to exceed three seconds, that means the amount of the image data in the buffer 191 is excessive. In this case, step S106 is reached in which the reproduction monitoring program 193 sets the reproduction program 192 for 1.05× reproduction speed. Control is then returned to step S101 and the subsequent steps are repeated.

If in step S105 the delay time is not judged to exceed three seconds, that means the amount of the image data in the buffer 191 is appropriate. In this case, control is returned to step S101 with the reproduction speed kept unchanged at 1.00× speed. The subsequent steps are then repeated.

As described, the client program 131 periodically checks the buffer 191 for the amount of image data retained therein. Given the report of the image data amount from the buffer 191, the client program 131 adjusts the reproduction speed accordingly. The process makes it possible to minimize the amount of the image data in the buffer 191 and to keep the data amount therein constant. The client program 131 can thus reproduce images in real time based on the received stream without deleting image frames.

The client program 131 may alternatively change the reproduction speed in finer increments. For example, if the buffer 191 is judged to retain the amount of image data corresponding to a 0.5-second reproduction, the client program 131 may set reproduction for 1.01× speed; with the buffer 191 holding the amount of image data corresponding to a 1.0-second reproduction, the client program 131 may switch to 1.02× speed; with the buffer 191 retaining the image data large enough to represent a 1.5-second reproduction, the client program 131 may set 1.03× reproduction speed. These steps will further reduce the fluctuation in the amount of the image data accommodated in the buffer 191.

As another alternative, if the buffer 191 is judged to hold image data exceeding a predetermined amount, the client program 131 may erase the image data while changing the reproduction speed at the same time.

As a further alternative, if the buffer 191 is judged to retain the image data in a quantity below a predetermined threshold level, the client program 131 may set a reproduction speed less than 1.0× speed.

As yet another alternative, the reproduction monitoring program 193 may change the time intervals at which to query the buffer 191 for the amount of retained data therein, in keeping with the data amount report from the buffer 191.

Although the reproduction monitoring program 193 was described above as setting the reproduction speed upon comparison of the amount of data reported from the buffer 191 with a predetermined threshold quantity, this is not limitative of the invention. Alternatively, the reproduction monitoring program 193 may compute the reproduction speed to be set by applying a suitable function to the reported data amount.

Figure 33:
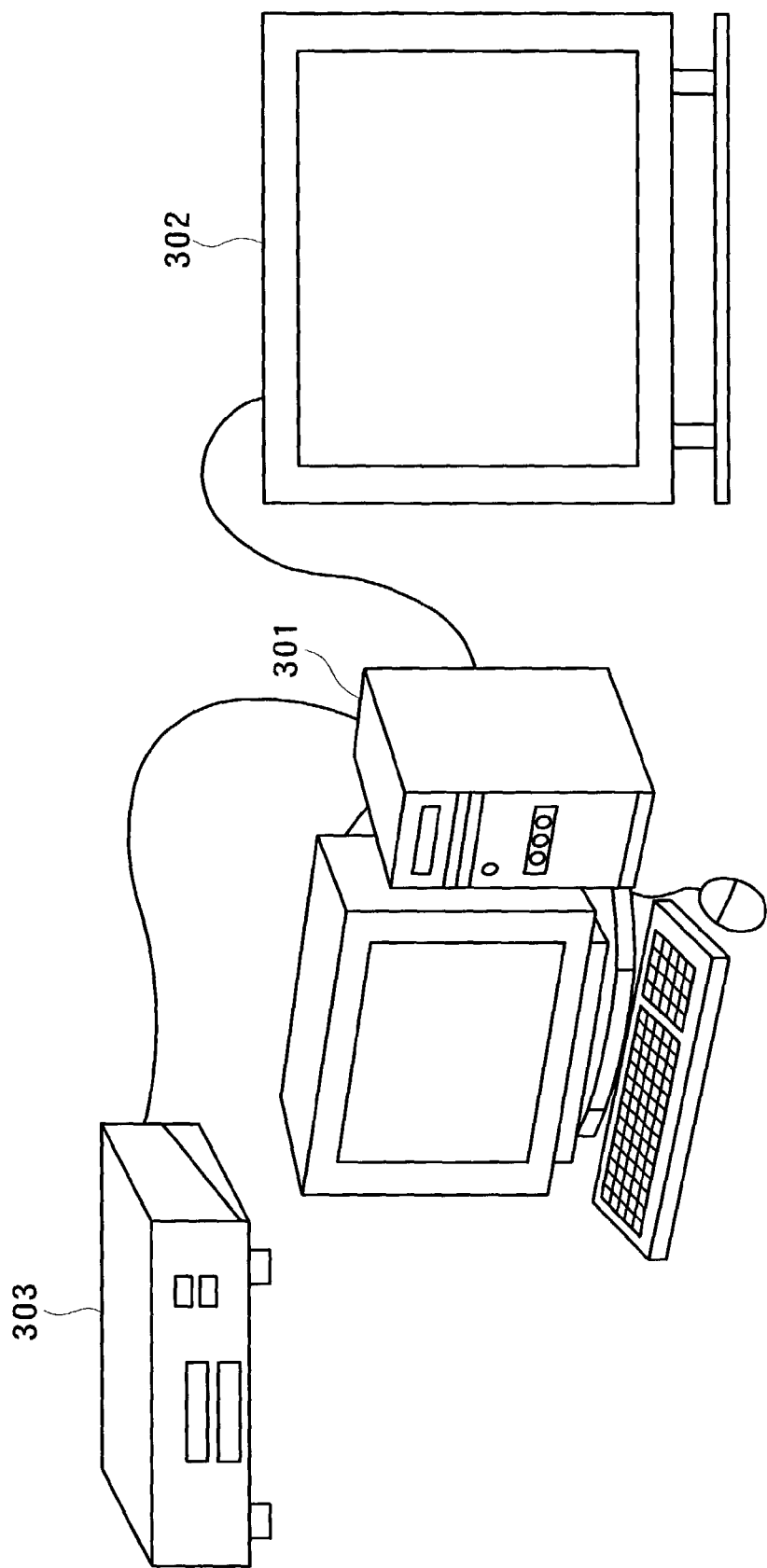
FIG. 33 is a block diagram indicating a structure of a content providing system as a second embodiment of this invention.

FIG. 33 is a block diagram indicating a typical structure of a content providing system practiced as the second embodiment of this invention. In the setup of FIG. 33, a personal computer 301 supplies image and sound signals in analog or digital format to a monitor 302. The analog image signal fed to the monitor 302 from the personal computer 301 may illustratively be an NTSC (National Television System Committee) composite signal or RGB (Red, Green, Blue) component signals. The digital image signal supplied to the monitor 302 from the personal computer 301 may illustratively be an SDI (Serial Digital Interface) or an SMPTE (Society of Motion Picture and Television Engineers) 259M composite digital video signal or component digital video signals.

The monitor 302 displays images and outputs sounds based on the image and sound signals sent from the personal computer 301.

A VCR (video cassette recorder) 303 records images and sounds to a video cassette tape loaded therein, and retrieves recorded images and sounds from the loaded video cassette tape. The VCR 303 supplies the personal computer 301 with a composite video signal corresponding to the retrieved images and with signals representing the retrieved sounds.

The personal computer 301 records contents made up of image and sound data, and receives TV programs being broadcast.

The image signal fed by the personal computer 301 to the monitor 302 is either an image signal representing the content recorded in the personal computer 301, or an image signal corresponding to the TV program being received by the personal computer 301.

Given the image and sound signals from the VCR 303 or other sources, the personal computer 301 generates illustratively MPEG image data and sound data and records the generated image and sound data as contents. Also, the personal computer 301 decodes signals from an antenna, not shown, which receives terrestrial or satellite-related radio waves of a TV program from a TV station and generates image and sound data representing the program thus received.

On supplying the monitor 302 with an image signal corresponding to a recorded content, the personal computer 301 illustratively generates an analog video signal representative of the content in question. The analog video signal thus generated is sent to the monitor 302.

Furthermore, the personal computer 301 feeds the monitor 302 with an analog video signal corresponding to a received TV program.

Figure 34:
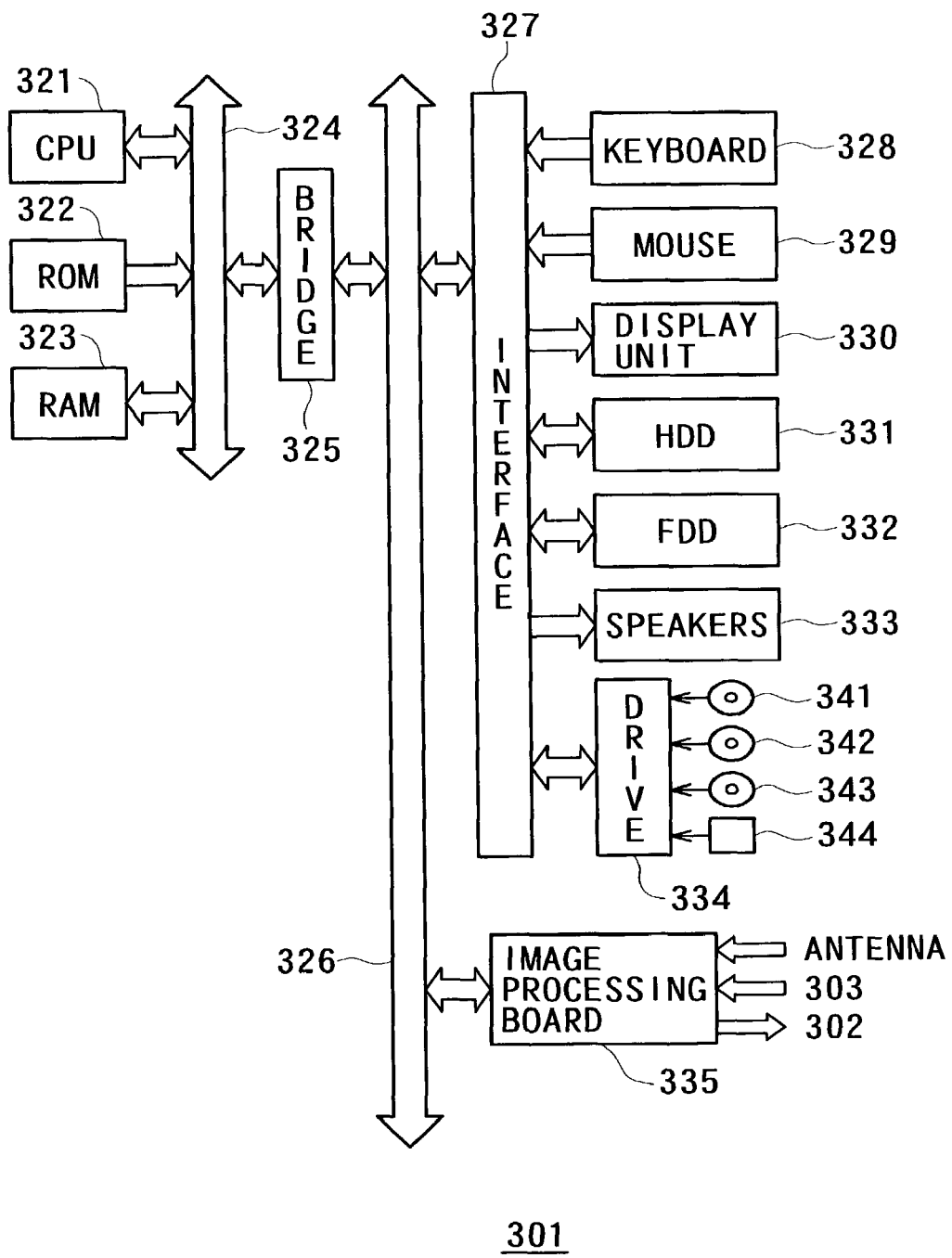
FIG. 34 is a block diagram representing a structure of a personal computer as part of the second embodiment.

FIG. 34 is a block diagram representing a typical structure of the personal computer 301. In the setup of FIG. 34, a CPU 321 executes an OS and application programs on the personal computer 301. A ROM 322 accommodates basically fixed data as part of the programs and operation parameters used by the CPU 321. A RAM 323 stores programs executed by the CPU 321 and parameters that are varied as needed during the execution. These component parts are interconnected by a host bus 324.

The host bus 324 is connected via a bridge 325 to an external bus 326 such as a PCI bus.

A keyboard 328 is operated by a user to enter various commands into the CPU 321. A mouse 329 is manipulated by the user to point to and select items on a display unit 330. The display unit 330 is constituted by a CRT or a liquid crystal display displaying diverse kinds of information in text and image. A hard disc drive (HDD) 331 and a floppy (registered trademark) disc drive 332 drive a hard disc and a floppy disc respectively so that programs and information to be handled by the CPU 321 may be written to or read from the disc in question. Speakers 333 are provided to reproduce sounds.

A drive 334 reads programs or data from a magnetic disc 341, an optical disc 342, a magneto-optical disc 343, or a semiconductor memory 344 loaded in the drive 334. The retrieved programs or data are supplied to the HDD 331 or RAM 323.

The components ranging from the keyboard 328 to the drive 334 are connected to an interface 327. In turn, the interface 327 is connected to the CPU 321 via the external bus 326, bridge 325, and host bus 324.

An image processing board 335 under control of the CPU 321 generates image and sound data based on signals coming from an antenna, not shown, the generated data being representative of broadcast programs that have been captured by the antenna. The image and sound data are output to the HDD 331 over the external bus 326 and through the interface 327.

The image processing board 335 under control of the CPU 321 generates image and sound data based on signals coming from the VCR 303. The image and sound data thus generated are output to the HDD 331 over the external bus 326 and through the interface 327.

Further under control of the CPU 321, the image processing board 335 generates image and sound analog signals based on signals coming from the antenna, not shown. The generated image and sound analog signals representative of a received TV program are sent to the monitor 302.

Also under control of the CPU 321, the image processing board 335 acquires contents made up of image and sound data from the HDD 331 via the external bus 326 and interface 327 in order to generate image and sound analog signals reflecting the acquired image and sound data. The analog signals thus generated are supplied to the monitor 302.

The image processing board 335 is connected to the CPU 321 via the external bus 326, bridge 325, and host bus 324.

Figure 35:
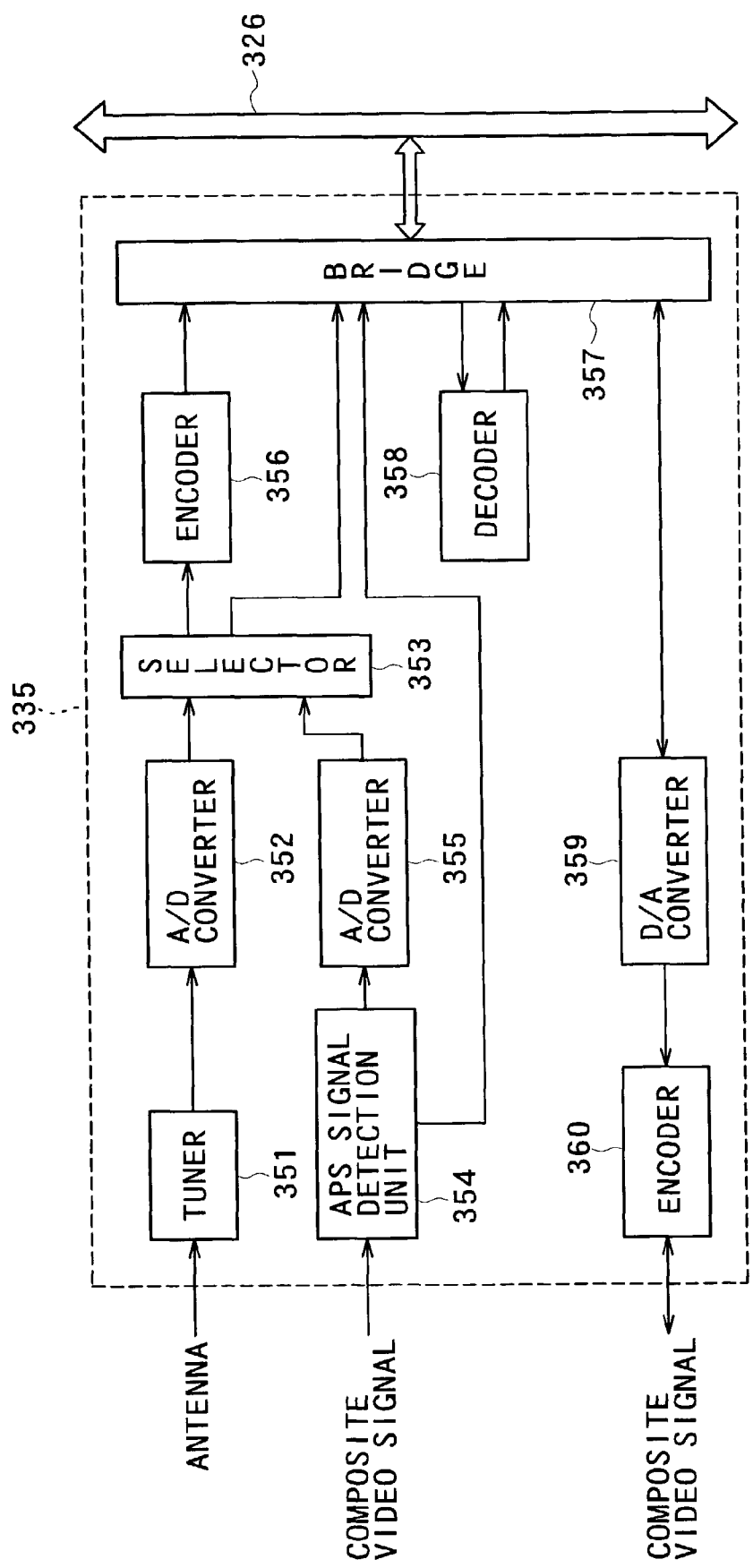
FIG. 35 is a block diagram expressing a structure of an image processing board as part of the personal computer.

FIG. 35 is a block diagram expressing a typical structure of the image processing board 335 as it inputs and outputs composite video signals. In the setup of FIG. 35, a tuner 351 acquires externally supplied TV broadcast signals under control of the CPU 321 and selects the broadcast program on a particular channel out of a plurality of TV channels. The tuner 351 then supplies an A/D converter 352 with analog signals representing the images and sounds of the TV program on the selected channel.

The A/D converter 352 converts the image and sound analog signals representative of the program images and sounds into digital signals, and outputs the converted digital signals to a selector 353.

An APS (Analog Protection System) signal detection unit 354 acquires an analog composite video signal from the VCR 303 and detects an APS signal from the acquired video signal. The APS signal is inserted into the composite video signal for copy control purposes illustratively through the use of the Copy Protection System of Macrovision Corporation (U.S.A.). When the composite video signal is judged to contain the APS signal, the APS signal detection unit 354 supplies a bridge 357 with judgment data indicating the presence of the APS signal in the composite video signal. Where the composite video signal is not judged to contain the APS signal, the APS signal detection unit 354 feeds the bridge 357 with judgment data indicating the absence of the ASP signal in the composite video signal.

The APS signal detection unit 354 supplies an A/D converter 355 with the analog composite video signal coming from the VCR 303.

The A/D converter 355 converts the analog composite video signal from the APS signal detection unit 354 into a digital signal, and supplies the converted digital signal to the selector 353.

Under control of the CPU 321, the selector 353 selects either the digital signal coming from the A/D converter 352 or the digital signal from the A/D converter 355, and sends the selected digital signal to an encoder 356 or to the bridge 357.

When a TV program is to be recorded to the HDD 331, the selector 353 supplies the encoder 356 with the digital signal coming from the A/D converter 352. Where the TV program is to be reproduced on the display unit 330 and through the speakers 333 or where the analog signal representative of the TV program is to be fed to the monitor 302, the selector 353 supplies the bridge 357 with the digital signal coming from the A/D converter 352.

Where the TV program is to be recorded to the HDD 311 while being reproduced on the display unit 330 and through the speakers 333 simultaneously, or where the analog signal representing the TV program is to be fed to the monitor 302, the selector 353 supplies both the encoder 356 and the bridge 357 with the digital signal coming from the A/D converter 352.

When the image data corresponding to the analog signal from the VCR 303 are to be recorded to the HDD 331, the selector 353 supplies the encoder 356 with the digital signal coming from the A/D converter 355. Where the images representative of the analog signal from the VCR 303 are to be reproduced on the display unit 330, or where an analog signal corresponding to the one from the VCR 303 is to be fed to the monitor 302, the selector 353 supplies the bridge 357 with the digital signal coming from the A/D converter 355.

Where the image data representing the analog signal from the VCR 303 are to be recorded to the HDD 331 while being reproduced in images on the display unit 330 simultaneously, or where an analog signal corresponding to the one from the VCR 303 is to be fed to the monitor 302, the selector 353 supplies both the encoder 356 and the bridge 357 with the digital signal coming from the A/D converter 355.

The encoder 356 encodes the digital signal from the selector 353 using a suitable compression coding method such as MPEG, and supplies the encoded data to the bridge 357.

The decoder 358 may be fed with image and sound data that have been encoded by a predetermined compression coding method such as MPEG and held on the HDD 331. In that case, the decoder 358 decodes the encoded image and sound data from the HDD 331 and sends the decoded digital signal to the bridge 357.

Where the encoded data representing the TV program or corresponding to the composite video signal from the VCR 303 are to be recorded to the HDD 331, the bridge 357 sends to the HDD 331 the encoded data from the encoder 356 over the external bus 326.

Where the TV program is to be reproduced on the display unit 330 and through the speakers 333, the bridge 357 supplies the display unit 330 with the digital image signal coming from the selector 353 over the external bus 326 and through the interface 327 while feeding the speakers 333 with the digital sound signal via the external bus 326 and interface 327.

Where the encoded data are to be reproduced from the HDD 331, the bridge 357 supplies the decoder 358 with the encoded data retrieved from the HDD 331. The bridge 357 supplies the display unit 330 with the digital image data coming from the decoder 358 over the external bus 326 and through the interface 327 while feeding the speakers 333 with the digital sound signal via the external bus 326 and interface 327.

When reproducing a TV program, the display unit 330 displays images of the program in question using the digital signal fed through the interface 327 or based on an analog signal obtained through conversion by a predetermined method.

When reproducing the TV program, the speakers 333 reproduce sounds of the program using the digital signal fed via the interface 327 or based on an analog signal obtained through conversion by a predetermined method.

Where images are to be displayed on the monitor 302, the bridge 357 supplies a D/A (digital-to-analog) converter 359 with the digital image signal coming from the selector 353. The D/A converter 359 converts the digital signal from the bridge 357 into an analog signal constituted by component signals, and sends the analog signal to an encoder 360.

The encoder 360 converts the analog signal made up of component signals from the D/A converter 359, into an analog composite video signal. The composite video signal thus created is fed to the monitor 302.

Figure 36:
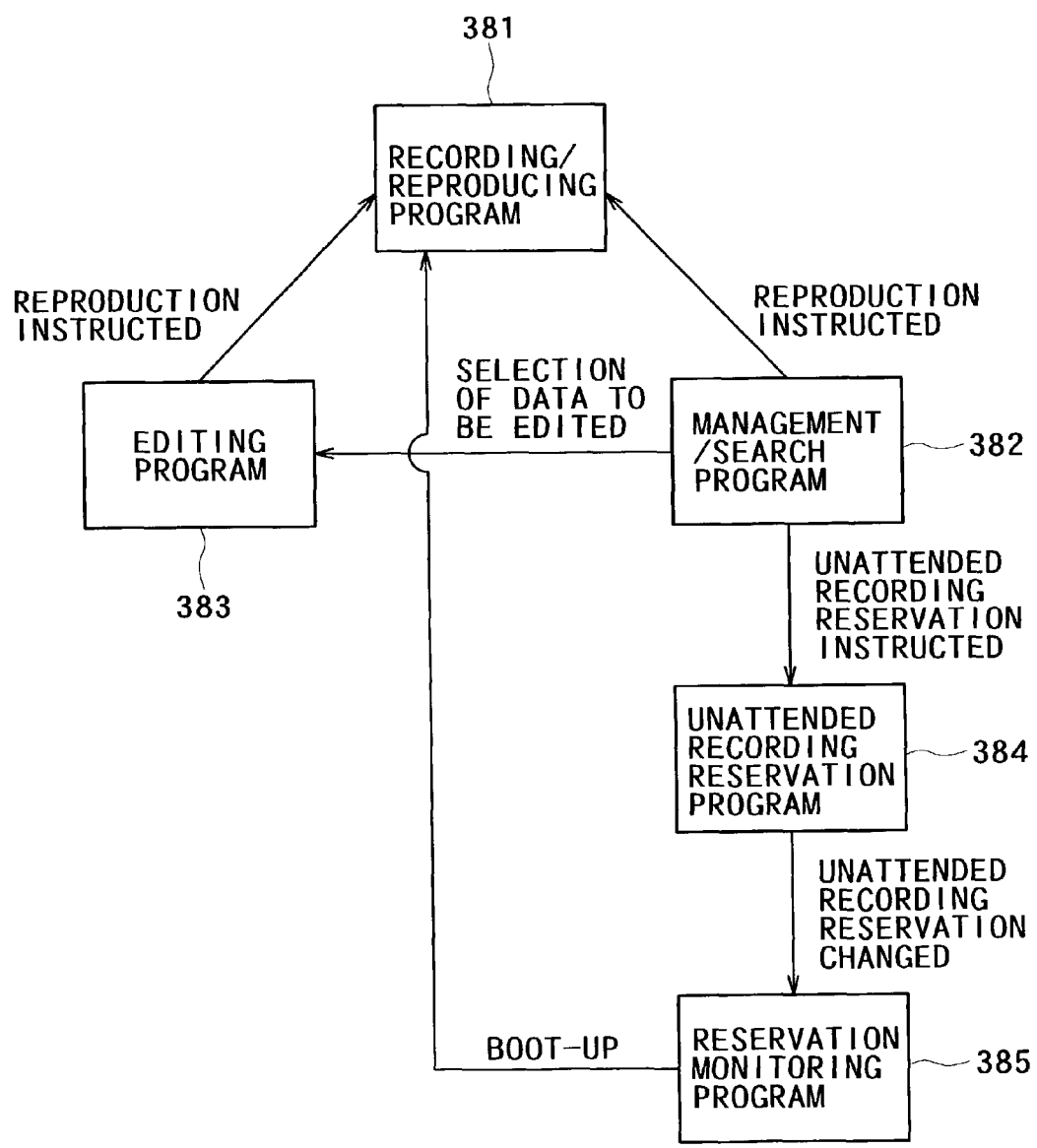
FIG. 36 is an explanatory view of application programs performed by the personal computer.

FIG. 36 is an explanatory view of application programs performed by the personal computer 301. A recording/reproducing program 381 causes the image processing board 335 to generate MPEG image data and sound data in encoded form representing the TV program on a specific channel received by the tuner 351. The data thus encoded are recorded to the HDD 331 by the recording/reproducing program 381.

Given the data from the image processing board 335, the recording/reproducing program 381 checks to see whether the APS signal is contained in the composite video signal coming from the VCR 303.

If the composite video signal from the VCR 303 is not judged to contain the APS signal, the recording/reproducing program 381 causes the image processing board 335 to convert the composite video signal from the VCR 303 into MPEG video data and sound data in encoded form and record the encoded data to the HDD 331.

If the composite video signal from the VCR 303 is judged to contain the APS signal, then the recording/reproducing program 381 stops the recording of the composite video signal coming from the VCR 303.

The recording/reproducing program 381 causes the image processing board 335 to decode contents retrieved from the HDD 331 so as to generate uncompressed image and sound digital signals. The generated digital signals are reproduced as images on the display unit 330 and as sounds through the speakers 333. Also, the recording/reproducing program 381 causes the image processing board 335 to decode contents retrieved from the HDD 331 so as to generate a composite video signal. The composite video signal thus generated is supplied to the monitor 302.

The management/search program 382 causes the display unit 330 to display specific information such as details of contents recorded on the HDD 331 as well as dates and times at which such recordings were made. The management/search program 382 instructs the recording/reproducing program 381 to reproduce a specific content or to select a particular content to be edited. The management/search program 382 supplies information on the selected content to an editing program 383 for editing purposes. Furthermore, the management/search program 382 gives an unattended recording instruction to an unattended recording reservation program 384.

Based on the content data recorded on the HDD 331, the editing program 383 edits images and sounds of the selected content (i.e., some images and sounds included in the specific content are put together) so as to generate content data in a predetermined format for reproduction of edited images and sounds.

Illustratively, a content in the predetermined format does not include digital image or sound data and is constituted instead by information for designating both the selected content and the images and sounds to be utilized. Such a content may be reproduced by the recording/reproducing program 381.

Given suitable settings, the unattended recording reservation program 384 reserves the content to be recorded unattended. The reserved content complies with the current settings in place (such as recording time and recording mode determining the image quality of recording) and is assigned a storage space beforehand on the HDD 331.

A reservation monitoring program 385 runs constantly when the personal computer 301 is in operation (i.e., the program 385 is resident while the OS is Running). As such, the reservation monitoring program 385 executes unattended recording of the content reserved by the unattended recording reservation program 384 in keeping with an RTC (real time clock), not shown. The reservation monitoring program 385 also permits modifications of the settings of the content subject to unattended recording.

The reservation monitoring program 385 boots up the recording/reproducing program 381 if the program 381 is not active with suitable settings in place and if unattended recording is started.

Figure 37:
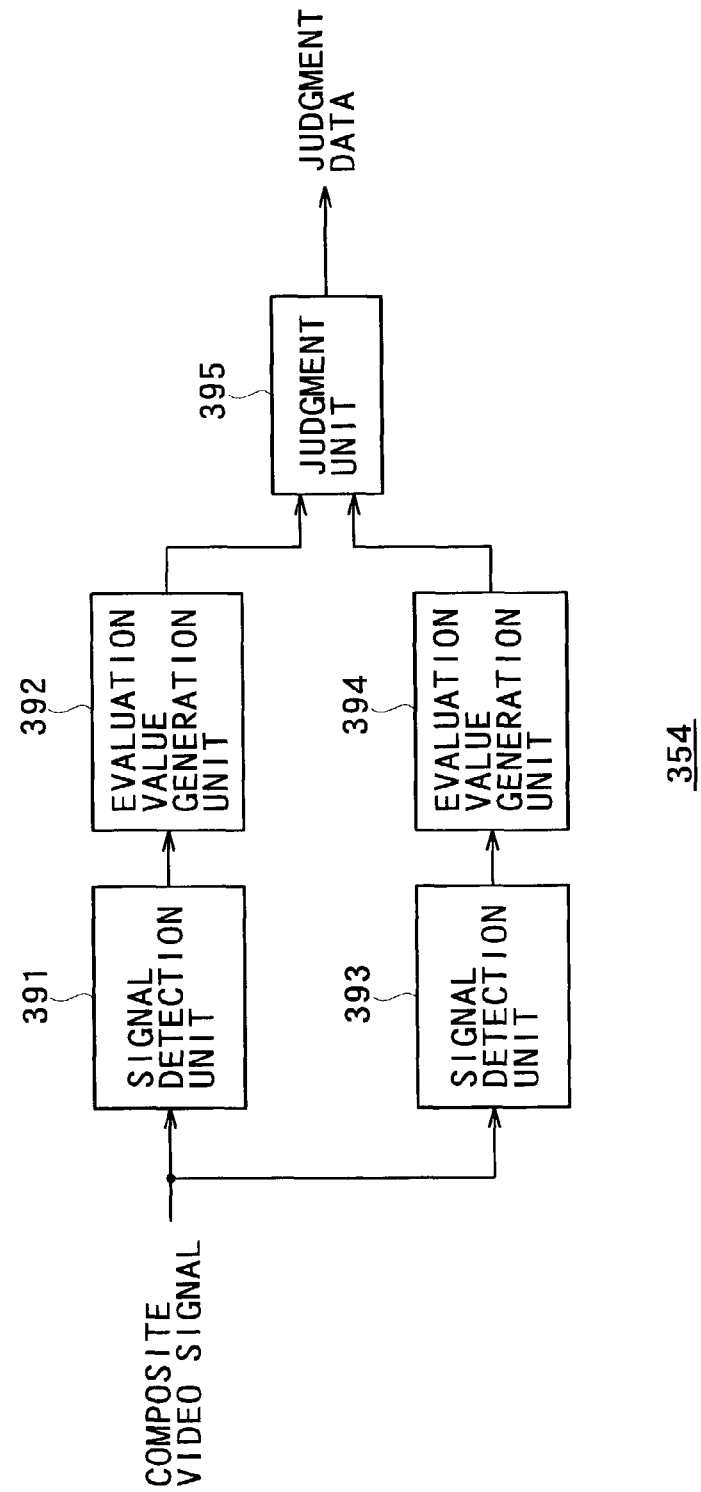
FIG. 37 is a block diagram showing a structure of an APS signal detection unit as part of the image processing board.

FIG. 37 is a block diagram showing a typical structure of the APS signal detection unit 354. A signal detection unit 391 as part of the APS signal detection unit 354 detects in each field an APS signal with an amplitude more than that of the ordinary black or white level, the APS signal being included in the blanking part of the input composite video signal. Upon detection of the APS field in a given field, the signal detection unit 391 supplies an evaluation value generation unit 392 as another part of the APS signal detection unit 354 with a signal indicating the presence of the APS signal in the field in question. If no APS signal is detected in a given field, the signal detection unit 391 furnishes the evaluation value generation unit 392 with a signal indicating the absence of the APS signal in that field.

On the basis of the signal coming from the signal detection unit 391, the evaluation value generation unit 392 generates an evaluation value A that may be any one of 0 through 100.

Illustratively, given signals from the signal detection unit 391 indicating the detection of the APS signal from five consecutive fields out of ten, the evaluation value generation unit 392 generates an evaluation value A of 80. When fed with signals from the signal detection unit 391 indicating the detection of the APS signal from five discontinuous fields out of ten, the evaluation value generation unit 392 generates an evaluation value A of 70. On receiving signals from the signal detection unit 391 indicating the detection of the APS signal from four consecutive fields out of ten, the evaluation value generation unit 392 generates an evaluation value A of 60. Upon receipt of signals from the signal detection unit 391 indicating the detection of the APS signal from four discontinuous fields out of ten, the evaluation value generation unit 392 generates an evaluation value A of 50.

The evaluation value generation unit 392 supplies the generated evaluation value A to a judgment unit 395, another part of the APS signal detection unit 354.

A signal detection unit 393 as another part of the APS signal detection unit 354 detects the APS signal by a method different from that of the signal detection unit 391. Illustratively, the APS signal detection unit 354 detects in each field an APS signal included in such a manner that the color burst signal in the input composite video signal differs in phase from the ordinary color burst signal. Upon detection of the APS field in a given field, the signal detection unit 393 supplies an evaluation value generation unit 394 as another part of the APS signal detection unit 354 with a signal indicating the presence of the APS signal in the field in question. If no APS signal is detected in a given field, the signal detection unit 393 furnishes the evaluation value generation unit 394 with a signal indicating the absence of the APS signal in that field.

On the basis of the signal coming from the signal detection unit 393, the evaluation value generation unit 394 generates an evaluation value B that may be any one of 0 through 100.

Illustratively, given signals from the signal detection unit 393 indicating the detection of the APS signal from ten consecutive fields, the evaluation value generation unit 394 generates an evaluation value B of 80. When fed with signals from the signal detection unit 393 indicating the detection of the APS signal from nine consecutive fields, the evaluation value generation unit 394 generates an evaluation value B of 70. On receiving signals from the signal detection unit 393 indicating the detection of the APS signal from eight consecutive fields, the evaluation value generation unit 394 generates an evaluation value B of 60. Upon receipt of signals from the signal detection unit 393 indicating the detection of the APS signal from seven consecutive fields, the evaluation value generation unit 394 generates an evaluation value B of 50.

The evaluation value generation unit 394 supplies the generated evaluation value B to the judgment unit 395.

On receiving the evaluation values A and B from the evaluation value generation units 392 and 394 respectively, the judgment unit 395 judges whether the APS signal is included in the composite video signal, and outputs judgment data indicating the result of the judgment.

For example, if any one of the evaluation values A and B from the evaluation value generation units 392 and 394 is 80 or greater, the judgment unit 395 judges that the APS signal is included in the composite video signal, and outputs judgment data indicating the presence of the APS signal in the composite video signal. If one of the evaluation values A and B from the evaluation value generation units 392 and 394 is at least 60 and the other evaluation value is at least 50, the judgment unit 395 also judges that the APS signal is included in the composite video signal, and outputs the judgment data indicating the presence of the APS signal in the composite video signal.

Furthermore, if one of the evaluation values A and B from the evaluation value generation units 392 and 394 is at least 70 and the other evaluation value is at least 40, the judgment unit 395 also judges that the APS signal is included in the composite video signal, and outputs the judgment data indicating the presence of the APS signal in the composite video signal.

Figure 38:
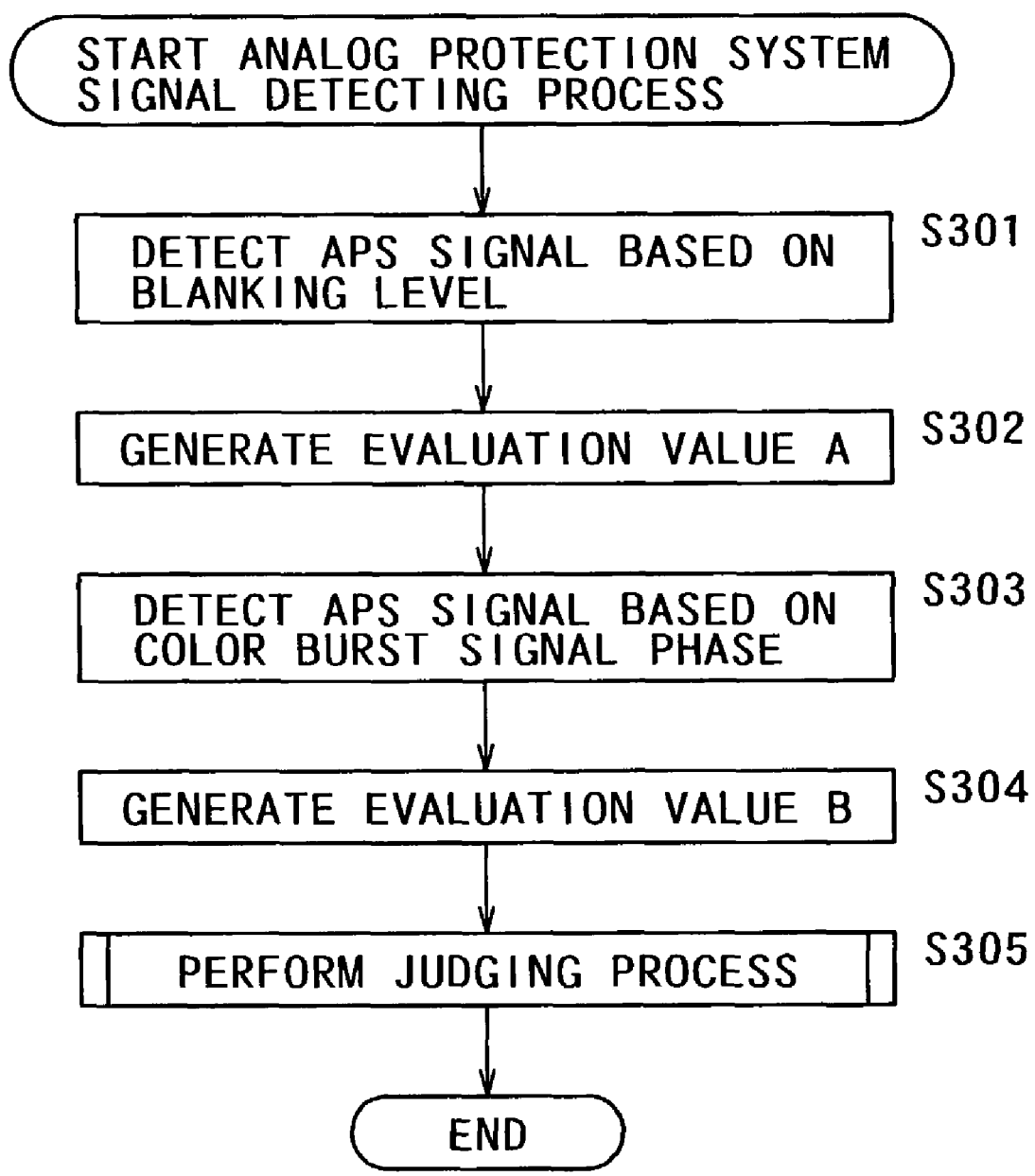
FIG. 38 is a flowchart of steps constituting an APS signal detecting process.

FIG. 38 is a flowchart of steps constituting an APS signal detecting process carried out by the APS signal detection unit 354. In step S301, the signal detection unit 391 detects in each field the APS signal in accordance with the blanking level, and sends the result of the detection to the evaluation value generation unit 392. In step S302, the evaluation value generation unit 392 generates the evaluation value A based on the result of the detection from the signal detection unit 391. Specifically, the evaluation value generation unit 392 generates the evaluation value A on the basis of the number of consecutive fields in which the APS signal is detected, or based on the ratio of fields containing the APS signal to a predetermined reference field count.

In step S303, the signal detection unit 393 detects in each field the APS signal based on the phase of the color burst signal, and supplies the result of the detection to the evaluation value generation unit 394. In step S304, the evaluation value generation unit 394 generates the evaluation value B based on the result of the detection coming from the signal detection unit 393. Specifically, the evaluation value generation unit 394 generates the evaluation value B on the basis of the number of consecutive fields in which the APS signal is detected.

In step S305, given the evaluation values A and B from the evaluation value generation units 392 and 394, the judgment unit 395 judges whether the APS signal is included in the composite video signal, and outputs judgment data indicating the result of the judgment. The processing is then terminated.

Figure 39:
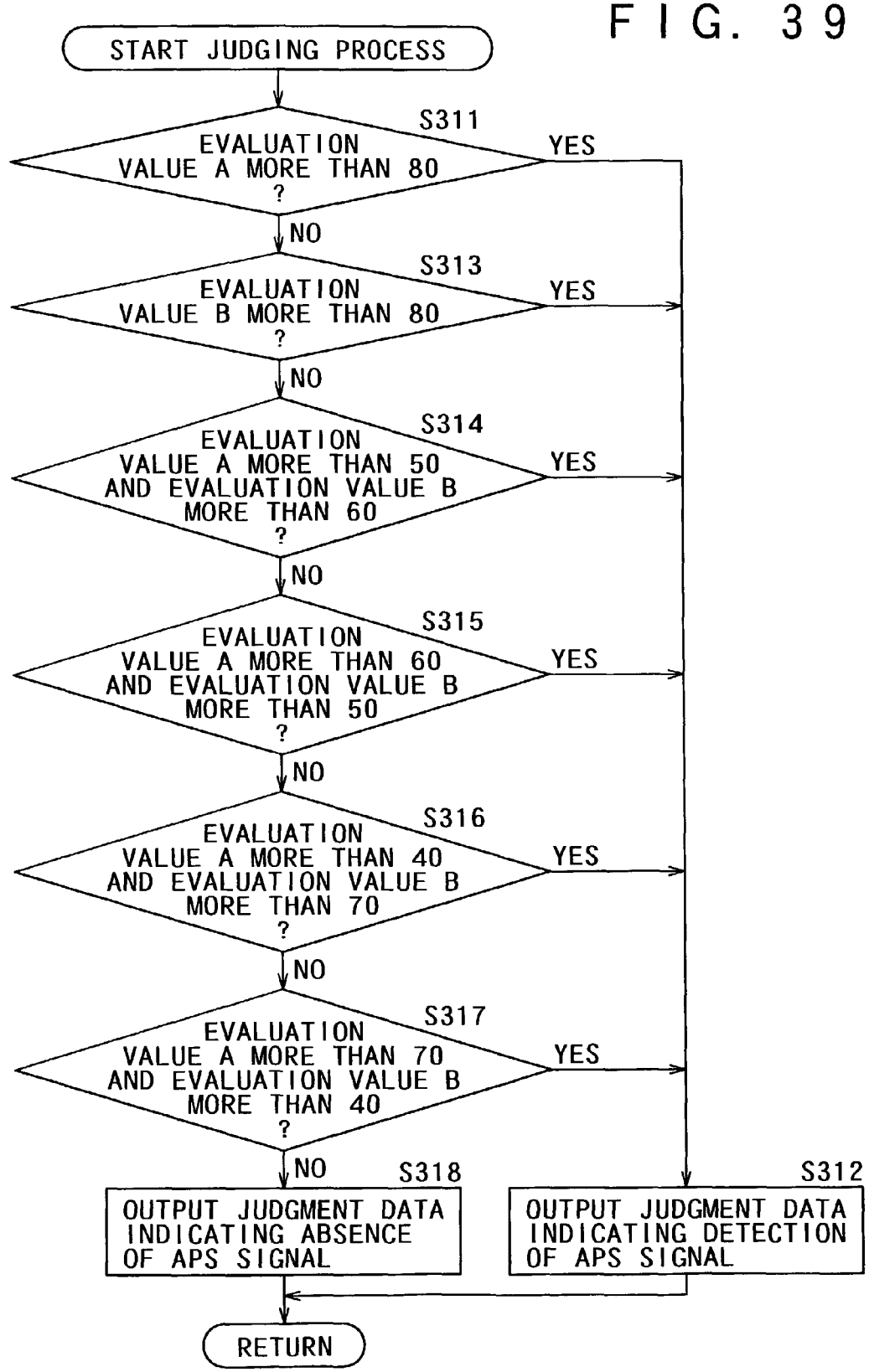
FIG. 39 is a flowchart of steps constituting a judging process.

FIG. 39 is a flowchart of steps constituting a judging process which corresponds to step S305 in FIG. 38 and which is performed by the judgment unit 395. In step S311, the judgment unit 395 judges whether the evaluation value A is more than 80. If the evaluation value A is judged to be more than 80, step S312 is reached. In step S312, the judgment unit 395 outputs judgment data indicating the detection of the APS signal, and terminates the processing.

If in step S311 the evaluation value A is not judged to be more than 80, then step S313 is reached. In step S313, the judgment unit 395 judges whether the evaluation value B is more than 80. If in step S313 the evaluation value B is judged to be more than 80, step S312 is reached in which the judgment unit 395 outputs the judgment data indicating the detection of the APS signal and terminates the processing.

If in step S313 the evaluation value B is not judged to be more than 80, step S314 is reached. In step S314, the judgment unit 395 judges whether the evaluation value A is more than 50 and the evaluation value B more than 60. If in step S314 the evaluation value A is judged to be more than 50 and the evaluation value B more than 60, then step S312 is reached. In step S312, the judgment unit 395 outputs the judgment data indicating the detection of the APS signal and terminates the processing.

If in step S314 the evaluation value A is judged to be 50 or less or if the evaluation value B is judged 60 or less, then step S315 is reached. In step S315, the judgment unit 395 judges whether the evaluation value A is more than 60 and the evaluation value B more than 50. If in step S315 the evaluation value A is judged to be more than 60 and the evaluation value B more than 50, then step S312 is reached in which the judgment unit 395 outputs the judgment data indicating the detection of the APS signal and terminates the processing.

If in step S315 the evaluation value is judged to be 60 or less or if the evaluation value B is judged 50 or less, then step S316 is reached. In step S316, the judgment unit 395 judges whether the evaluation value A is more than 40 and the evaluation value B more than 70. If in step S316 the evaluation value A is judged to be more than 40 and the evaluation value B more than 70, step S312 is reached. In step S312, the judgment unit 395 outputs the judgment data indicating the detection of the APS signal and terminates the processing.

If in step S316 the evaluation value A is judged to be 40 or less or the evaluation value B 70 or less, step S317 is reached. In step S317, the judgment unit 395 judges whether the evaluation value A is more than 70 and the evaluation value B more than 40. If in step S317 the evaluation value A is judged to be more than 70 and the evaluation value B more than 40, then step S312 is reached in which the judgment unit 395 outputs the judgment data indicating the detection of the APS signal and terminates the processing.

If in step S317 the evaluation value A is judged to be 70 or less or the evaluation value B 40 or less, step S318 is reached. In step S318, the judgment unit 395 outputs judgment data indicating the absence of the APS signal and terminates the processing.

As described, the APS signal detection unit 354 detects the APS signal in accordance with evaluation values based on two different signal detection methods. The scheme makes the APS signal detection process more accurate than if the signal detection were carried out through the use of a single signal detection method.

Figure 40:
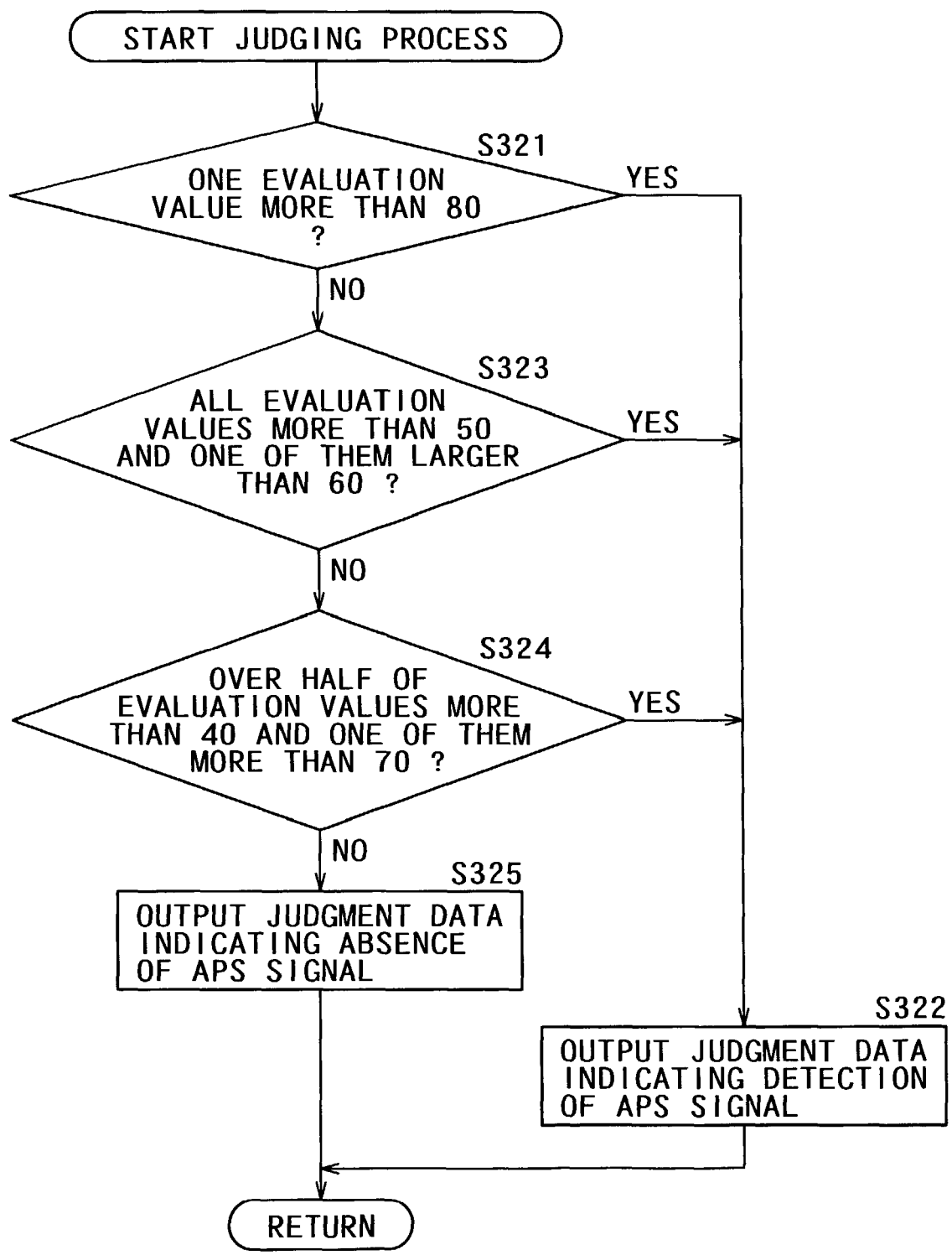
FIG. 40 is a flowchart of steps constituting another judging process.

FIG. 40 is a flowchart of steps constituting another judging process performed by the APS signal detection unit 354 generating three or more evaluation values based on three or more different APS signal detection methods.

In step S321, the APS signal detection unit 354 judges whether any one of the evaluation values involved is more than 80. If any one evaluation value is judged to be more than 80, step S322 is reached. In step S322, the APS signal detection unit 354 outputs judgment data indicating the detection of the APS signal and terminates the processing.

If in step S321 any one evaluation value is not judged to be more than 80, step S323 is reached. In step S323, the APS signal detection unit 354 judges whether all evaluation values are more than 50 and one of them is more than 60. If in step S323 all evaluation values are judged to be more than 50 and one of them more than 60, step S322 is reached in which the APS signal detection unit 354 outputs the judgment data indicating the detection of the APS signal and terminates the processing.

If in step S323 any one evaluation value is judged to be 50 or less or if all evaluation values are judged 60 or less, then step S324 is reached. In step S324, the APS signal detection unit 354 judges whether more than half of the evaluation values are more than 40 and one of them more than 70. If in step S324 more than half of the evaluation values are judged to be more than 40 and one of them more than 70, then step S322 is reached in which the APS signal detection unit 354 outputs the judgment data indicating the detection of the APS signal and terminates the processing.

If in step S324 more than half of the evaluation values are judged to be 40 or less or all evaluation values are judged 70 or less, then step S325 is reached. In step S325, the APS signal detection unit 354 outputs judgment data indicating the absence of the APS signal and terminates the processing.

As described, the APS signal detection unit 354 judges whether the APS signal is detected in accordance with three or more evaluation values based on three or more different APS signal detection methods. This scheme makes the APS signal detection process more accurate than if the signal detection were carried out through the use of two different signal detection methods.

The threshold values to be compared with evaluation values in the judging steps in FIG. 39 or 40 are not limited to 80, 70, 60, 50 or 40 as indicated in the flowchart. Alternatively, the threshold values may be greater or smaller than the values given provided they are determined in appropriate proportions relative to one another.

Any other suitable APS signal detection methods may be utilized in generating evaluation values. This invention is not limited by such signal detection methods.

Below is a description of how the recording/reproducing program 381 is booted when unattended recording of a reserved content is started.

FIG. 41 is a schematic view of a window displayed on the display unit 330 of the personal computer by the unattended recording reservation program 384. Clicking on a menu named "Set" in this window causes the unattended recording reservation program 384 to display the command for booting the recording/reproducing program upon recording.

When the command for booting the recording/reproducing program upon recording is checked, the unattended recording reservation program 384 sets a boot flag of the reservation monitoring program 385 to a value for booting the recording/reproducing program 381 upon starting of unattended recording.

When the command for booting the recording/reproducing program upon recording is not checked, the unattended recording reservation program 384 sets the boot flag of the reservation monitoring program 385 to a value for keeping the recording/reproducing program 381 from getting booted upon starting of recording.

If the command for booting the recording/reproducing program upon recording is not checked as shown in FIG. 41, then the unattended recording reservation program 384 sets the boot flag of the reservation monitoring program 385 to the value for keeping the recording/reproducing program 381 from getting booted upon starting of recording. In that case, the reservation monitoring program 385 does not boot the recording/reproducing program 381 when unattended recording is started.

Figure 42:
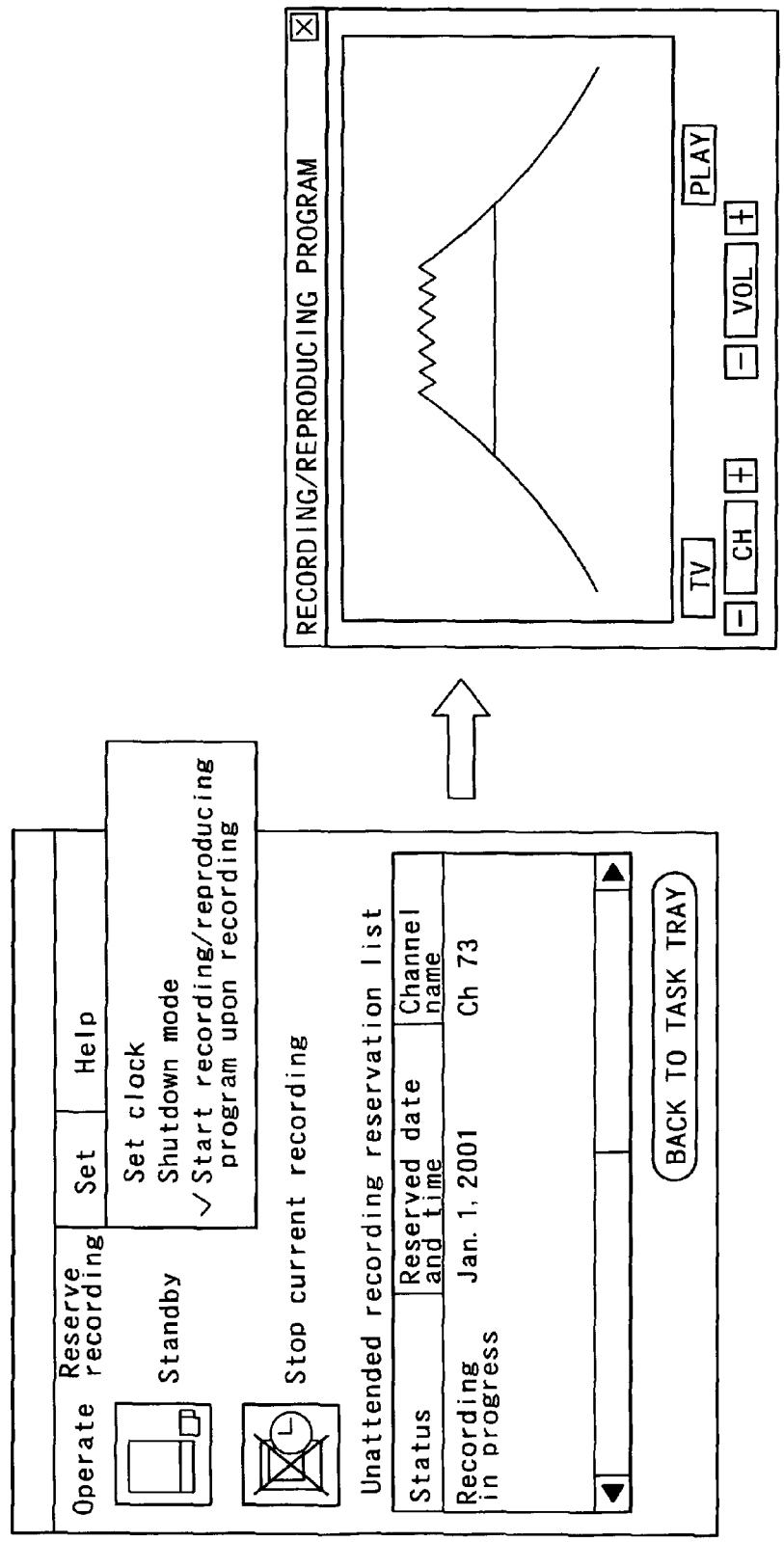
FIG. 42 is an explanatory view of a process of booting a recording/reproducing program.

If the command for booting the recording/reproducing program upon recording is checked as indicated in FIG. 42, then the unattended recording reservation program 384 sets the boot flag of the reservation monitoring program 385 to the value for booting the recording/reproducing program 381 upon starting of recording. In that case, the reservation monitoring program 385 boots the recording/reproducing program 381 if the program 381 is not in operation when unattended recording is started.

Figure 43:
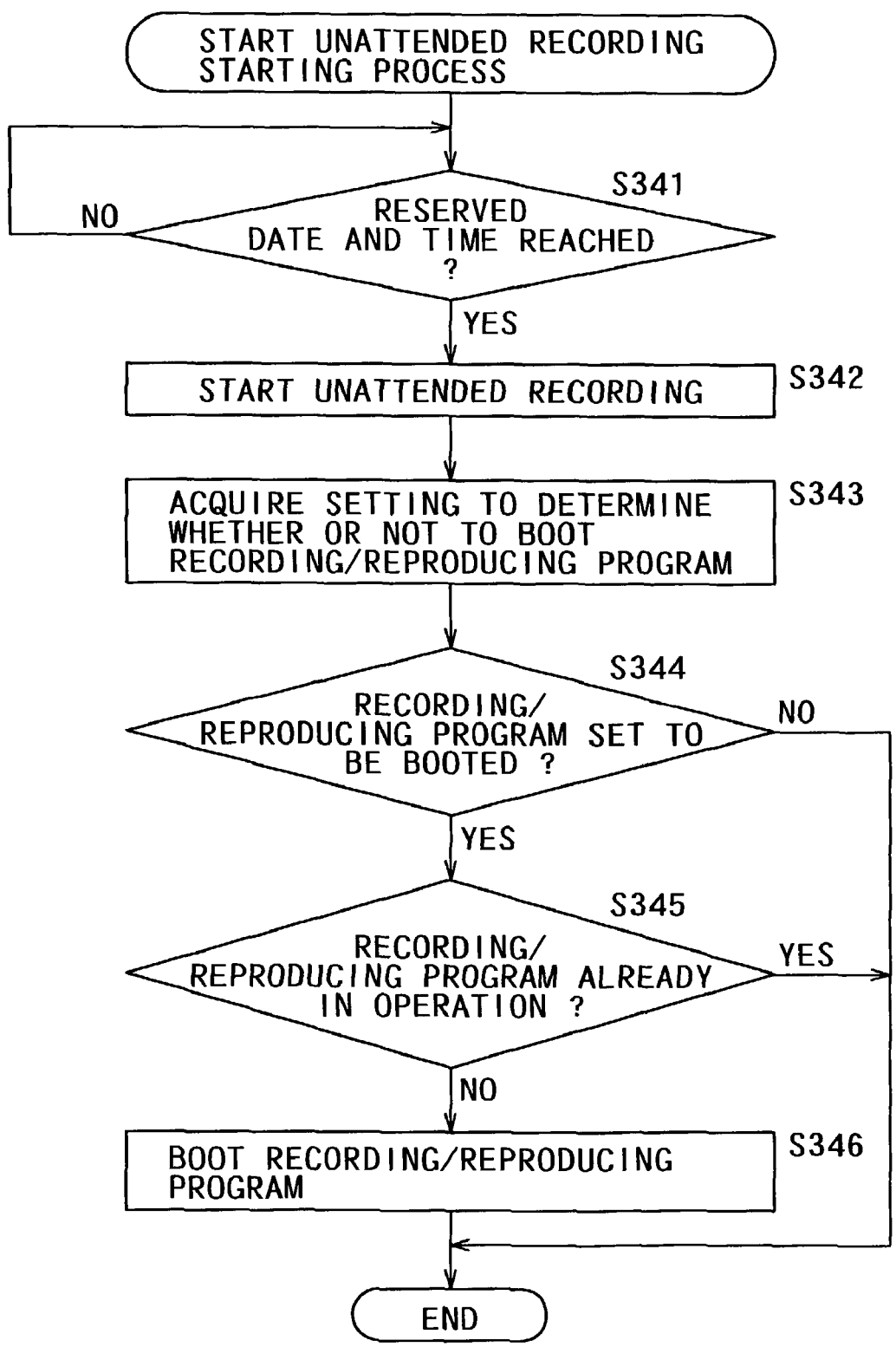
FIG. 43 is a flowchart of steps constituting an unattended recording starting process.

FIG. 43 is a flowchart of steps constituting an unattended recording starting process performed by the reservation monitoring program 385. In step S341, the reservation monitoring program 385 judges whether the date and time at which a content is reserved for unattended recording are reached on the basis of time data from an RTC, not shown. If the date and time for unattended recording are not judged to be reached, control is returned to step S341 and the judgment is repeated until the date and time in question are judged reached.

If in step S341 the date and time for unattended recording are judged to be reached, the reservation monitoring program 385 goes to step S342. In step S342, the reservation monitoring program 385 starts unattended recording of the reserved content.

In step S343, the reservation monitoring program 385 reads the value of the boot flag in order to determine whether or not to boot the recording/reproducing program 381. In step S344, the reservation monitoring program 385 judges whether the setting is for booting the recording/reproducing program 381. If the set value is judged as one for booting the recording/reproducing program 381, then step S345 is reached. In step S345, the reservation monitoring program 385 judges whether the recording/reproducing program 381 is already in operation.

If in step S345 the recording/reproducing program 381 is not judged to be in operation, the reservation monitoring program 385 boots the recording/reproducing program 381 and terminates the processing.

If in step S345 the recording/reproducing program 381 is judged to be already in operation, there is no need to boot it anew. In that case, the reservation monitoring program 385 skips step S346 and terminates the processing.

If in step S344 the reservation monitoring program 385 judges the set value to be one for keeping the recording/reproducing program 381 from getting booted, there also is no need to boot up the program 381. In that case, the reservation monitoring program 385 skips steps S345 and S346 and terminates the processing.

As described, where the boot flag is set to boot the recording/reproducing program 381, the reservation monitoring program 385 allows the recording/reproducing program 381 to boot up automatically. With the recording/reproducing program 381 booted up, the user is able to know quickly whether unattended recording of a reserved TV program is being executed and what kind of program has been reserved for unattended recording.

If a sound-only program such as an FM broadcast program has been reserved for unattended recording and if the recording of such a program is started, the reservation monitoring program 385 may let the recording/reproducing program 381 boot up automatically and allow the program 381 to output only the sounds.

What follows is a description of how to switch between two settings: one for displaying information about images and/or sounds on the monitor 302, and the other for not displaying such information.

Figure 44:
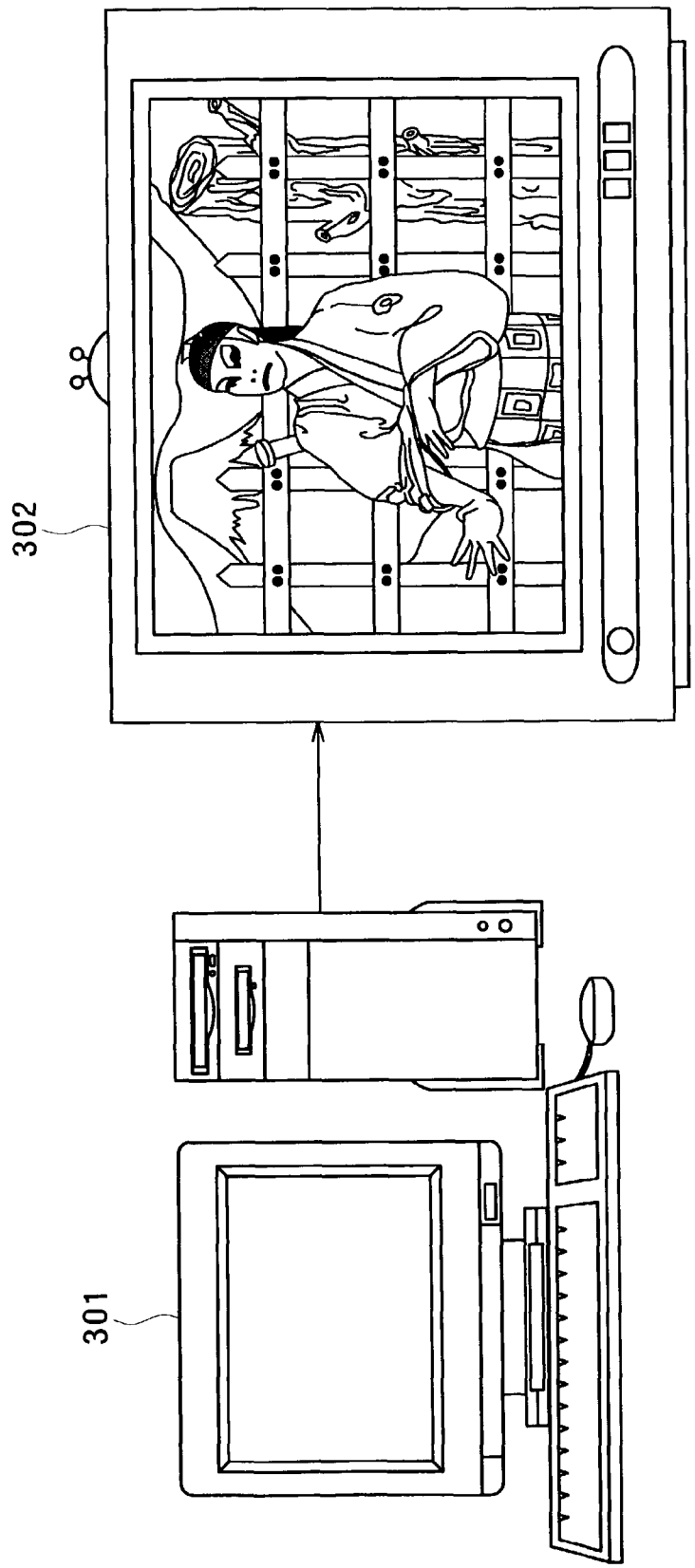
FIG. 44 is an explanatory view of a process of displaying information.

As shown in FIG. 44, the recording/reproducing program 381 run by the personal computer 301 causes the image processing board 335 to supply the monitor 302 with a composite video signal representing a recorded content or a currently received TV program. Based on the composite video signal coming from the personal computer 2, the monitor 302 displays images representative of the content held in the personal computer 301 or the TV program being received by the personal computer 301.

If the command for displaying information onto a video output is checked in the "Set" menu displayed by the recording/reproducing program 381, the recording/reproducing program 381 causes the image processing board 335 to generate a composite video signal for displaying not only images representing the recorded content or the currently received TV program but also information about the screen on the display unit 330 and/or about the sounds being reproduced. The composite view signal thus generated is sent from the image processing board 335 to the monitor 302.

Figure 45:
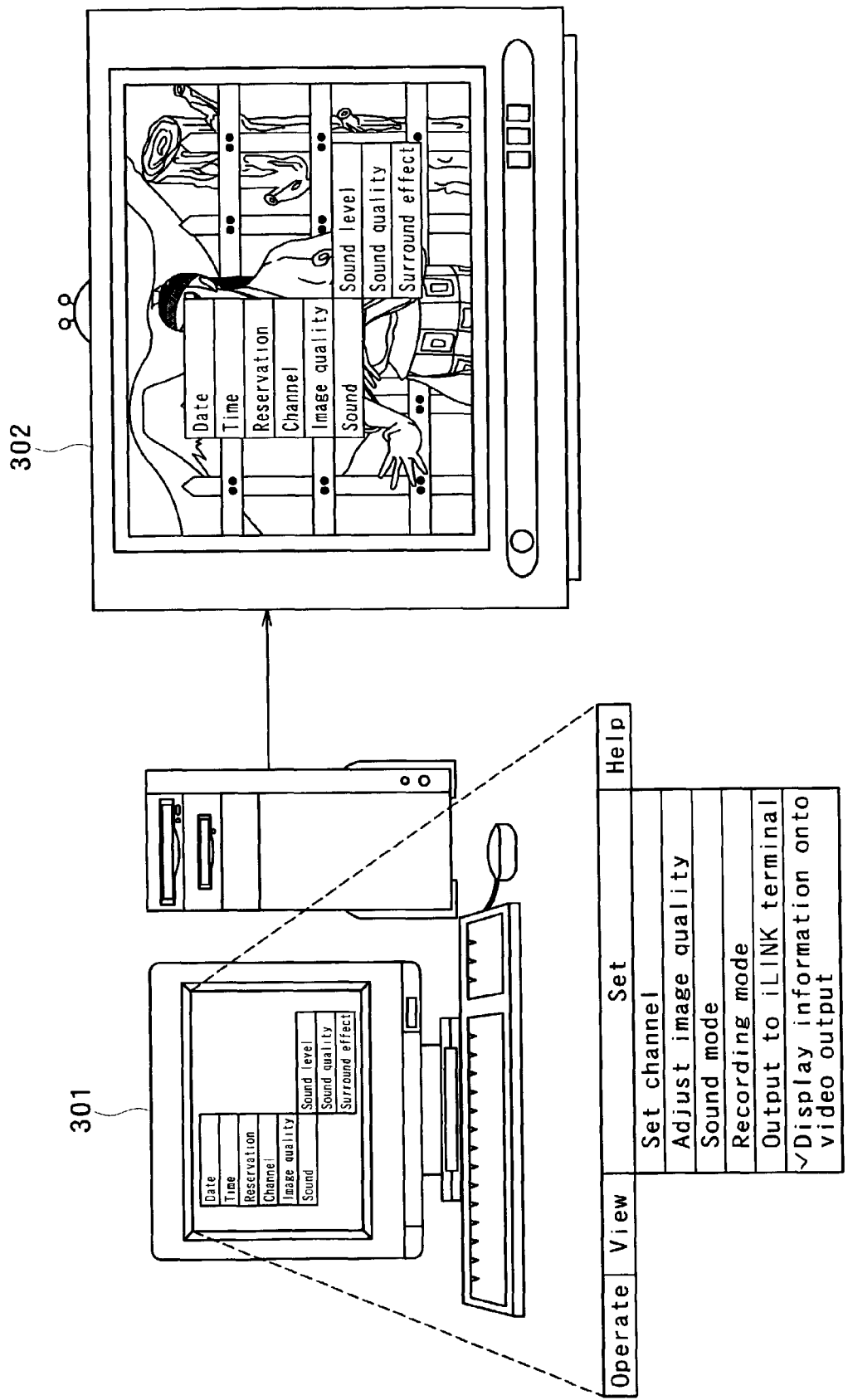
FIG. 45 is another explanatory view of the process of displaying information.

As shown in FIG. 45, given the composite video signal from the personal computer 2, the monitor 302 displays not only images representing the recorded content or the currently received TV program but also information equivalent to that about the screen on the display unit 330 and/or about the sounds being reproduced.

If the command for displaying information onto a video output is not checked in the "Set" menu displayed by the recording/reproducing program 381, the recording/reproducing program 381 causes the image processing board 335 to generate a composite video signal for displaying only images representing the recorded content or the currently received TV program. The composite view signal thus generated is supplied from the image processing board 335 to the monitor 302.

Figure 46:
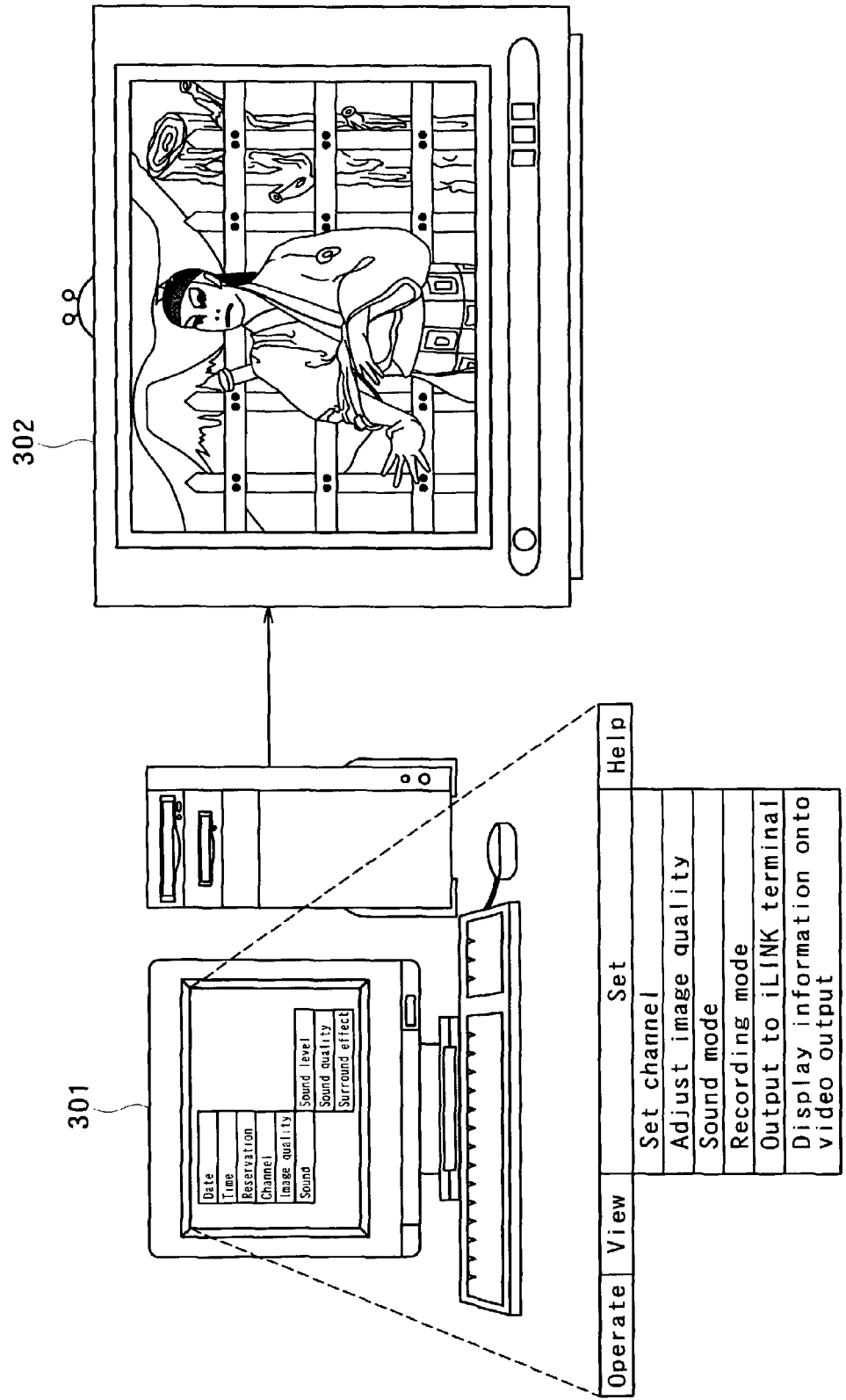
FIG. 46 is another explanatory view of the process of displaying information.

As shown in FIG. 46, given the composite video signal from the personal computer 2, the monitor 302 displays only images representing the recorded content from the personal computer 301 or the TV program currently received by the personal computer 301.

However, whether the command for displaying information onto a video output is checked or not, the recording/ reproducing program 381 causes the display unit 330 of the personal computer 301 to display information related to images or sounds.

Figure 47:
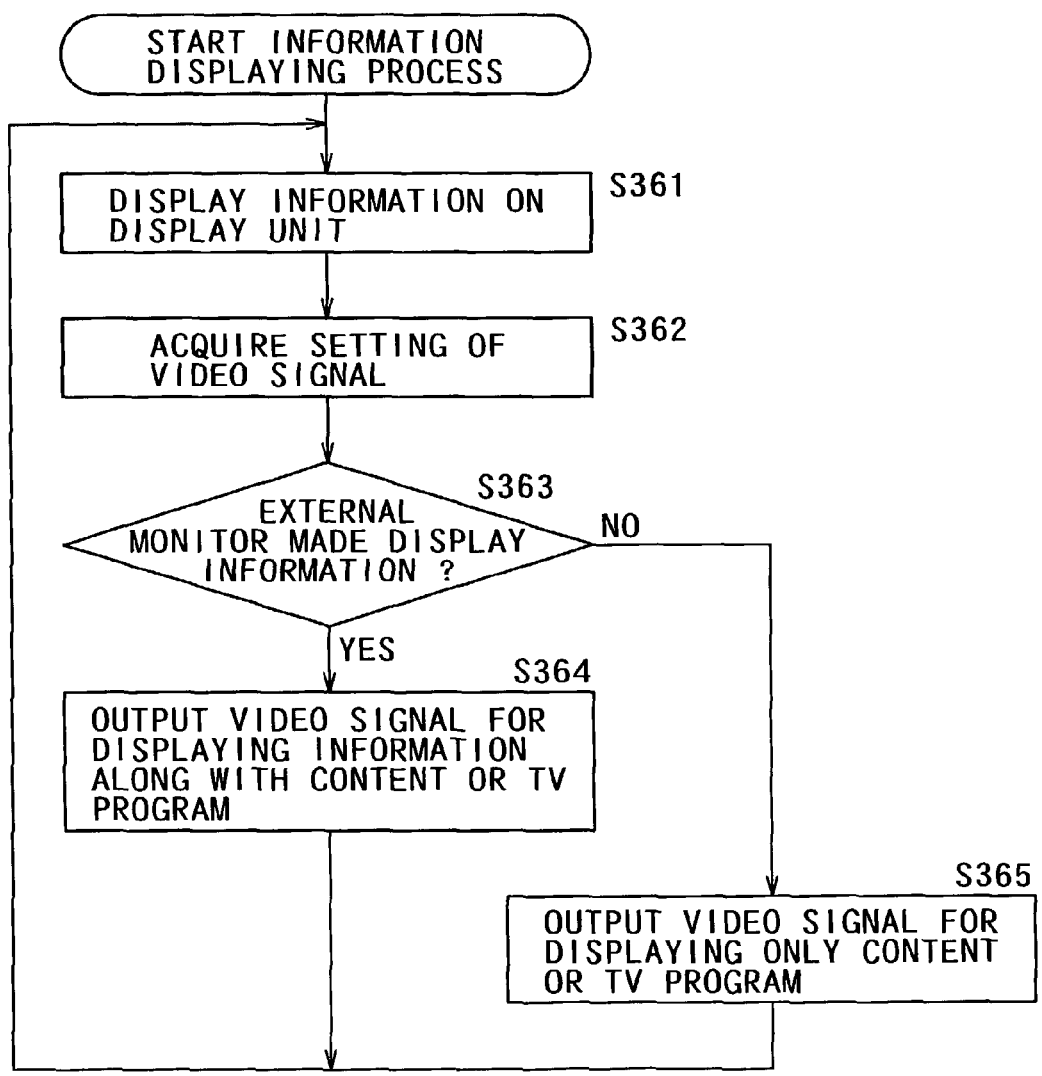
FIG. 47 is a flowchart of steps constituting an information displaying process.

FIG. 47 is a flowchart of steps constituting an information displaying process carried out by the recording/reproducing program 381. In step S361, the recording/reproducing program 381 causes the display unit 330 to display information related to images or sounds. In step S362, the recording/reproducing program 381 acquires the setting of a composite video signal based on the setting of the command for displaying information onto a video output.

In step S363, the recording/reproducing program 381 determines whether or not to display the information related to images or sounds on the display unit 330 that is an external monitor. If it is determined to display the information related to images or sounds, step S364 is reached. In step S364, the recording/reproducing program 381 supplies the image processing board 335 with data corresponding to the information related to images or sounds. The image processing board 335 is then made to output a composite video signal for displaying not only the content or TV program but also the information related to images or sounds. This terminates the processing.

If in step S363 it is not determined to display the information related to images or sounds, step S365 is reached. In step S365, the recording/reproducing program 381 causes the image processing board 335 to output a composite video signal for displaying only the content or TV program. Then the processing is terminated.

As described, the recording/reproducing program 381 can switch between the two settings: on the one hand, with information about images or sounds displayed on the display unit 330, the content or TV program may be displayed along with the image- or sound-related information on the monitor 302 that is an external monitor. On the other hand, only the content or TV program may be displayed on the external monitor 302.

The scheme above allows the user to choose, without modifying connections between the devices configured, not to include the information related to images or sounds into the images being recorded based on the distributed composite video signal from the personal computer 301 regardless of the user's operation on the personal computer 301.

Described below is how sessions are switched with regard to a plurality of users on the personal computer 301.

Figure 48:
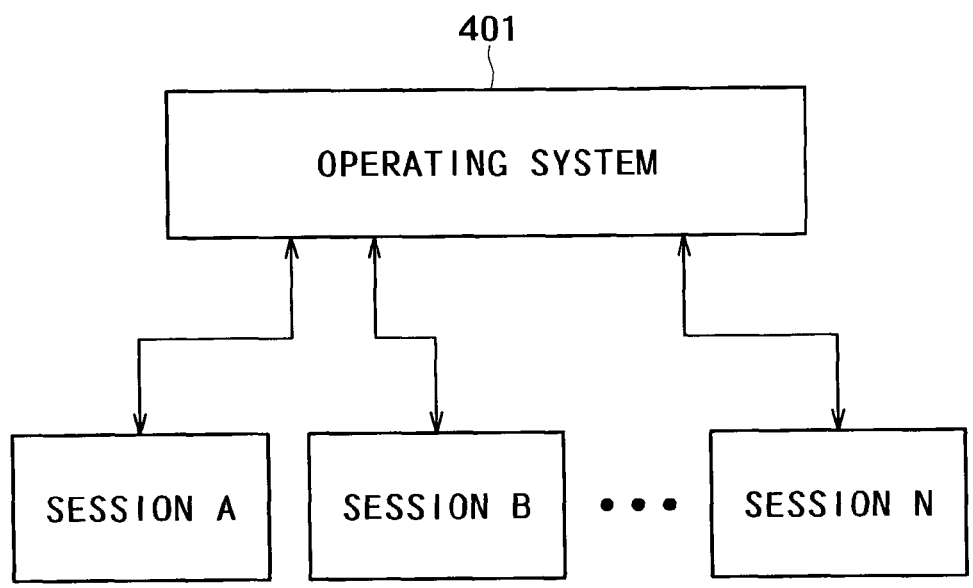
FIG. 48 is an explanatory view of sessions.

FIG. 48 is an explanatory view of how sessions are typically switched. An operating system 401 run by the CPU 321 of the personal computer 301 carries out such processes as execution of application programs, users' log-in, and management of resources such as pieces of hardware and programs of the personal computer 301.

When a first user logs in, the operating system 401 carries out a session A involving establishment of program settings (i.e., environment settings) corresponding to the user in question.

If a second user logs in with the first user still logging on, the operating system 401 carries out a session B involving establishment of program settings corresponding to the second user.

Likewise, when another user logs in with a number of users already logging on, the operating system 401 carries out the next session (e.g., session N) involving establishment of program settings corresponding to the newly logging user.

With a plurality of users logging in concurrently, one of them may decide to use the personal computer 301. If that happens, the operating system 401 switches sessions to execute the one corresponding to the user who is about to manipulate the personal computer 301.

The session-switching feature above is implemented illustratively as Fast User Switching by Windows (registered trademark) XP, an operating system from Microsoft Corporation.

Described below with reference to FIGS. 49 through 52 is how the resources of the personal computer 301 are managed upon switching of sessions according to the invention.

Figure 49:
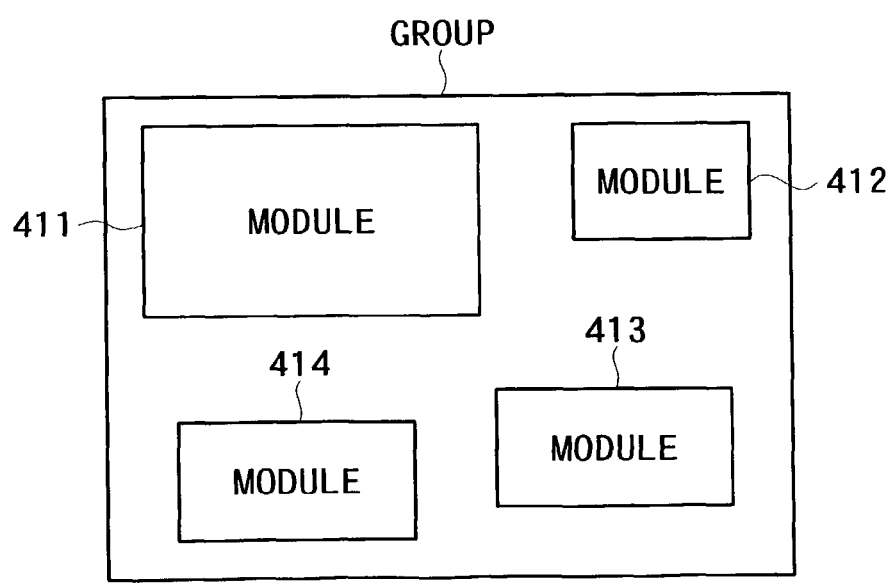
FIG. 49 is an explanatory view of a group.

FIG. 49 is an explanatory view of a group that comprises modules 411, 412, 413 and 414. Each of the modules 411 through 414 corresponds to a single resource such as a piece of hardware or software.

Figure 50:
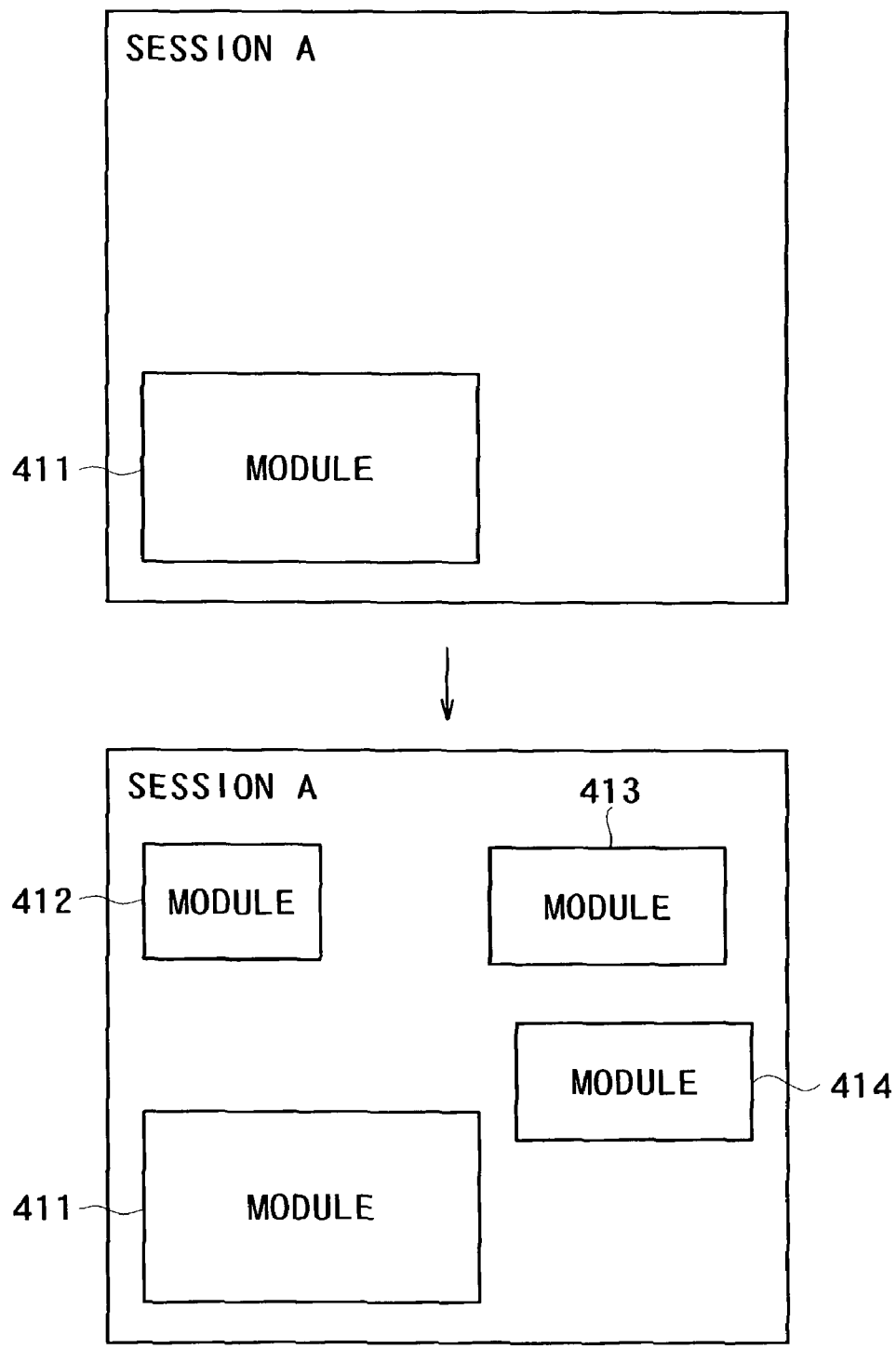
FIG. 50 is an explanatory view of a process of activating modules.
Figure 51:
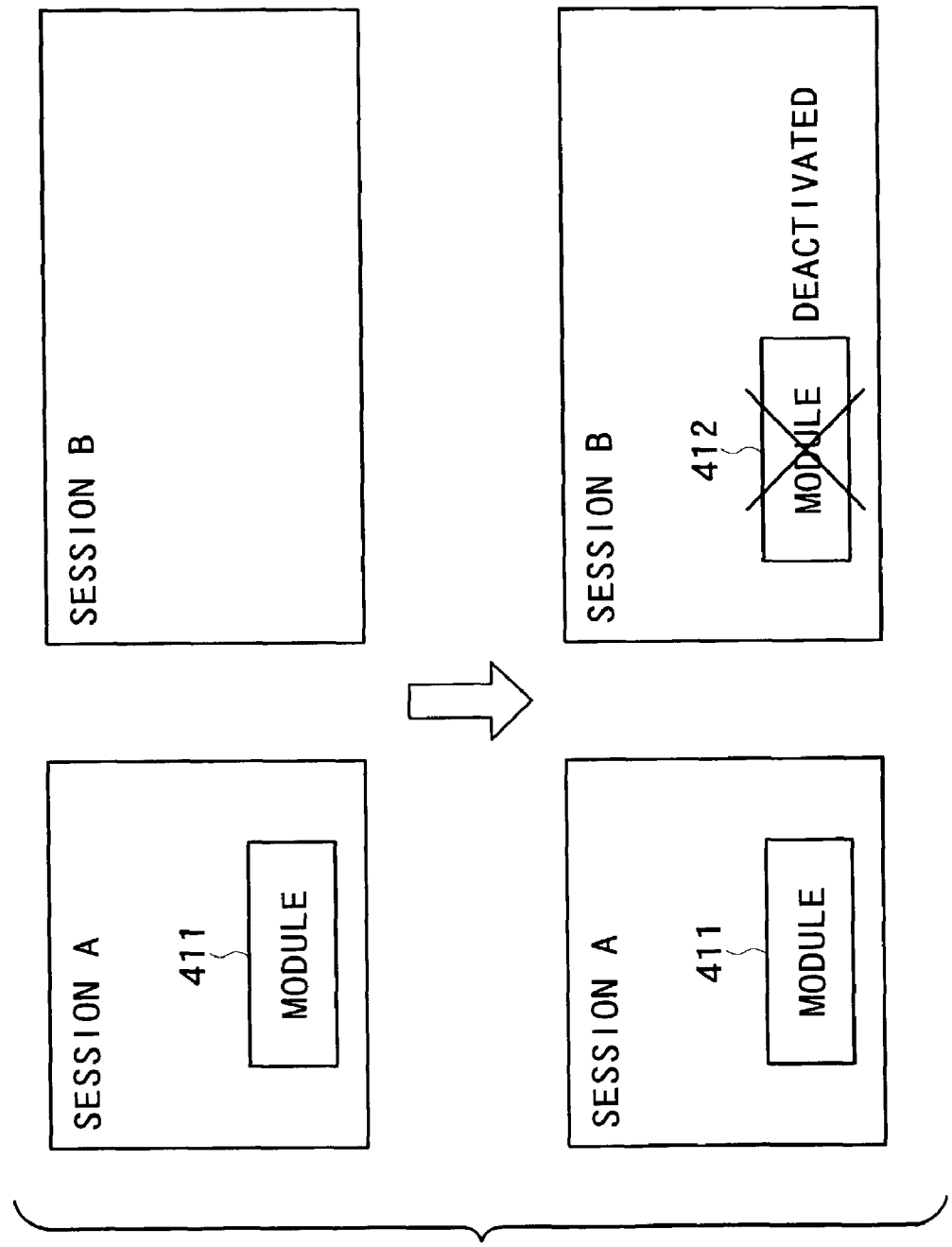
FIG. 51 is another explanatory view of the process of activating modules.
Figure 52:
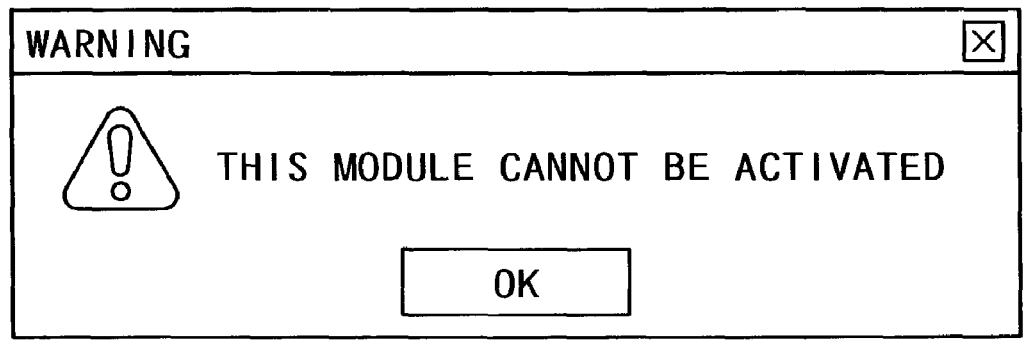
FIG. 52 is a schematic view of a dialog box.

Illustratively, the module 411 may correspond to the recording/reproducing program 381, module 412 to the reservation monitoring program 385, module 413 to the image processing board 335, and module 414 to the unattended recording reservation program 384.

Where the module 411 is being active in the session A as shown in FIG. 50, the modules 412, 413 and 414 are also allowed to be activated or used in the same session A.

On the other hand, if the module 411 is active in the session A, the module 412 belonging to the same group as the module 411 is not allowed to be activated in the session B even if so requested. If the module 412 is requested to be activated in the session B with the module 411 already active in the session A, the module 412 prompts the display unit 330 to display a dialog box warning that the module 412 cannot be activated.

Figure 53:
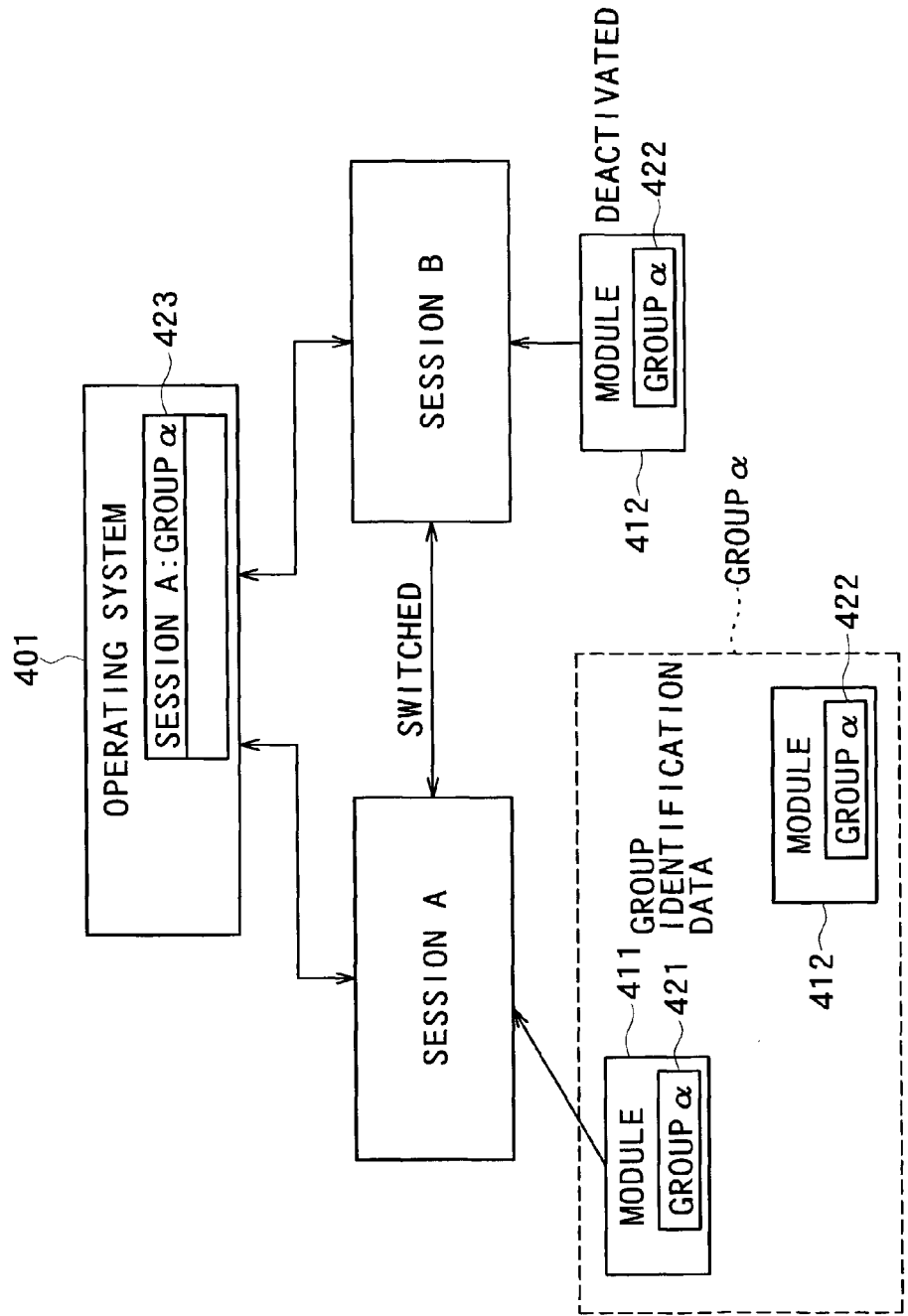
FIG. 53 is another explanatory view of the process of activating modules.

FIG. 53 is an explanatory view of the process of activating the module 412 that belongs to group α, the same group as that of the module 411. The module 411 belonging to the group α retains group identification data 421 identifying the group α. The module 412 that also belongs to the group α contains group identification data 422 denoting the group α.

When the module 411 belonging to the group α is activated in the session A, the module 411 submits the internally retained group identification data 421 to the operating system 401. Given the group identification data 421 from the module 411, the operating system 401 accordingly generates executable module group identification data 423 indicating correspondence between the session A and the group α.

When the module 412 is requested to be activated, the module 412 in turn requests the executable module group identification data 423 from the operating system 401.

In response to the request from the module 412, the operating system 401 supplies the executable module group identification data 423 to the module 412.

Based on the executable module group identification data 423 fed by the operating system 401, the module 412 judges whether any other module of the same group is being active or in use in another session.

If any other module of the same group is not judged to be active or in use in any other session, the module 412 remains active. If some other module of the same group is judged to be active or in use in some other session, the module 412 stops being active.

Illustratively, it might happen that the module 411 of the same group a as that of the module 412 is judged being active or in use in the session A. In that case, the module 412 is deactivated.

Figure 54:
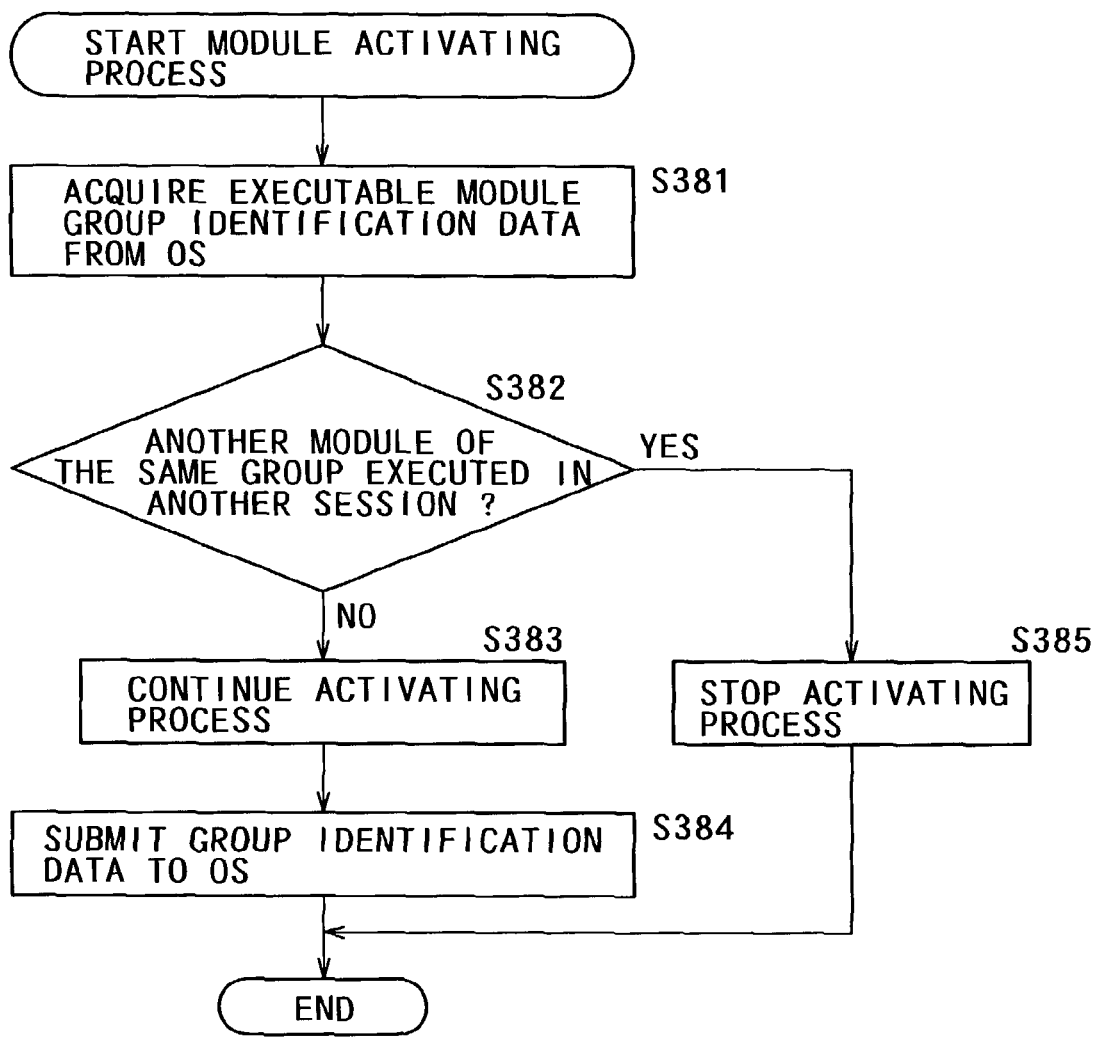
FIG. 54 is a flowchart of steps constituting a module activating process.

FIG. 54 is a flowchart of steps constituting a typical process of activating the module 412. In step S381, the module 412 acquires executable module group identification data 423 from the operating system 401.

In step S382, the module 412 judges whether any other module of the same group to which the module 412 belongs is being active in any other session, based on the acquired executable module group identification data 423 as well as on the group identification data 422 held in the module 412 itself.

If any other module of the same group is not judged to be active in any other session, step S383 is reached in which the activating process of the module 412 is continued.

In step S384, the module 412 supplies the operating system 401 with the group identification data 422 indicating the group to which the module 412 belongs, and the processing is terminated. Given the group identification data 422 from the module 412, the operating system 401 accordingly generates executable module group identification data 423 denoting correspondence between the session in which the module 412 is active on the one hand, and the group to which the module 412 belongs on the other hand. The identification data 423 thus generated is stored.

If in step S382 some other module of the same group to which the module 412 belongs is judged to be active in some other session, then step S385 is reached. In step S385, the activating process of the module 412 is stopped and the processing is terminated.

In the foregoing description, the module 412 was shown judging whether any other module of the same group was being active in any other session and determining whether or not to continue the activating process depending on the result of the judgment. Alternatively, the operating system 401 may judge whether any other module of the same group to which the module 412 belongs is being active in any other session and may determine whether or not to continue the activating process of the module 412 in keeping with the judgment.

FIG. 55 is a flowchart of steps carried out by the operating system 401 in reporting group identification data about an active module. In step S391, the operating system 401 judges whether the module 412 is about to be activated. If the module is not judged about to be activated, step S391 is reached again. The judgment of step S391 is repeated until the module 412 is about to be activated.

If in step S391 the module 412 is judged about to be activated, step S392 is reached. In step S392, the operating system 401 supplies executable module group identification data 423 to the module 412 that is about to be activated.

In step S393, the operating system 401 judges whether group identification data 422 are fed from the module 412. If the group identification data 422 are judged to be fed, step S394 is reached. In step S394, based on the group identification data 422, the operating system 401 stores into the executable module group identification data 423 the correspondence between the session in which the module 412 is activated and the group to which the module 412 belongs. This terminates the processing.

If in step S393 the group identification data 422 are not judged supplied, that means the module 412 about to be activated does not belong to the group in question or that the module 412 is deactivated. In that case, the operating system 401 does not store the correspondence between the session and the group associated with the module 412, and terminates the processing.

As described, the modules belonging to a given group are activated only within a single session; they cannot be activated or used across a plurality of sessions. This ensures that while a plurality of sessions are in progress, certain processes requiring specific resources (e.g., execution of unattended recording of reserved contents) are carried out without conflict. Because modules are executed exclusively as a group in a given session, the processes involving a plurality of modules are performed reliably.

With this invention, the network 3 is not limited to a wired network; it can also be a wireless network. The network system may be implemented as a wireless LAN based illustratively on IEEE 802.11b criteria involving radio waves over the 2.4 GHz band, or on IEEE 802.11a criteria over the 5 GHz band.

The content offering system according to the invention is not limited to handling image and sound contents; it can obviously address sound-only contents as well as such data as characters, computer programs, and numerical data.

Although the personal computer 2 was described above as a client being fed with contents, this is not limitative of the invention. Alternatively, the client may be not only the personal computer 2 but also a terminal device such as a PDA (personal digital assistant) or a portable telephone, a stay-at-home VCR, a table-top DVD (Digital Versatile Disc) recording apparatus, or a recorder/player such as a hard disc recorder.

The series of steps described above may be executed either by hardware or by software. For software-based processing to take place, programs constituting the software may be either incorporated beforehand in dedicated hardware or installed upon use from a suitable program storage medium into a general-purpose personal computer or like equipment capable of executing diverse functions.

As shown in FIGS. 2, 5 and 34, the storage medium is offered to users apart from computers not only as a package medium constituted by the magnetic disc 41, 121 or 341 (including floppy (registered trademark) discs); optical disc 42, 122 or 342 (including CD-ROM (compact disc-read only memory) and DVD (digital versatile disc)); magneto-optical disc 43, 123 or 343 (including MD (Mini-disc)); or semiconductor memory 44, 124 or 344; but also in the form of the ROM 22, 102 or 322; or the hard disc drive 31, 111 or 331, each containing the programs and incorporated beforehand in the computer.

The programs above are stored into the computer via interfaces such as routers and modems and through wired or wireless communication media such as local area networks, the Internet, and digital satellite broadcasting networks.

In this specification, the steps which are stored on a program storage medium and which describe the programs to be executed represent not only the processes that are carried out in the depicted sequence (i.e., on a time series basis) but also processes that are conducted parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. An information providing system comprising:
a plurality of information providing apparatuses and
a plurality of information processing apparatuses, said plurality of information providing apparatuses providing image data and sound data over a network to said plurality of information processing apparatuses, said plurality of information processing apparatuses displaying images and outputting sounds based on said image data and said sound data from said plurality of information providing apparatuses;
wherein each of said plurality of information providing apparatuses comprises:
first receiving means for receiving a TV program;
generating means for generating said image data and said sound data representing said TV program; and
transmitting means for transmitting said image data and said sound data over said network;

wherein each of said plurality of information processing apparatuses comprises:
  storage controlling means for storing connecting information and a name of said information providing apparatus, said connecting information being set to specify whether or not to establish connection with said information providing apparatus so that one of said plurality of information providing apparatuses is automatically selected to be connected according to the stored connecting information and the name of said one of said plurality of information providing apparatuses;
  connection controlling means for, if said connecting information is set to establish connection with said information providing apparatus, establishing connection with said one of said plurality of information providing apparatuses based on the stored name of said one of said plurality of information providing apparatuses; and
  reception controlling means for, if connection is established with said one of said plurality of information providing apparatuses, receiving said image data and said sound data from said one of said plurality of information providing apparatuses,
  wherein each of the plurality of the information processing apparatuses acquires a version of a server program used by the plurality of the information providing apparatuses and selects one of the plurality of the information providing apparatuses for connection according to the version of the server program, the version of the server program indicating at least a function selected from a recording function, a tuner function, and a multiple-streams function of the plurality of the information providing apparatuses,
  wherein the plurality of information providing apparatuses detect whether each of the plurality of information processing apparatuses is processing same content and send a request to each information processing apparatus that is processing the same content to boot up a chat means for chatting the same content, and
  wherein the plurality of information providing apparatuses process a channel change request from one of the plurality of information processing apparatuses based on a predetermined priority of the one of the plurality of information processing apparatuses.

2. An information providing system according to claim 1, wherein each of said plurality of said information processing apparatuses further comprises:
  display controlling means for, if said connecting information is not set to establish connection with said one of said plurality of information providing apparatuses, displaying a screen for acquiring names of said plurality of information providing apparatuses;
  wherein, if said connecting information is not set to establish connection, then said connection controlling means establishes connection with said one of said plurality of information providing apparatuses based on the name acquired through said screen.

3. An information providing system according to claim 1, wherein said storage controlling means stores channel data for denoting a channel over which to receive said TV program;
  wherein each of said plurality of information processing apparatuses further comprises transmission controlling means for transmitting a channel changing request to said plurality of information providing apparatuses in accordance with said channel data;
  wherein each of said information providing apparatuses further comprises second receiving means for receiving said channel changing request from said plurality of information processing apparatuses; and
  wherein said first receiving means receives said TV program over the requested channel based on said channel changing request.

4. An information processing apparatus for displaying images and outputting sounds based on image data and sound data representing a TV program, said image data and said sound data being provided by one of a plurality of information providing apparatuses over a network, said information processing apparatus comprising:
  storage controlling means for storing connecting information and a name of one of said plurality of information providing apparatuses, said connecting information being set to specify whether to establish connection with said one of said plurality of information providing apparatuses so that said one of said plurality of information providing apparatuses is automatically selected to be connected according to the stored connecting information and the name of said one of said plurality of information providing apparatuses;
  connection controlling means for, if said connecting information is set to establish connection with said one of said plurality of information providing apparatuses, establishing connection with said one of said plurality of information providing apparatuses based on the stored name of said information providing apparatus; and
  reception controlling means for, if connection is established with said one of said plurality of information providing apparatuses, receiving said image data and said sound data from said one of said plurality of information providing apparatuses,
  wherein the information processing apparatus acquires a version of a server program used by the plurality of the information providing apparatuses and selects one of the plurality of the information providing apparatuses for connection according to the version of the server program, the version of the server program indicating at least a function selected from a recording function, a tuner function, and a multiple-streams function of the plurality of the information providing apparatuses,
  wherein the plurality of information providing apparatuses detect whether each of the plurality of information processing apparatuses is processing same content and send a request to each information processing apparatus that is processing the same content to boot up a chat means for chatting the same content, and
  wherein the plurality of information providing apparatuses process a channel change request from one of the plurality of information processing apparatus based on a predetermined priority of the one of the plurality of information processing apparatuses.

5. An information processing apparatus according to claim 4, further comprising
  display controlling means for, if said connecting information is not set to establish connection with said one of said plurality of information providing apparatuses, displaying a screen for acquiring the name of said one of said plurality of information providing apparatuses;
  wherein, if said connecting information is not set to establish connection, then said connection controlling means establishes connection with said one of said plurality of information providing apparatuses based on the name acquired through said screen.

6. An information processing apparatus according to claim 4, wherein said storage controlling means stores channel data for denoting a channel over which to receive said TV program; and wherein said information processing apparatus further comprises:

transmission controlling means for transmitting a channel changing request to said plurality of information providing apparatuses in accordance with said channel data.

7. An information processing method for use with an information processing apparatus for displaying images and outputting sounds based on image data and sound data representing a TV program, said image data and said sound data being provided by one of a plurality of information providing apparatuses over a network, said information processing method comprising the steps of:

storing connecting information and a name of said plurality of information providing apparatuses, said connecting information being set to specify whether or not to establish connection with said one of said plurality of information providing apparatuses so that said one of said plurality of said information providing apparatuses is automatically selected to be connected according to the stored connecting information and the name of said one of said plurality of information providing apparatuses;

if said connecting information is set to establish connection with said one of said plurality of information providing apparatuses, then establishing connection with said one of said plurality of information providing apparatuses based on the stored name of said one of said plurality of information providing apparatuses; and if connection is established with said one of said plurality of information providing apparatuses, then receiving said image data and said sound data from said one of said plurality of information providing apparatuses, wherein the information processing apparatus acquires a version of a server program used by the plurality of the information providing apparatuses and selects one of the plurality of the information providing apparatuses for connection according to the version of the server program, the version of the server program indicating at least a function selected from a recording function, a tuner function, and a multiple-streams function of the plurality of the information providing apparatuses, wherein the plurality of information providing apparatuses detect whether each of the plurality of information processing apparatuses is processing same content and send a request to each information processing apparatus that is processing the same content to boot up a chat means for chatting the same content, and wherein the plurality of information providing apparatuses process a channel change request from one of the plurality of information processing apparatuses based on a predetermined priority of the one of the plurality of information processing apparatuses.

8. A non-transitory computer-readable medium recorded therein an executable program for controlling an information processing apparatus for displaying images and outputting sounds based on image data and sound data representing a TV program, said image data and said sound data being provided by one of a plurality of information providing apparatuses over a network, said executable program comprising the steps of:

storing connecting information and a name of one of said plurality of information providing apparatuses, said connecting information being set to specify whether or not to establish connection with said one of said plurality of information providing apparatuses so that said one of said plurality of said information providing apparatuses is automatically selected to be connected according to the stored connecting information and the name of said one of said plurality of information providing apparatuses;

if said connecting information is set to establish connection with said one of said plurality of information providing apparatuses, then establishing connection with said one of said plurality of information providing apparatuses based on the stored name of said information providing apparatus; and if connection is established with said one of said plurality of information providing apparatuses, then receiving said image data and said sound data from said one of said plurality of information providing apparatuses, wherein the information processing apparatus acquires a version of a server program used by the plurality of the information providing apparatuses and selects one of the plurality of the information providing apparatuses for connection according to the version of the server program, the version of the server program indicating at least a function selected from a recording function, a tuner function, and a multiple-streams function of the plurality of the information providing apparatuses, wherein the plurality of information providing apparatuses detect whether each of the plurality of information processing apparatuses is processing same content and send a request to each information processing apparatus that is processing the same content to boot up a chat means for chatting the same content, and wherein the plurality of information providing apparatuses process a channel change request from one of the plurality of information processing apparatuses based on a predetermined priority of the one of the plurality of information processing apparatuses.

9. An information providing system comprising:

a plurality of information providing apparatuses; and a plurality of information processing apparatuses, said plurality of information providing apparatuses providing image data and sound data over a network to said plurality of information processing apparatuses, said plurality of information processing apparatuses displaying images and outputting sounds based on said image data and said sound data from said plurality of information providing apparatuses;

wherein each of said plurality of information providing apparatuses comprises:

first receiving means for receiving a TV program;

generating means for generating said image data and said sound data representing said TV program; and transmitting means for transmitting said image data and said sound data over said network;

wherein each of said plurality of information processing apparatuses comprises:

storage controlling means for storing connecting information, a name of said information providing apparatus, and route information for connecting to said information providing apparatus, said connecting information being set to specify whether or not to establish connection with said information providing apparatus;

connection controlling means for, if said connecting information is set to establish connection with said information providing apparatus, establishing connection with said one of said plurality of information providing apparatuses based on the stored name of said one of said plurality of information providing apparatuses; and reception controlling means for, if connection is established with said one of said plurality of information providing apparatuses, receiving said image data and said sound data from said one of said plurality of information providing apparatuses, wherein each of the plurality of the information processing apparatus acquires a version of a server program used by the plurality of the information providing apparatuses and selects one of the plurality of the information providing apparatuses for connection according to the version of the server program, the version of the server program indicating at least a function selected from a recording function, a tuner function, and a multiple-streams function of the plurality of the information providing apparatuses, wherein the plurality of information providing apparatuses detect whether each of the plurality of information processing apparatuses is processing same content and send a request to each information processing apparatus that is processing the same content to boot up a chat means for chatting the same content, and wherein the plurality of information providing apparatuses process a channel change request from one of the plurality of information processing apparatuses based on a predetermined priority of the one of the plurality of information processing apparatuses.

10. An information processing apparatus for displaying images and outputting sounds based on image data and sound data representing a TV program, the image data and the sound data being provided by an information providing apparatus over a network, the information processing apparatus comprises:

storage controlling means for storing connecting information, a name of said information providing apparatus, and route information for connecting to said information providing apparatus, said connecting information being set to specify whether or not to establish connection with said information providing apparatus so that one of the plurality of the information providing apparatuses is automatically selected to be connected;

connection controlling means for, if said connecting information is set to establish connection with said information providing apparatus, establishing connection with said one of said plurality of information providing apparatuses based on the stored name of said one of said plurality of information providing apparatuses; and reception controlling means for, if connection is established with said one of said plurality of information providing apparatuses, receiving said image data and said sound data from said one of said plurality of information providing apparatuses, wherein the information processing apparatus acquires a version of a server program used by the plurality of the information providing apparatuses and selects one of the plurality of the information providing apparatuses for connection according to the version of the server program, the version of the server program indicating at least a function selected from a recording function, a tuner function, and a multiple-streams function of the plurality of the information providing apparatuses, wherein the plurality of information providing apparatuses detect whether each of the plurality of information processing apparatuses is processing same content and send a request to each information processing apparatus that is processing the same content to boot up a chat means for chatting the same content, and wherein the plurality of information providing apparatuses process a channel change request from one of the plurality of information processing apparatuses based on a predetermined priority of the one of the plurality of information processing apparatuses.

11. An information providing system comprising:

a plurality of information providing apparatuses and a plurality of information processing apparatuses, said plurality of information providing apparatuses providing image data and sound data over a network to said plurality of information processing apparatuses, said plurality of information processing apparatuses displaying images and outputting sounds based on said image data and said sound data from said plurality of information providing apparatuses;

wherein each of said plurality of information providing apparatuses comprises:

receiving means of receiving a TV program;

generating means for generating said image data and said sound data representing the TV program; and transmitting means for transmitting said image data and said sound data over said network;

wherein each of said plurality of information processing apparatuses comprises:

storage controlling means for storing connecting information and a name of said information providing apparatus, said connecting information being set to specify whether or not to establish connection with said information providing apparatus so that one of said plurality of information providing apparatuses is automatically selected to be connected according to the stored connecting information and the name of said one of said plurality of information providing apparatuses;

connection controlling means for, if said connecting information is set to establish connection with said information providing apparatus, establishing connection with said one of said plurality of information providing apparatuses based on the stored name of said one of said plurality of information providing apparatuses and for, if said connecting information is not set to establish connection with said information providing apparatus, displaying a selection window listing names of said plurality of information providing apparatus to be selected for establishing connection; and wherein each of the plurality of the information processing apparatuses acquires a version of a server program used by the plurality of the information providing apparatuses and selects one of the plurality of the information providing apparatuses for connection according to the version of the server program, the version of the server program indicating at least a function selected from a recording function, a tuner function, and a multiple-streams function of the plurality of the information providing apparatuses, and wherein said connection information is set to establish connection on a menu within the selection window listing names of said plurality of information providing apparatus, and said connection information is set not to establish connection from a menu not within the selection window listing names of said plurality of information providing apparatus.

* * * * *